United States Patent
Ohta et al.

(10) Patent No.: US 7,633,682 B2
(45) Date of Patent: Dec. 15, 2009

(54) OPTICAL ELEMENT PACKAGE

(75) Inventors: Eiji Ohta, Miyagi (JP); Toru Abiko, Miyagi (JP); Yasuyuki Kudo, Miyagi (JP); Hirokazu Odagiri, Miyagi (JP); Satoshi Sato, Miyagi (JP); Andrew Chakchung Yu, Miyagi (JP); Shogo Shinkai, Miyagi (JP); Taro Omura, Miyagi (JP); Hiroshi Mizuno, Miyagi (JP); Akihiro Horii, Miyagi (JP); Tatsuya Harima, Miyagi (JP)

(73) Assignee: Sony Corporation, Tokyo (JP)

( * ) Notice: Subject to any disclaimer, the term of this patent is extended or adjusted under 35 U.S.C. 154(b) by 120 days.

(21) Appl. No.: 12/029,739

(22) Filed: Feb. 12, 2008

(65) Prior Publication Data

US 2008/0205066 A1 Aug. 28, 2008

(30) Foreign Application Priority Data

Feb. 13, 2007 (JP) ............................. 2007-032766
Sep. 21, 2007 (JP) ............................. 2007-246237
Dec. 28, 2007 (JP) ............................. 2007-341237

(51) Int. Cl.
*G02B 27/10* (2006.01)

(52) U.S. Cl. ....................... 359/619; 359/622

(58) Field of Classification Search ............. 359/619, 359/622

See application file for complete search history.

(56) References Cited

U.S. PATENT DOCUMENTS 7,085,061 B2  8/2006  Watanabe
7,230,764 B2 *  6/2007  Mullen et al. ............... 359/619

FOREIGN PATENT DOCUMENTS

| JP | 53-125859 | 11/1978 |
| JP | 06-082764 | 3/1994 |
| JP | 2001272509 | 10/2001 |
| JP | 2002-055328 | 2/2002 |
| JP | 2003-249108 | 9/2003 |
| JP | 2005-010735 | 1/2005 |
| JP | 2005301147 | 10/2005 |
| JP | 2005-317411 | 11/2005 |

* cited by examiner

*Primary Examiner*—Joseph Martinez
(74) *Attorney, Agent, or Firm*—K&L Gates LLP

(57) ABSTRACT

An optical packaged body capable of preventing generation of a wrinkle, deflection, and warpage, capable of being thinned is provided. The optical package body includes a support medium and a packaging film that covers the support medium in a state of being applied with shrinkage force. The packaging film has an optical function section that acts on light from a light source in at least one of a first region into which the light from the light source enters and a second region from which the light from the light source is emitted after passing through the optical packaged body when the light source is arranged on one face side of the optical packaged body.

24 Claims, 37 Drawing Sheets

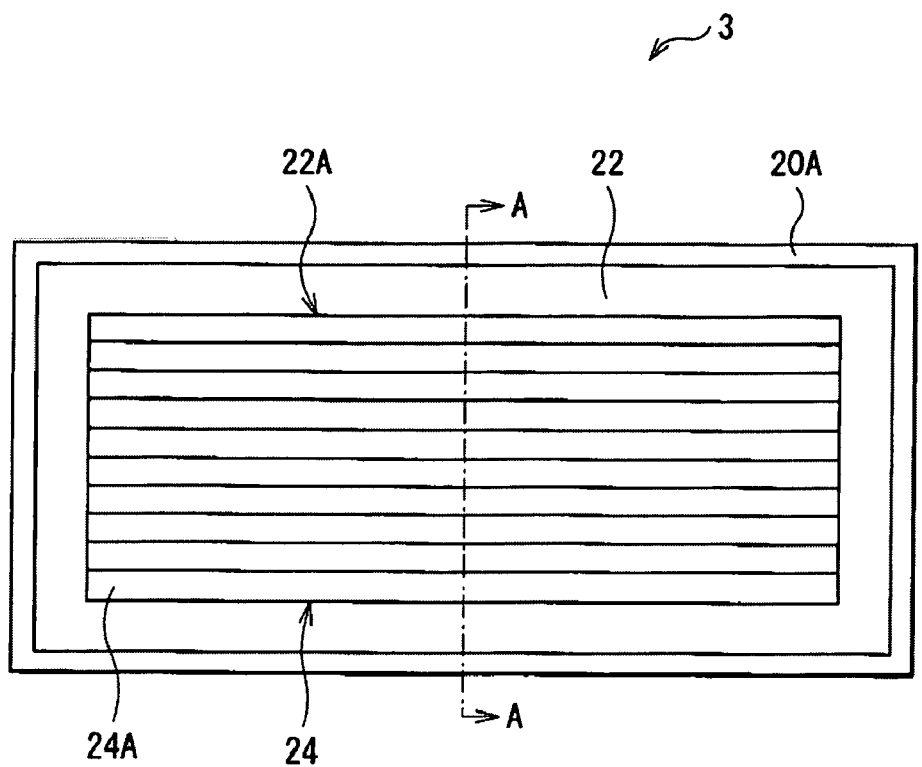
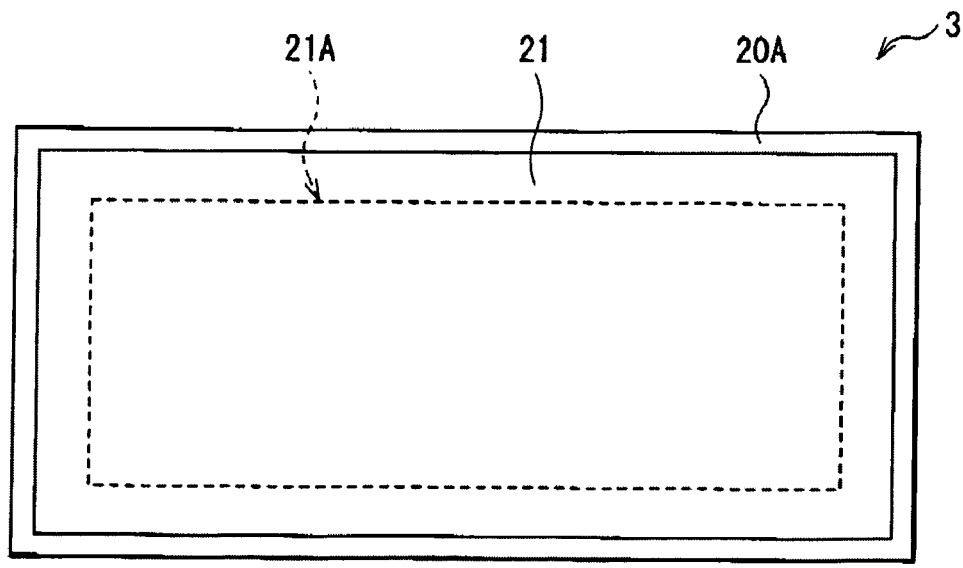

DRAWING DIRECTION

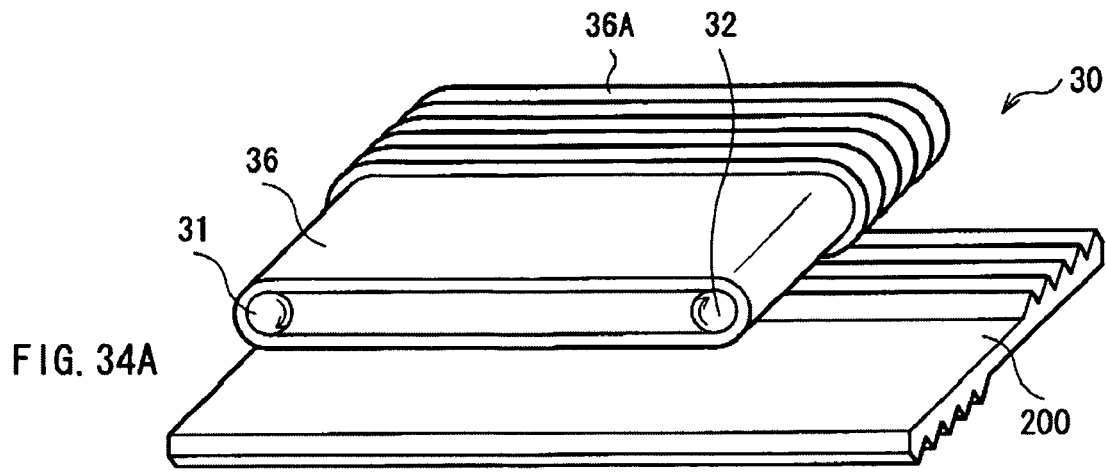
FIG. 34A
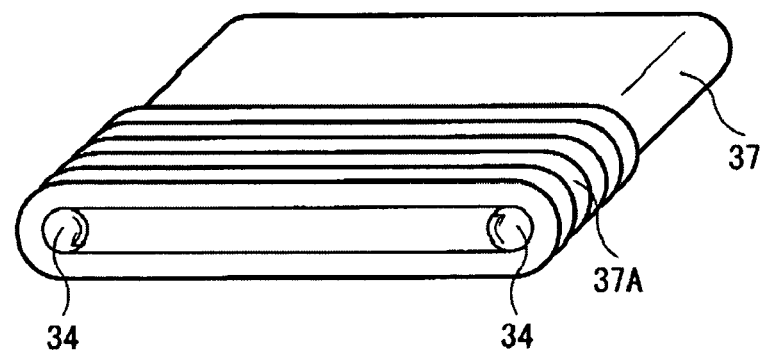
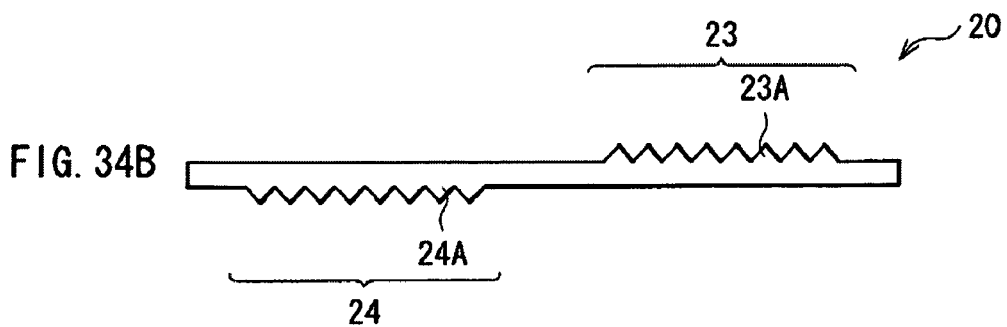
FIG. 34B

OPTICAL ELEMENT PACKAGE

CROSS REFERENCES TO RELATED APPLICATIONS

The present invention contains subject matters related to Japanese Patent Application No. 2007-032766 filed in the Japanese Patent Office on Feb. 13, 2007, Japanese Patent Application No. 2007-246237 filed in the Japanese Patent Office on Sep. 21, 2007, and Japanese Patent Application No. 2007-341237 filed in the Japanese Patent Office on Dec. 28, 2007, the entire contents of which being incorporated herein by reference.

BACKGROUND OF THE INVENTION

1. Field of the Invention

The present invention relates to a light-transmissive optical packaged body, a method of manufacturing it, an illuminating device including it, and a display unit including it.

2. Description of the Related Art

As a display unit of a word processor, a laptop personal computer and the like, a liquid crystal display unit including a thin and easily viewable backlight (illuminating device) has long been used. The illuminating devices for a liquid crystal display unit include an edge illuminating device in which a linear light source such as a fluorescent lamp is arranged on a side edge section of a light guide plate, and a liquid crystal panel is arranged over the light guide plate with a plurality of optical elements in between, and a direct-illuminating device in which a light source and a plurality of optical elements are arranged directly under a liquid crystal panel (refer to Japanese Unexamined Patent Application Publication No. 2005-301147).

In the illuminating device for a liquid crystal display unit, multiple optical elements have long been used for the purpose of improving the view angle, the luminance and the like. As the optical element, for example, a diffusion plate having light diffusion characteristics, a prism sheet having light collection characteristics and the like is cited.

SUMMARY OF THE INVENTION

In recent years, as the display unit has a large-sized screen, the area of the illuminating device becomes large. In this case, the area of various optical sheets such as the prism sheet and the diffusion plate needs to be larger. However, when these optical sheets have a larger area, a wrinkle, deflection, and warpage are easily generated due to the own weight. In addition, along with the large area thereof, the illuminance of the light source to retain lightness of the display surface is increased. Thus, heat applied to the surface of the optical sheet with a larger area is also increased. Since the heat is ununiformly transferred to the surface of the optical sheet, deformation of the optical sheet due to the heat is not uniformly generated. In the result, a wrinkle, deflection, and warpage are easily generated due to the heat as well.

Meanwhile, as a method to prevent such generation of the wrinkle, deflection, and warpage of the optical sheet associated with the large-sized screen, for example, lack of rigidity may be improved by thickening the optical sheet. However, in this case, the illuminating device is thickened and thereby realizing the thin illuminating device is inhibited. Accordingly, as described in Japanese Unexamined Patent Application Publication No. 2005-301147, whole areas of optical sheets may be bonded with each other by using a transparent adhesive in the order of lamination. When the optical sheets are layered with the transparent adhesive in between as above, the rigidity of the optical sheet may be improved, and generation of the wrinkle, deflection, and warpage may be prevented.

However, in the structure in which the optical sheets are simply bonded with each other with the transparent adhesive in between, the thickness of the illuminating device is increased by the thickness portion of the transparent adhesive, and thereby realizing the thin illuminating device may be inhibited. Further, in the case that the Coefficients of thermal expansion of the respective optical sheets are different from each other, when the light source is turned on, each optical sheet is heated by heat from the light source and then thermally expanded at each different expansion amount; meanwhile when the light source is turned off and the heat is no longer supplied from the light source, each optical sheet is cooled and then thermally shrunk at each different shrinkage amount. When each optical sheet is expanded and shrunk repeatedly and the optical sheets are adhered to each other, there is a possibility that deflection and warpage may be generated in the optical sheet and thus the optical characteristics deteriorate.

Accordingly, instead of using the transparent adhesive, the diffusion plate and the all optical sheets may be covered with a transparent packaging film. However, when the diffusion plate and the all optical sheets are simply covered with the transparent packaging film, generation of the wrinkle, deflection, and warpage due to heat or the like is not sufficiently decreased. Further, there is a possibility that a wrinkle is generated in the packaging film itself and thus the optical characteristics are deteriorated. Furthermore, since the diffusion plate and the all optical sheets are covered with the packaging film, the thickness of the illuminating device is increased by the thickness portion of the packaging film, and thereby realizing the thin illuminating device is inhibited.

In view of the foregoing, it is an object of the invention to provide an optical packaged body capable of preventing generation of a wrinkle, deflection, and warpage and capable of being thinned, a method of manufacturing it, an illuminating device including it, and a display unit including it.

An optical packaged body of the invention includes a support medium and a packaging film that covers the support medium in a state of being applied with shrinkage force. The foregoing packaging film has an optical function section that acts on light from a light source in at least one of a first region into which the light from the light source enters and a second region from which the light from the light source is emitted after passing through the optical packaged body when the light source is arranged on one face side of the optical packaged body.

An illuminating device of the invention includes the optical packaged body, a light source emitting light toward the optical packaged body, and a housing supporting the light source and the optical packaged body. Further, a display unit of the invention includes a display panel driven based on an image signal, a light source emitting light for illuminating the display panel, the optical packaged body provided between the display panel and the light source, and a housing that supports the display panel, the light source, and the optical packaged body.

In the optical packaged body, the illuminating device, and the display unit of the invention, the support medium is covered with the packaging film in a state of being applied with shrinkage force. Thereby, a tensile stress (so-called tensile force) acts on a given region of the packaging film including the optical function section in the in-plane direction of the packaging film.

The optical function section is preferably formed in an entire region corresponding to a display region of the display panel when the display panel driven based on an image signal is arranged on the other face side to the light source of the optical packaged body. The optical function section is preferably formed integrally with a region other than the optical function section in the packaging film.

Further, in the optical function section, a plurality of convex sections can be provided in at least one of a surface on the support medium side and a surface on the other side of the support medium. Then, each of the convex sections may have a columnar shape or a pyramidal shape. Further, each of the convex sections may have a columnar shape extending in one direction, and a surface of each of the convex sections may be composed of at least one of a curved face and a plurality of plain faces having different inclined angles. Further, the plurality of convex sections may extend in one direction, and may be arranged in parallel in a direction crossing the one direction. Further, each of the convex sections may have a polygonal columnar shape having a curved face projecting in a projection direction of the convex section at an apex. Further, the plurality of convex sections may be arranged in parallel in one direction and arranged in parallel in a direction crossing the one direction, and may have in-plane shape anisotropy and in-plane refractive index anisotropy. Further, the optical function section may contain a plurality of fine particles, and a surface shape of each of the convex sections is formed from the fine particles.

A first method of manufacturing an optical packaged body includes the following respective steps (A1) to (A3):

(A1): stretching a flat first resin film made of a resin having at least one characteristics of heat shrinkable, stretching properties, and shrink characteristics by energy rays in one in-plane direction or both in the one direction and in a direction crossing the one direction, and then forming an optical function section that acts on light from a light source on one face of the first resin film after being stretched;

(A2): arranging a support medium opposed to the optical function section, layering the first resin film formed with the optical function section and a second resin film having at least one characteristics of heat shrinkable, stretching properties, and shrink characteristics by energy rays with the support medium in between, and then bonding the first resin film and the second resin film to each other; and (A3): shrinking the first resin film formed with the optical function section and the second resin film, and packaging the support medium by the first resin film and the second resin film in a state of being applied with shrinkage force.

A second method of manufacturing an optical packaged body includes the following respective steps (B1) to (B3):

(B1): forming an optical function section that acts on light from a light source on one face of a flat first resin film made of a resin having at least one characteristics of heat shrinkable, stretching properties, and shrink characteristics by energy rays, and then stretching the first resin film formed with the optical function section in one in-plane direction or both in the one direction and in a direction crossing the one direction;

(B2): arranging a support medium opposed to the optical function section, layering the first resin film after being stretched and a second resin film having at least one characteristics of heat shrinkable, stretching properties, and shrink characteristics by energy rays with the support medium in between, and then bonding the first resin film and the second resin film to each other; and (B3): shrinking the first resin film after being stretched and the second resin film, and packaging the support medium by the first resin film and the second resin film in a state of being applied with shrinkage force.

In the first and the second methods of manufacturing an optical packaged body of the invention, the first resin film and the second resin film layered with the support medium in between are shrunk. The support medium is covered with the first resin film and the second resin film in a state of being applied with shrinkage force. Thereby, a tensile stress (so-called tensile force) acts on a given region of the first resin film and the second resin film in the in-plane direction of the first resin film and the second resin film.

According to the optical packaged body, the illuminating device, and the display unit of the invention, the support medium is covered with the packaging film in a state being applied with shrinkage force. Thus, even if the packaging film is thinned, generation of a wrinkle, deflection, and warpage may be prevented in at least the foregoing first region and the foregoing second region in the packaging film. Thereby, in the case that the optical function section that acts on the light from the light source is provided in at least one of the foregoing first region and the foregoing second region in the packaging film packaging the support medium, even if the thickness of the packaging film is thin such as about several 10 μm, there is no possibility that a wrinkle, deflection, and warpage are generated in the optical function section. In the result, the optical function section provided in at least one of the foregoing first region and the foregoing second region in the packaging film may be used instead of an optical sheet having a function similar to that of the optical function section. In addition, compared to a case that the optical sheet having a function similar to that of the optical function section is provided in the packaging film, the thickness of the entire optical packaged body may be reduced. Accordingly, in the invention, while generation of a wrinkle, deflection, and warpage is prevented, the thickness of the optical packaged body may be reduced.

According to the first and the second methods of manufacturing an optical packaged body of the invention, the support medium is covered with the first resin film and the second resin film in a state being applied with shrinkage force. Thus, even if the first resin film and the second resin film are thinned, generation of a wrinkle, deflection, and warpage may be prevented in at least a region where the first resin film and the second resin film are opposed to the support medium in the first resin film and the second resin film. Thereby, in the case that the optical function section that acts on the light from the light source is provided in a region where at least one of the first resin film and the second resin film is opposed to the support medium in the first resin film and the second resin film packaging the support medium, even if the thickness of the first resin film and the second resin film is thin such as about several 10 μm, there is no possibility that a wrinkle, deflection, and warpage are generated in the optical function section. In the result, the optical function section provided in at least the region where the first resin film and the second resin film are opposed to the support medium in the first resin film and the second resin film may be used instead of an optical sheet having a function similar to that of the optical function section. In addition, compared to a case that the optical sheet having a function similar to that of the optical function section is provided between the first resin film and the second resin film, the thickness of the entire optical packaged body may be reduced. Accordingly, in the invention, while generation of a wrinkle, deflection, and warpage is prevented, the thickness of the optical packaged body may be reduced.

Other objects, features, and effects of the invention will be more apparent from the following description.

BRIEF DESCRIPTION OF THE DRAWINGS

FIG. 4A and FIG. 4B are plan views showing an example of a top face structure and an example of a bottom face structure of an optical packaged body according to a third embodiment of the invention;

FIG. 34A and FIG. 34B are schematic views of a manufacturing equipment of the optical packaged body of FIG. 33;

DETAILED DESCRIPTION OF THE PREFERRED EMBODIMENTS

A description will be hereinafter given in detail of embodiments of the invention with reference to the drawings.

First Embodiment

Figure 1A:
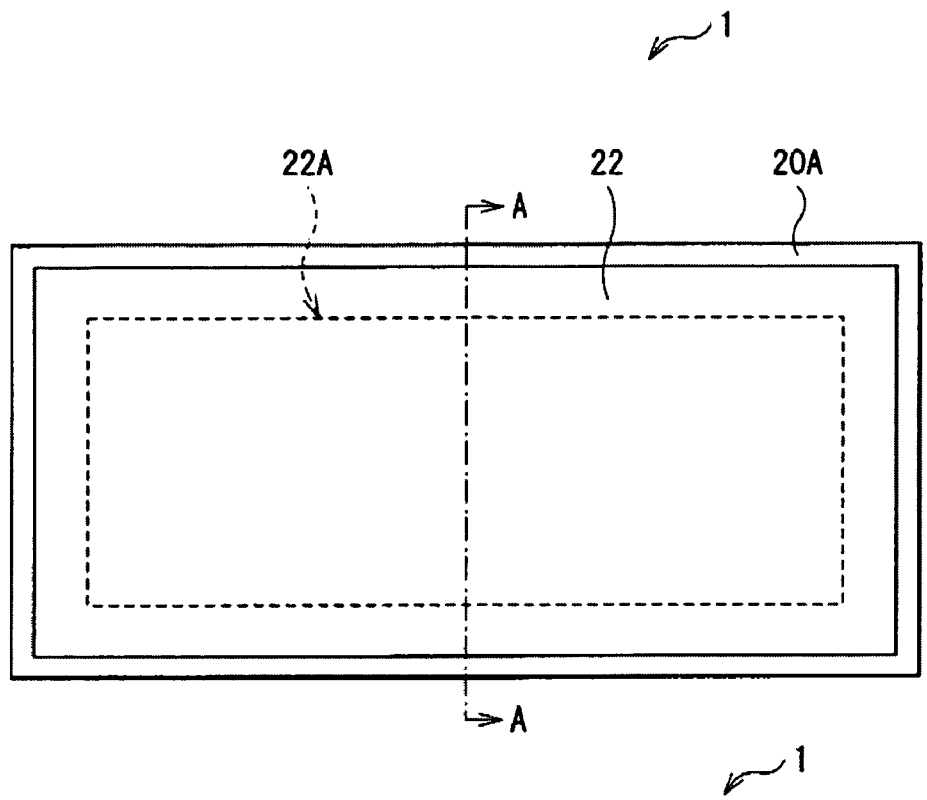
FIG. 1A and FIG. 1B are plan views showing an example of a top face structure and an example of a bottom face structure of an optical packaged body according to a first embodiment of the invention.
Figure 1B:
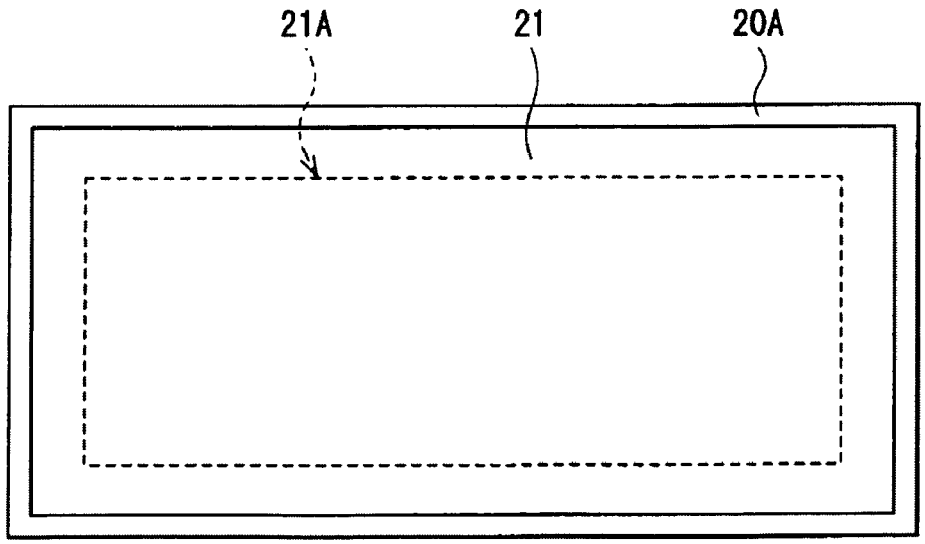
Figure 2:
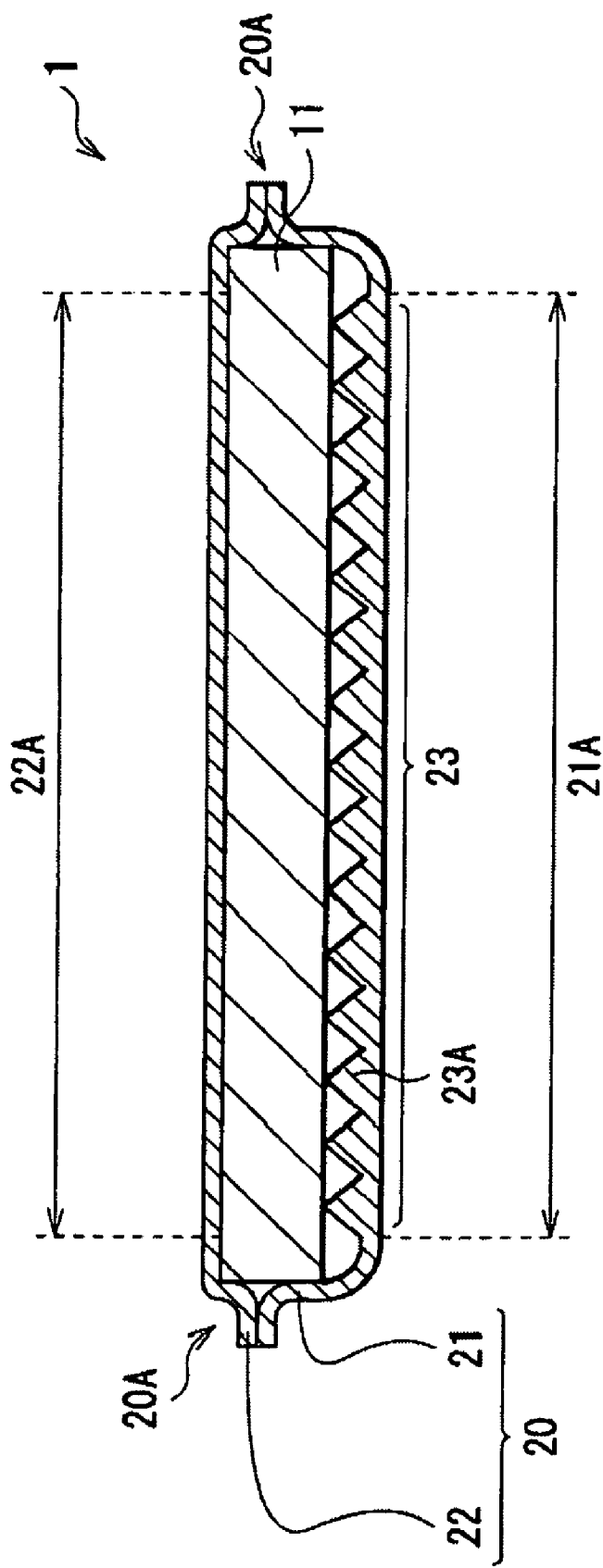
FIG. 2 is a cross section taken along arrow A-A of the optical packaged body of FIG. 1A and FIG. 1B.

FIG. 1A shows an example of a top face structure of an optical packaged body 1 according to a first embodiment of the invention. FIG. 1B shows an example of a bottom face structure of the optical packaged body 1 of FIG. 1A. FIG. 2 shows an example of a cross sectional structure taken along arrow A-A of the optical packaged body 1 of FIG. 1A. The optical packaged body 1 is arranged, for example, between a display panel driven based on an image signal and a light source for illuminating the display panel, and is suitably used for improving the optical characteristics of the light source.

The optical packaged body 1 includes a diffusion plate 11 and a packaging film 20 as shown in FIG. 2.

The diffusion plate 11 is a thick and high rigid optical sheet having a light diffusion layer formed by, for example, diffusing a light diffusion material (filler) in a relatively thick plate-like transparent resin. The diffusion plate 11 is in the shape corresponding to the display panel, for example, in the shape of a rectangle as shown in FIG. 1A and FIG. 1B. The diffusion plate 11 also functions as a support medium for supporting an optical sheet (for example, a diffusion sheet, a lens film, a reflective polarizing sheet or the like) arranged between the display panel and the optical packaged body 1, and the packaging film 20.

As the plate-like transparent resin, for example, a light transmissive thermoplastic resin such as PET, acryl, and polycarbonate is used. However, considering heat resistance in heat shrinkage, as the plate-like transparent resin, it is preferable to use a resin having a high glass transition temperature such as a polycarbonate resin, a polystyrene resin, a styrene copolymer with a vinyl monomer capable of being copolymerized with polystyrene-styrene, and a polyolefin resin (ZEONOR). The light diffusion layer included in the foregoing diffusion plate 11 is, for example, from 1 mm to 5 mm thick. The light diffusion material is composed of a particle having an average particle diameter of, for example, from 0.5 μm to 10 μm, and is dispersed in the transparent resin in the range from 0.1 parts by mass to 10 parts by mass in relation to the weight of the foregoing entire light diffusion layer. As the light diffusion material type, for example, an organic filler, an inorganic filler or the like is cited. As the light diffusion material, a cavity particle may be used. Thereby, the diffusion plate 11 has a function to diffuse light from the light source and returned light from a diffusion sheet 12 side.

If the light diffusion layer is thinner than 1 mm, the light diffusion characteristics are lost, and there is a possibility that the sheet rigidity is not able to be secured when the diffusion plate 11 is supported by a housing as will be described later. Meanwhile, if the light diffusion layer is thicker than 5 mm, heat applied by the light from the light source to the diffusion plate 11 is hardly diffused, and thus the diffusion plate 11 may be bent. When the average particle diameter of the light diffusion material is in the range from 0.5 μm to 10 μm, and the light diffusion material is dispersed in the transparent resin in the range from 0.1 parts by mass to 10 parts by mass in relation to the weight of the entire light diffusion layer, effects as the light diffusion material are effectively generated, and luminance irregularities is eliminated.

The packaging film 20 has, as shown in FIG. 2, a light incidence side film 21 on the bottom face side of the diffusion plate 11 and a light emitting side film 22 on the top face side of the diffusion plate 11. The light incidence side film 21 and the light emitting side film 22 are bonded by a circular bond section 20A formed in an outer circumferential region of a region where the light incidence side film 21 and the light emitting side film 22 are opposed to the diffusion plate 11 viewed from the normal line direction of the diffusion plate 11. Thus, the light incidence side film 21 and the light emitting side film 22 retain the diffusion platen from the normal line direction of the diffusion plate 11 and the direction crossing the normal line direction of the diffusion plate 11. The packaging film 20 is formed by, for example, layering the light incidence side film 21 and the light emitting side film 22 with the diffusion plate 11 in between, bonding the outer circumferential region of the region where the light incidence side film 21 and the light emitting side film 22 are opposed to the diffusion plate 11 viewed from the normal line direction of the diffusion plate 11 by pressure bonding or the like. The light incidence side film 21 and the light emitting side film 22 do not necessarily cover the entire diffusion plate 11, but may have an opening to expose part of the diffusion plate 11. Further, FIG. 1A, FIG. 1B, and FIG. 2 show a case that the light incidence side film 21 and the light emitting side film 22 cover the entire diffusion plate 11.

The light incidence side film 21 and the light emitting side film 22 are respectively composed of a thin optical sheet made of a material that is a flexible resin having translucency and has at least one of heat shrinkable, stretching properties, and shrink characteristics by energy rays. As a material having heat shrinkable, for example, a polyolefin resin such as polyethylene (PE) and polypropylene (PP), a polyester resin such as polyethylene terephthalate (PET) and polyethylene naphthalate (PEN), a vinyl binding system such as polystyrene (PS) and polyvinyl alcohol (PVA), a polycarbonate (PC) resin, a cycloolefin resin, a urethane resin, a vinyl chloride resin, a natural rubber resin, an artificial rubber resin and the like are used singly or by mixture. As the material having heat shrinkable, it is preferable to use a polymer material that is not shrunk when being heated from the ambient temperature to 85 deg C. As a material having shrink characteristics by energy rays, for example, a material having an absorption band in the infrared band (waveband from 2.5 μm to 30 μm) is cited. Specifically, a single resin or a mixed resin of a polyolefin resin such as polyethylene (PE) and polypropylene (PP), a polyester resin such as polyethylene terephthalate (PET) and polyethylene naphthalate (PEN), a vinyl binding system such as polystyrene (PS) and polyvinyl alcohol (PVA), a polycarbonate (PC) resin, a cycloolefin resin, and a vinyl chloride resin are cited. When the material having the infrared absorption band is used as a material of the light incidence side film 21 and the light emitting side film 22, the film may be shrunk by applying an infrared ray without applying heat. Thus, generation of heat damage to the optical element in the packaging film 20 is eliminated.

As the light incidence side film 21 and the light emitting side film 22, a uniaxially-stretched or biaxially-stretched (biaxially-sequential and biaxially-simultaneous) sheet or film is preferably used. When such a sheet or such a film is used, the light incidence side film 21 and the light emitting side film 22 is shrunk in the stretching direction by applying heat, and thus the contact characteristics between the light incidence side film 21/the light emitting side film 22 and the support medium may be improved. Further, as the light incidence side film 21 and the light emitting side film 22, a film or a sheet showing high tensibility may be used. When such a sheet or a such a film is used, after the films or the sheets showing the tensibility are tensioned in a given direction, a content is sandwiched between the tensioned films or the tensioned sheets and the surrounding of the content is bonded by adhesion or welding. After that, the tension of the film or the sheet after being bonded is released and thereby the contact characteristics with the content may be improved.

The heat shrinkage ratio of the light incidence side film 21 and the light emitting side film 22 should be decided in consideration of the size, the material, the usage environment and the like of the diffusion plate 11, the diffusion sheet 12, and a lens film 13 to be covered. The heat shrinkage ratio of the light incidence side film 21 and the light emitting side film 22 is preferably in the range from 0.2% to 100% at 90 deg C., more preferably in the range from 0.5% to 20%, and much more preferably in the range from 1% to 10%.

If the heat shrinkage ratio is under 0.2%, the contact characteristics between the light incidence side film 21/the light emitting side film 22 and the diffusion plate 11 may be deteriorated. If the heat shrinkage ratio is over 100% at 90 deg C., the in-plane heat shrinkable may be nonuniform. In order to prevent lowering of the optical characteristics of the packaging film 20 caused by deflection of the packaging film 20 by the heat from the light source, the heat deformation temperature of the packaging film 20 is preferably 80 deg C. or more, and more preferably 90 deg C. or more. In the case where the heat shrinkage ratio is in the range from 0.5% to 20%, the shape change due to heat shrinkage may be accurately estimated. Further, when the heat shrinkage ratio is in the range from 1% to 10%, the shape deterioration due to heat shrinkage is little and the shape change due to heat shrinkage may be estimated with good accuracy.

For example, when TMA of Seiko (heat/stress/strain measurement device EXSTAR6000 TMA/SS) is used, it is possible to check whether or not shrinkage force (tensile force) is applied to the light incidence side film 21 and the light emitting side film 22, and to measure the size of the shrinkage force (tensile force). First, in a state that a tensile force is applied to the light incidence side film 21 or the light emitting side film 22, a specimen being 5 mm×50 mm in size is cut out from the central portion of the light incidence side film 21 and the light emitting side film 22 with the use of a rectangle die. At this time, the specimen is cut out so that the long side and the short side of the specimen are in parallel with the long side and the short side of the diffusion plate 11 as the support medium. Next, after the specimen is sandwiched between glass plates so that the specimen has no surface waviness, the length of the cut-out specimen is measured by, for example, a toolmaker's microscope of Topcon Corporation. The cut-out specimen is in a state that the tensile force is released, and thus the cut-out specimen is shrunk down to the size less than 50 mm. Size conversion is made so that the shrunk state is returned to the original state of 50 mm, and a specimen is secondarily cut for the TMA, and then the secondarily cut specimen is set to the TMA. Next, the tensile force at the initial temperature 25 deg C. is measured. For a measuring machine of the tensile force, any measuring machine may be used as long as the measuring machine can measure a stress by applying a tensile stress to a given length. Accordingly, presence of the tensile force is checked.

The drying loss of the packaging film 20 is preferably 2% or less. To improve the contact characteristics between the packaging film 20 and the diffusion plate 11, the heat expansion ratio of the packaging film 20 is preferably smaller than the heat expansion ratio of the diffusion plate 11 covered with the packaging film 20. Further, when the refractive index of the packaging film 20 is smaller, the reflection component on the surface of the packaging film 20 is smaller and the luminance loss is smaller. Thus, for a portion where a light source image segmentation section 23 is not formed in the packaging film 20, the refractive index is preferably 1.6 or less, and more preferably 1.55 or less. On the contrary, for a portion where the light source image segmentation section 23 (in particular, a convex section 23A) in the packaging film 20 is formed, the refractive index is preferably large, for example, preferably 1.55 or more.

The thickness of the light incidence side film 21 and the thickness of the light emitting side film 22 are preferably in the range from 5 μm to 200 μm, more preferably from 5 μm to 100 μm, and much more preferably from 5 μm to 500 μm, respectively. It is difficult to form a film being under 5 μm thick. If the thickness of the film is under 5 μm, the strength of the packaging film 20 may be insufficient. Further, if the thickness of the film is under 5 μm, the shrinkage stress when being thermally shrunk is small and thus there is a possibility that the packaging film 20 is not contacted with the diffusion plate 11. Meanwhile, if the thickness is over 200 μm, it is difficult that the packaging film 20 is contacted with an edge of the diffusion plate 11 when the packaging film 20 is thermally shrunk and thus a portion in the vicinity thereof may be raised. In the case where the thickness of the light incidence side film 21 and the thickness of the light emitting side film 22 are respectively in the range from 5 μm to 200 μm, the diffusion plate 11 and the packaging film 20 are easily contacted with each other. Further, in the case where the thickness of the light incidence side film 21 and the thickness of the light emitting side film 22 are respectively in the range from 5 μm to 50 μm, while the strength of the packaging film 20 is secured at minimum, and the diffusion plate 11 and the packaging film 20 may be contacted with each other.

The thickness of the light incidence side film 21 may be different from that of the light emitting side film 22. In this case, the thickness of the light incidence side film 21 is preferably thicker than the thickness of the light emitting side film 22. When the light incidence side film 21 is thicker, shape change of the diffusion plate 11 due to heat from the light source is inhibited. The light incidence side film 21 and the light emitting side film 22 may be made of a material different from each other. In this case, a material suitable for each film can be selected.

The packaging film 20 preferably has a light diffusion function. For example, the packaging film 20 preferably contains one or more light diffusion materials (fine particle). As the fine particle, for example, at least one of an organic filler and an inorganic filler may be used. As a material of the organic filler, for example, one or more materials selected from the group consisting of an acryl resin, a silicone resin, a styrene resin, fluorine, and a cavity may be used. As the inorganic filler, for example, one or more materials selected from the group consisting of silica, alumina, talc, a titanium oxide, and barium sulfate may be used. In terms of transmission characteristics, a transparent organic filler as a fine particle is preferably used. As a shape of the fine particle, various shapes such as a needle-like shape, a spherical shape, an ellipsoidal shape, a plate-like shape, and a scale-like shape may be used. The packaging film 20 may contain fine particles having the same diameter, or fine particles having a plurality of different diameters.

Further, it is possible that if necessary, the packaging film 20 contains an additive such as a light stabilizer, an ultraviolet absorber, an infrared absorber, an antistatic agent, a fire retardant, and an antioxidant in order to obtain a light stabilization function, an ultraviolet absorption function, an infrared absorption function, a charge inhibition function, a fire retarding function, an antioxidant function and the like. Further, it is possible that the packaging film 20 is provided with surface treatment such as antiglare treatment (AG treatment) and antireflection treatment (AR treatment), and thereby diffusion of reflected light and the reflected light itself are decreased. Further, the packaging film 20 may be provided with a function to transmit light in a specific wavelength region such as UV-A light (light having a wavelength of about 315 to 400 nm).

Further, the packaging film 20 may be composed of a single layer or a plurality of layers. In the case where the packaging film 20 is composed of the plurality of layers, the surface layer of the packaging film 20 preferably contains the filler and the additive such as the light stabilizer, the ultraviolet absorber, the infrared absorber, the antistatic agent, the fire retardant, and the antioxidant. When the filler is contained in the surface layer, concave and convex are preferably formed on the surface layer by the filler. In this case, the packaging film 20 is prevented from being attached to other optical element and the like.

When the light source is arranged directly under the diffusion plate 11, the packaging film 20 has an optical function section acting on light from the light source in at least one of a light incidence region 21A (first region) into which the light from the light source enters and a light radiation region 22A (second region) from which the light from the light source is emitted after passing through the optical packaged body 1.

The optical function section is formed in the entire region corresponding to the display region of the display panel when the display panel is arranged directly above the packaging film 20. To simplify the manufacturing steps while preventing generation of a wrinkle, deflection, and warpage, the optical function section is preferably formed integrally with regions other than the optical function section in the packaging film 20.

For example, as shown in FIG. 2, the packaging film 20 has the light source image segmentation section 23 as the optical function section in the light incidence region 21A (directly under the diffusion plate 11). The light source image segmentation section 23 has a columnar or pyramidal plurality of convex sections 13A on at least one of the surface on the diffusion plate 11 side and the surface on the other side of the diffusion plate 11 out of the light incidence region 21A. FIG. 2 shows a case that the light source image segmentation section 23 is provided on the surface on the diffusion plate 11 side in the light incidence region 21A. FIG. 2 shows a case that the light source image segmentation section 23 is formed integrally with the light incidence side film 21, but the light source image segmentation section 23 may be formed independently from the light incidence side film 21.

In the case where the light source arranged directly under the diffusion plate 11 is a plurality of linear light sources extending in one direction (for example, longitudinal direction of the diffusion plate 11) orthogonal to the normal line direction of the diffusion plate 11, it is preferable that the plurality of convex sections 13A have a linear shape (columnar shape) extending in a given direction orthogonal to the normal line direction of the diffusion plate 11 as shown in FIG. 2, and are arranged continuously in line in the direction crossing the extending direction. At this time, the extending direction of each convex section 13A is preferably in parallel with the extending direction of each linear light source, but each convex section 13A may be arranged crossing the extending direction of each linear light source in a range allowable based on optical characteristics. The convex section 13A may have a polygonal columnar shape, or the surface of the convex section 13A may be a curved face. When the light source arranged directly under the diffusion plate 11 is a plurality of point light sources arranged in-plane having a normal line in parallel with the normal line direction of the diffusion plate 11, though not shown, it is preferable that the plurality of convex sections 13A have a pyramidal shape, and are two-dimensionally arranged continuously in at least one of the surface on the diffusion plate 11 side and the surface on the other side of the diffusion plate 11 in the light incidence region 21A.

Thereby, while the light source image segmentation section 23 refracts and transmits light entering the bottom face or the top face at an angle under the critical angle out of light emitted from, for example, one light source, the light source image segmentation section 23 totally reflects light entering at an angle of the critical angle or more. Thus, the light source image segmentation section 23 has a function to segment a light source image created by the one light source into a plurality of light source images according to the number of faces composing the surface shape of each convex section 13A (strictly speaking, the number of faces classified for every inclined angle). In the case where the surface of each convex section 13A has a curved face, the light source image segmentation section 23 has a function to segment the light source image created by the one light source into infinite of light source images. That is, the light source image segmentation section 23 segments the light source image created by the one light source into a plurality of (or infinite of) light source images so that a distance between each light source image formed by each light source image after segmentation is narrower than a distance between the light sources. Thus, the difference between the luminance level (maximum value) of the light source image after segmentation and the luminance level (minimum value) between each light source image after segmentation can be smaller than the difference between the luminance level (maximum value) of the light source image before segmentation and the luminance level (minimum value) between each light source image before segmentation, and thereby irregularities of the lighting luminance can be decreased. Accordingly, the light source image segmentation section 23 may be regarded as a kind of diffusion sheet as well.

The light source image means a light beam showing the luminance peak in a light luminance distribution. The distance between each light source image means a distance in the in-plane direction between adjacent peaks in the luminance distribution.

A description will be given of an action in the optical packaged body 1 in this embodiment. When the light source is arranged on the light source image segmentation section 23 side of the optical packaged body 1 and unpolarized light is emitted from the light source toward the optical packaged body 1, the light from the light source is segmented into minute light beams by the light source image segmentation section 23, and a light source image obtained by the segmentation is diffused by the diffusion plate 11. Thereby, the in-plane luminance distribution becomes uniform. After that, the light is transmitted through the incidence side film 21, and then is emitted outside. Accordingly, the light from the light source is adjusted to light having a desired on-axis luminance, a desired in-plane luminance distribution, a desired view angle and the like.

In this embodiment, the diffusion plate 11 is covered with the packaging film 20 in a state of being applied with the shrinkage force. Thereby, a tensile stress (so-called tensile force) acts on a given region of the packaging film 20 in the in-plane direction of the packaging film 20. Thus, even if the thickness of the packaging film 20 is reduced down to, for example, about several 10 μm, generation of a wrinkle, deflection, and warpage may be prevented in at least the light incidence region 21A and the light radiation region 22A in the packaging film 20. In the result, in the case where the light source image segmentation section 23 is provided in the light incidence region 21A in the packaging film 20, even if the thickness of the light source image segmentation section 23 is thin such as about several 10 μm, there is no possibility that a wrinkle, deflection, and warpage are generated in the light source image segmentation section 23. Thus, the light source image segmentation section 23 provided in the light incidence region 21A in the packaging film 20 may be used instead of an optical sheet having a function similar to that of the light source image segmentation section 23. In addition, compared to a case that the optical sheet having a function similar to that of the light source image segmentation section 23 is provided in the packaging film 20, the thickness of the entire optical packaged body 1 is smaller. Accordingly, in this embodiment, while generation of a wrinkle, deflection, and warpage is prevented, the thickness of the optical packaged body 1 is reduced.

In general, when an optical sheet is arranged on the light incidence side (light source side) of the diffusion plate 11, it is necessary that the optical sheet is thickened to the degree equal to the thickness of the diffusion plate 11 in order to prevent deformation due to heat from the light source. However, when the optical sheet is thickened as above, the illuminating device is thickened, and thereby realizing the thin illuminating device is inhibited. Accordingly, in the past, it is difficult to arrange the optical sheet on the light incidence side (light source side) of the diffusion plate 11 actually. Meanwhile, in this embodiment, the diffusion plate 11 is covered with the packaging film 20 in a state of being applied with the shrinkage force. Thereby, the tensile stress (so-called tensile force) acts on a given region of the packaging film 20 in the in-plane direction of the packaging film 20. Thus, in the case that the thickness of the packaging film 20 (light incidence side film 21) is reduced down to, for example, about several 10 μm, even if the light incidence side film 21 receives heat from the light source, generation of a wrinkle, deflection, and warpage in the light incidence region 21A due to the heat from the light source light is prevented. Thereby, the thin light source image segmentation section 23 is arranged on the light incidence side (light source side) of the diffusion plate 11 without generating a wrinkle, deflection, and warpage. That is, in this embodiment, it is possible to realize a structure substantially identical with a structure in which a thin optical sheet having a function similar to that of the light source image segmentation section 23 is arranged on the light incidence side (light source side) of the diffusion plate 11.

Modification of First Embodiment

In the foregoing embodiment, the packaging film 20 covers the diffusion plate 11 as the support medium. However, the packaging film 20 may cover other support medium. As other support medium, for example, a transparent plate such as plastic and glass, an optical plate to change light characteristics of light emitted from the light source by providing diffusion, light collection and the like are cited. As the optical plate, for example, a wave plate, a reflective polarizing plate, a prism plate having a concave and convex shape such as a prism or the like is cited. To function as a support medium, the thickness thereof is preferably in the range about from 1000 μm to 10000 μm. Above the light source of a direct-lighting liquid crystal display unit, a resin plate including a diffusion filler being about 1 mm to 4 mm thick having a diagonal diameter of about 2 inches to 100 inches, a diffusion optical plate having a layer provided with a shape as a diffusion function on the surface of a glass or a filler are usable as a support medium. Above the light source of a side-lighting liquid crystal display unit, a transparent resin plate being about 0.5 to 10 mm thick having a diagonal diameter of about 1 inch to several 10 inches, a flat resin plate including a filler, a resin plate including a filler and being provided with a shape on the surface, or a resin plate not including a filler but being provided with a shape on the surface are usable. Taking account of the fact that when the light source of the liquid crystal display unit is turned on in a state of being set under a high temperature of 40 deg C., the temperature in the unit is raised up to about 60 deg C. and the fact that the polarizing plate in the liquid crystal display unit is deteriorated at 70 deg C., it is preferable that the rigidity change of the support medium is small when the temperature is raised up to 70 deg C. and the support medium has elasticity to some extent. As a material having such characteristics, for example, polycarbonate (elasticity ratio: 2.1 GPa), polystyrene (elasticity ratio: 2.8 GPa), ZEONOR resin as a polyolefin resin (elasticity ratio: 2.1 GPa), an acrylic resin (elasticity ratio: 3 GPa) or the like is cited. A material having an elasticity ratio equal to or more than that of the polycarbonate resin having the lowest elasticity of the foregoing materials (elasticity ratio: 2.1 GPa or more) is preferably used as the support medium. Further, the support medium is preferably made of, for example, a polymer material, and the transmittance is preferably 30% or more. The shape of the incident surface and the transmission surface of the support medium are selected, for example, according to the shape of the crystal panel arranged adjacent to the support medium, and for example, have a rectangle shape with an aspect ratio different from each other. Further, the principal surface of the support medium is preferably provided with roughing treatment or preferably contains a fine particle in order to decrease brush and friction. Further, if necessary, the support medium may be provided with an ultraviolet absorption function, an infrared absorption function, a charge inhibition function and the like by containing an additive such as a light stabilizer, an ultraviolet absorber, an antistatic agent, a fire retardant, and an antioxidant. Further, it is possible that the support medium is provided with surface treatment such as antireflection treatment (AR treatment) and antiglare treatment (AG treatment) and thereby diffusion of reflected light and the reflected light itself are decreased. Further, the surface of the support medium may be provided with a function to reflect an ultraviolet ray and an infrared ray.

Second Embodiment

Next, a description will be given of a second embodiment of the invention.

Figure 3:
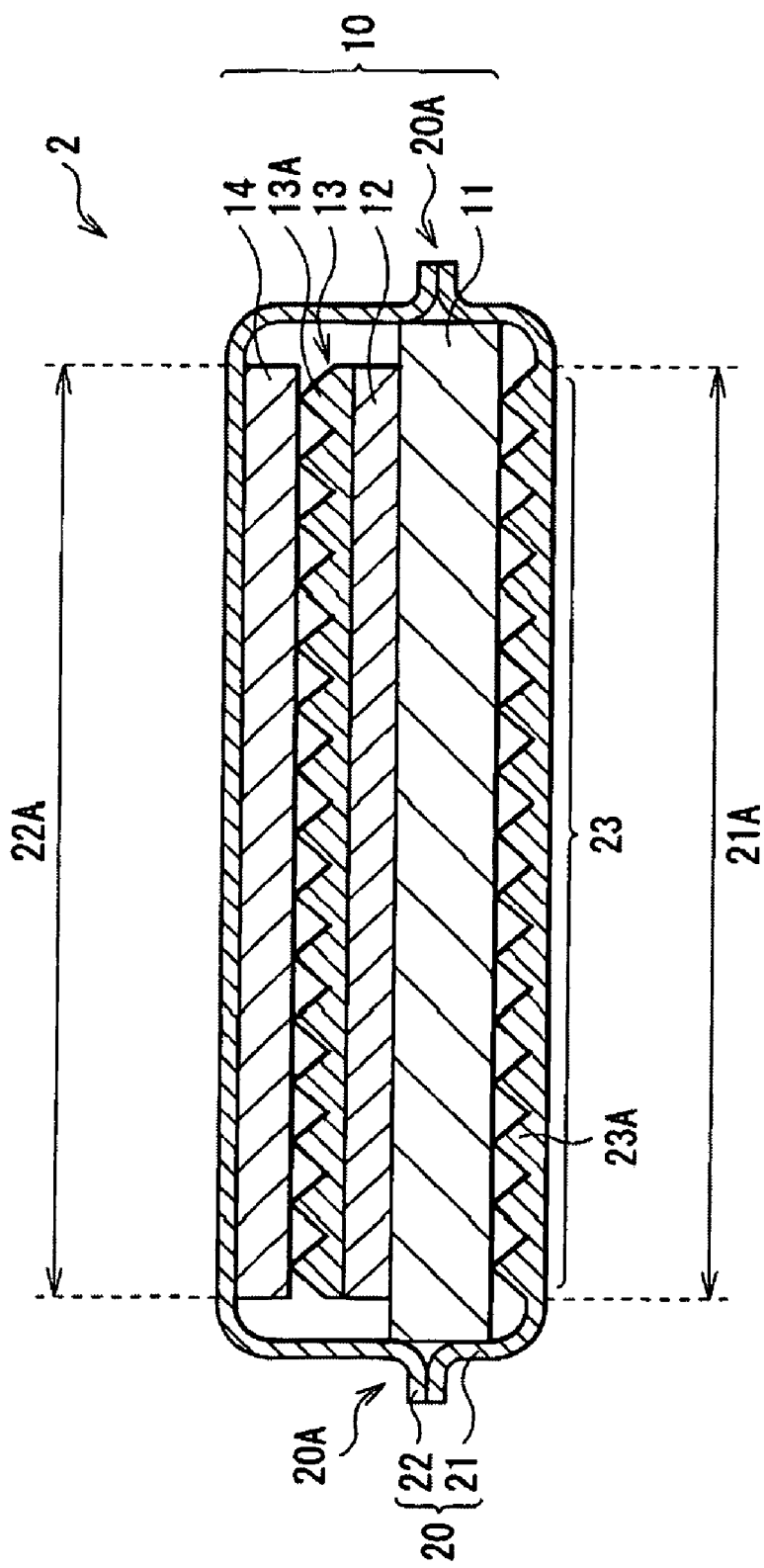
FIG. 3 is a cross section of an optical packaged body according to a second embodiment of the invention.

FIG. 3 shows an example of a cross sectional structure of an optical packaged body 2 according to a second embodiment of the invention. FIG. 3 shows an example of a cross sectional structure in the same location as that taken along line A-A of FIG. 1A. In the optical packaged body 2 according to this embodiment, not only the diffusion plate 11 but also one or a plurality of optical sheets are covered with the packaging film 20 in the optical packaged body 1 according to the foregoing embodiment. For example, as shown in FIG. 3, a stack 10 in which the diffusion plate 11, the diffusion sheet 12, the lens film 13, and a reflective polarizing sheet 14 are sequentially layered from the light source image segmentation section 23 side is covered with the packaging film 20.

The diffusion sheet 12 is, for example, a thin optical sheet formed by coating a relatively thin film transparent resin with a transparent resin containing a light diffusion material. As the film transparent resin, for example, a light transmissive thermoplastic resin such as PET, acryl, and polycarbonate is used as in the foregoing diffusion plate 11. The light diffusion layer included in the foregoing diffusion plate has a structure similar to that of the foregoing diffusion plate 11. Thereby, the diffusion sheet 12 has a function to diffuse light passing through the diffusion plate 11 and returned light from the diffusion sheet 12 side.

The lens film 13 is a thin optical sheet in which a plurality of convex sections 13A extending along a plain face in parallel with the face on the diffusion plate 11 side (bottom face) are arranged continuously in line on the face on the reflective polarizing sheet 14 side (top face). When a plurality of linear light sources are arranged in parallel directly under the stack 10, each convex section 13A is preferably arranged so that the extending direction of each convex section 13A is in parallel with the extending direction of the linear light sources. However, each convex section 13A may be arranged to cross the extending direction of each linear light source in a range allowable based on optical characteristics. Thereby, the lens film 13 refracts and transmits a light component in the arrangement direction of each convex section 13A out of light entering from the bottom face side toward the lamination direction of the stack 10 to improve the directivity.

The lens film 13 may be integrally formed by using a resin material having transmission characteristics such as a thermoplastic resin, but may be formed by transcribing an energy ray (for example, ultraviolet ray) cured resin on a transmissive base material such as PET (polyethylene terephthalate). As the thermoplastic resin, considering the function to control the light emitting direction, a thermoplastic resin having a refractive index of 1.4 or more is preferably used. As such a resin, for example, an acrylic resin such as a polycarbonate resin and PMMA (polymethylmethacrylate resin), a polyester resin such as polyethylene terephthalate, an amorphous copolymer polyester resin such as MS (copolymer of methylmethacrylate and styrene), a polystyrene resin, a polyvinyl chloride resin and the like are cited.

The reflective polarizing sheet 14 has a multilayer structure in which, for example, layers having a refractive index different from each other are alternately layered (not shown). The reflective polarizing sheet 14 splits light having the directivity improved by the lens film 13 into p and s, transmits only p wave, and selectively reflects s wave. The reflected s wave is reflected again by a reflective sheet or the like arranged behind the light source, and then is split into p wave and s wave. Thus, the s wave reflected by the reflective polarizing sheet 14 can be reused. The foregoing multilayer structure of the reflective polarizing sheet 14 is sandwiched between a pair of diffusion sheets. The p wave transmitted through the multilayer film is diffused by the diffusion sheets in the reflective polarizing sheet 14, and thereby the view angle is widened.

When a liquid crystal panel (polarizer) exists in a position that is outside of the optical packaged body 2 and is in proximity to the light radiation region 22A, or when the reflective polarizing sheet 14 or the lens film 13 exists in a position that is inside of the optical packaged body 2 and is in proximity to the light radiation region 22A, the phase difference of the light emitting side film 22 is preferably small to decrease luminance irregularities. Specifically, the phase difference delay of the packaging film 20 in relation to the transmission axis of the polarizer provided on the light incidence side of the liquid crystal panel and the light axis of the reflective polarizing sheet 14 is preferably ($1/50$) $\pi$ or less of the wavelength of the incident light. The foregoing phase difference delay absolutely means the phase difference delay in relation to the transmission axis of the polarizer provided on the light incidence side of the liquid crystal panel and the light axis of the reflective polarizing sheet 14. The phase difference delay of the packaging film 20 on the emission side may be different from that on the incidence side. In this case, it is desirable that the phase difference delay in relation to the light axis of the reflective polarizing sheet 14 is ($1/50$) $\pi$ or less in at least on the emission side of the packaging film 20.

As a material of such a packaging substrate, polycarbonate, a vinyl aromatic hydrocarbon such as polystyrene, a block copolymer of a vinyl aromatic hydrocarbon and conjugate diene such as styrene-butadiene block copolymer, polypropylene, polyethylene, cycloolefin primer, triacetyl cellulose and the like are cited.

If the packaging film 20 has slight birefringence, it is desirable that the value thereof is uniform on the entire light transmission surface of the packaging film 20, and the polarizing axis thereof is uniform on the entire light transmission surface of the packaging film 20. Thereby, the polarizing axis thereof is almost in parallel with the transmission axis of the polarizer provided on the light source side of the liquid crystal panel or the light axis of the reflective polarizing sheet 14, and thereby the polarizing axis is not rotated.

Further, the structure of the light diffusion section 27 is preferably an integrated structure of the major structural section and the concave and convex section. When structured as above, the phase difference may be further decreased compared to a case that the ultraviolet curing resin, the binder resin, the organic filler, or the inorganic filler described above is used.

Next, a description will be given of an action in the optical packaged body 2 in this embodiment. When the light source is arranged on the light source image segmentation section 23 side of the optical packaged body 2 and unpolarized light is emitted from the light source toward the optical packaged body 2, the light from the light source is segmented into minute light beams by the light source image segmentation section 23, and a light source image obtained by the segmentation is diffused by the diffusion plate 11 and the diffusion sheet 12. Thereby, the in-plane luminance distribution becomes uniform. After that, the on-axis luminance is increased by light collection action of the lens film 13, the light collected by the lens film 13 is polarized and split by the reflective polarizing sheet 14, the view angle is widened, and then the light is emitted outside. Accordingly, the light from the light source is adjusted to light having a desired on-axis luminance, a desired in-plane luminance distribution, a desired view angle and the like.

In this embodiment, the stack 10 is covered with the packaging film 20 in a state of being applied with the shrinkage force. Thereby, a tensile stress (so-called tensile force) acts on a given region of the packaging film 20 in the in-plane direction of the packaging film 20. Thus, even if the thickness of the packaging film 20 is reduced down to, for example, about several 10 μm, generation of a wrinkle, deflection, and warpage is prevented in at least the light incidence region 21A and the light radiation region 22A in the packaging film 20. In the result, when the light source image segmentation section 23 is provided in the light incidence region 21A in the packaging film 20, even if the thickness of the light source image segmentation section 23 is thin such as about several 10 μm, there is no possibility that a wrinkle, deflection, and warpage are generated in the light source image segmentation section 23. Thus, the light source image segmentation section 23 provided in the light incidence region 21A in the packaging film 20 can be used instead of an optical sheet having a function similar to that of the light source image segmentation section 23. In addition, compared to a case that the optical sheet having a function similar to that of the light source image segmentation section 23 is provided in the packaging film 20, the thickness of the entire optical packaged body 2 is reduced. Further, the stack 10 is covered with the packaging film 20 in a state of being applied with the shrinkage force. Thus, adhesive contact to limit movement in the in-plane direction of each optical sheet covered with the packaging film 20 is not generated. Thereby, for each optical sheet covered with the packaging film 20, generation of a wrinkle, deflection, and warpage is prevented. Accordingly, in this embodiment, while generation of a wrinkle, deflection, and warpage is prevented, the thickness of the optical packaged body 2 is reduced.

Further, in this embodiment, the stack 10 is covered with the packaging film 20 in a state of being applied with the shrinkage force, and a tensile stress (so-called tensile force) acts on a given region of the packaging film 20 in the in-plane direction of the packaging film 20. Thus, in the case that the thickness of the packaging film 20 (light incidence side film 21) is reduced down to, for example, about several 10 μm, even if the light incidence side film 21 receives heat from the light source, generation of a wrinkle, deflection, and warpage in the light incidence region 21A due to the heat from the light source light is prevented. Thereby, the thin light source image segmentation section 23 may be arranged on the light incidence side (light source side) of the diffusion plate 11 without generating a wrinkle, deflection, and warpage. That is, in this embodiment, it is possible to realize a structure substantially identical with a structure in which a thin optical sheet having a function similar to that of the light source image segmentation section 23 is arranged on the light incidence side (light source side) of the diffusion plate 11.

Modification of Second Embodiment

In the foregoing embodiment, the description has been given of the case that the stack 10 in which the diffusion plate 11, the diffusion sheet 12, the lens film 13, and the reflective polarizing sheet 14 are sequentially layered from the light source image segmentation section 23 side is covered with the packaging film 20 as an example. However, it is possible that an optical sheet having a diffusion function (for example, an optical sheet similar to the diffusion sheet 12) is arranged instead of the reflective polarizing sheet 14.

Third Embodiment

Next, a description will be given of a third embodiment of the invention.

Figure 5:
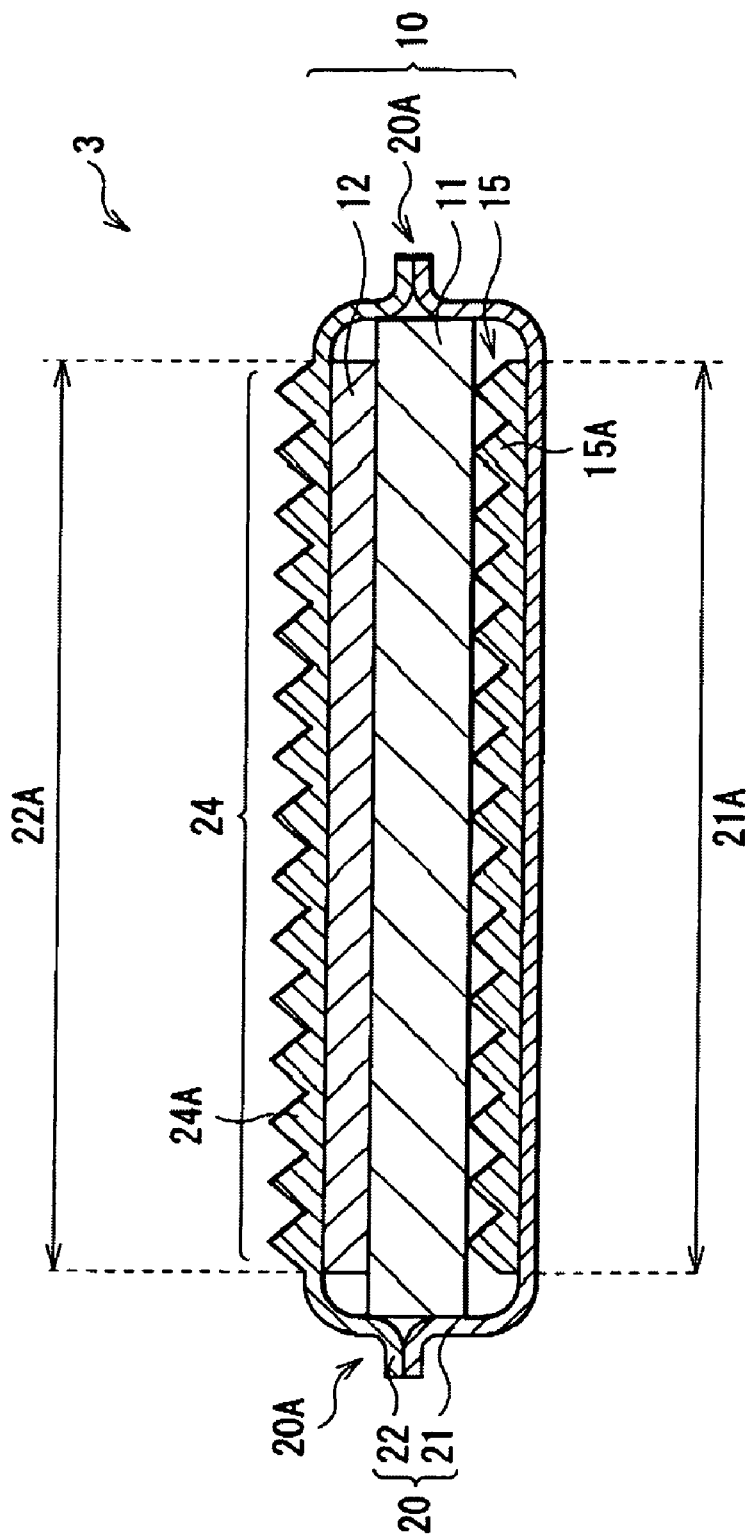
FIG. 5 is a cross section taken along arrow A-A of the optical packaged body of FIG. 4A and FIG. 4B.

FIG. 4A shows an example of a top face structure of an optical packaged body 3 according to the third embodiment of the invention. FIG. 4B shows an example of a bottom face structure of the optical packaged body 3 of FIG. 4A. FIG. 5 shows an example of a cross sectional structure taken along arrow A-A of the optical packaged body 3 of FIG. 4A. The optical packaged body 3 is different from the foregoing optical packaged body 2 of the second embodiment in the following points. That is, in the optical packaged body 3, an optical sheet (light source image segmentation sheet 16) having a function similar to that of the light source image segmentation section 23 is included instead of the light source image segmentation section 23 on the light source side than the diffusion plate 11 (between the diffusion plate 11 and the light incidence side film 21), a polarization split section 24 is included in the light radiation region 22A of the packaging film 20 instead of the reflective polarizing sheet 14, and the lens film 13 is eliminated. Thus, a description will be hereinafter given mainly of the differences from the foregoing second embodiment, and a description for the points common to the second embodiment will be omitted as appropriate.

The light source image segmentation sheet 15 has, for example, as shown in FIG. 5, a columnar or pyramidal plurality of convex sections 15A in the light incidence region 21A (directly under the diffusion plate 11). When the light source arranged directly under the stack 10 is a plurality of linear light sources extending in one direction (for example, longitudinal direction of the diffusion plate 11) orthogonal to the lamination direction of the stack 10, it is preferable that the plurality of convex sections 15A have a linear shape (columnar shape) extending in a given direction orthogonal to the lamination direction of the stack 10 as shown in FIG. 5, and are arranged continuously in line in the direction crossing the extending direction. At this time, the extending direction of each convex section 15A is preferably in parallel with the extending direction of each linear light source, but each convex section 15A may be arranged to cross the extending direction of each linear light source in a range allowable based on optical characteristics. The convex section 15A may have a polygonal columnar shape, or the surface of the convex section 15A may have a curved face. Further, when the light source arranged directly under the stack 10 is a plurality of point light sources arranged in one plane having a normal line in parallel with the lamination direction of the stack 10, though not shown, it is preferable that the plurality of convex sections 15A have a pyramidal shape, and are continuously and two-dimensionally arranged in the light incidence region 21A.

Thereby, while the light source image segmentation sheet 15 refracts and transmits light entering the bottom face or the top face at an angle under the critical angle out of light emitted from, for example, one light source, the light source image segmentation sheet 15 totally reflects light entering at an angle of the critical angle or more. Thus, the light source image segmentation sheet 15 has a function to segment a light source image created by the one light source into a plurality of light source images according to the number of faces composing the surface shape of each convex section 15A (strictly speaking, the number of faces classified for every inclined angle). In the case where the surface of each convex section 15A has a curved face, the light source image segmentation sheet 15 has a function to segment the light source image created by the one light source into infinite of light source images. That is, the light source image segmentation sheet 15 segments the light source image created by the one light source into a plurality of (or infinite of) light source images so that a distance between each light source image formed by each light source image after segmentation is smaller than a distance between the light sources. Thus, the difference between the luminance level (maximum value) of the light source image after segmentation and the luminance level (minimum value) between each light source image after segmentation is smaller than the difference between the luminance level (maximum value) of the light source image before segmentation and the luminance level (minimum value) between each light source image before segmentation, and thereby irregularities of the lighting luminance is decreased. Accordingly, the light source image segmentation sheet 15 may be regarded as a kind of diffusion sheet as well.

The polarization split section 24 is provided as an optical function section in the light radiation region 22A of the packaging film 20. The polarization split section 24 has a plurality of convex sections 24A that extend in one direction (for example, longitudinal direction of the diffusion plate 11) and are continuously arranged in parallel in the direction crossing the extending direction on at least one of the surface on the stack 10 side and the surface on the other side of the stack 10 side in the light radiation region 22A.

Each convex section 24A has, for example, as shown in FIG. 5, a triangle columnar shape having two inclined faces contacted with the apex angle. These inclined faces are arranged diagonally opposed to the face including the polarization split section 24. The width of each convex section 24 in the arrangement direction is, for example, in the range from 10 μm to 350 μm. The shape of each convex section 24A is not limited to the triangle columnar shape as shown in FIG. 5, but may be, for example, a polygonal columnar shape such as a pentagonal columnar shape, or a shape having a curved face shape such as an oval shape and an aspheric shape (for example, a cylindrical shape) in a direction orthogonal to the extending direction of each convex section 24A.

Further, the shape and the size of each convex section 24A are not necessarily identical with each other. For example, A: each space structure composed of two adjacent convex sections 24A having the same shape in which one thereof is higher (larger) and the other thereof is lower (smaller) may be arranged in line at equal distance in the arrangement direction. For example, B: each space structure composed of two adjacent convex sections 24A having the same height and different shape may be arranged in line at equal distance in the arrangement direction. For example, C: each space structure composed of two adjacent convex sections 24A having different shape and different size (height) may be arranged in line at equal distance in the arrangement direction. A plurality of convex sections and concave sections may be provided in the extending direction of each convex section 24A.

Thereby, each convex section 24A refracts and transmits a component in the arrangement direction of each convex section 24A out of light entering from the rear face side of the polarization split section 24 toward the direction crossing the lamination direction of the stack 10 to improve the directivity. In each convex section 24A, for a component in the extending direction of each convex section 24A out of the light entering from the rear face side of the polarization split section 24, light collection effect by refraction action of each convex section 24 is not significant.

In this embodiment, each convex section 24A has refractive index anisotropy in which the refractive index in one direction is larger than the refractive index in the direction orthogonal to the one direction. For example, the refractive index in the extending direction of each convex section 24A is larger than the refractive index in the arrangement direction of each convex section 24A. Otherwise, the refractive index in the extending direction of each convex section 24A is smaller than the refractive index in the arrangement direction of each convex section 24A.

The in-plane anisotropy of refractive index can be generated by stretching a sheet containing a semicrystalline or crystalline resin in one direction. The semicrystalline or crystalline resin includes a resin in which the refractive index in the stretching direction is larger than the refractive index in the direction orthogonal to the stretching direction, a resin in which the refractive index in the stretching direction is smaller than the refractive index in the direction orthogonal to the stretching direction and the like. As a material showing positive birefringence in which the refractive index in the stretching direction is large, for example, PET (polyethylene terephthalate), PEN (polyethylene naphthalate), a mixture thereof, a copolymer such as PET-PEN copolymer, polycarbonate, polyvinyl alcohol, polyester, polyvinylidene fluoride, polypropylene, polyamide and the like are cited. Meanwhile, as a material showing negative birefringence in which the refractive index in the stretching direction is small, for example, a methacryl resin, a polystyrene resin, styrene-methylmethacrylate copolymer, a mixture thereof and the like are cited.

The in-plane anisotropy of refractive index may be also generated by, for example, using a crystalline material having refractive index anisotropy. Further, to simplify the manufacturing steps, the entire polarization split section 24 is preferably made of the same material. However, for example, a material of each convex section 24A may be different from a material of the other regions.

Next, a description will be given of a function of the polarization split section 24 in the case that for the entire polarization split section 24, the refractive index in the extending direction of each convex section 24A is different from that in the arrangement direction of each convex section 24A.

Figure 6:
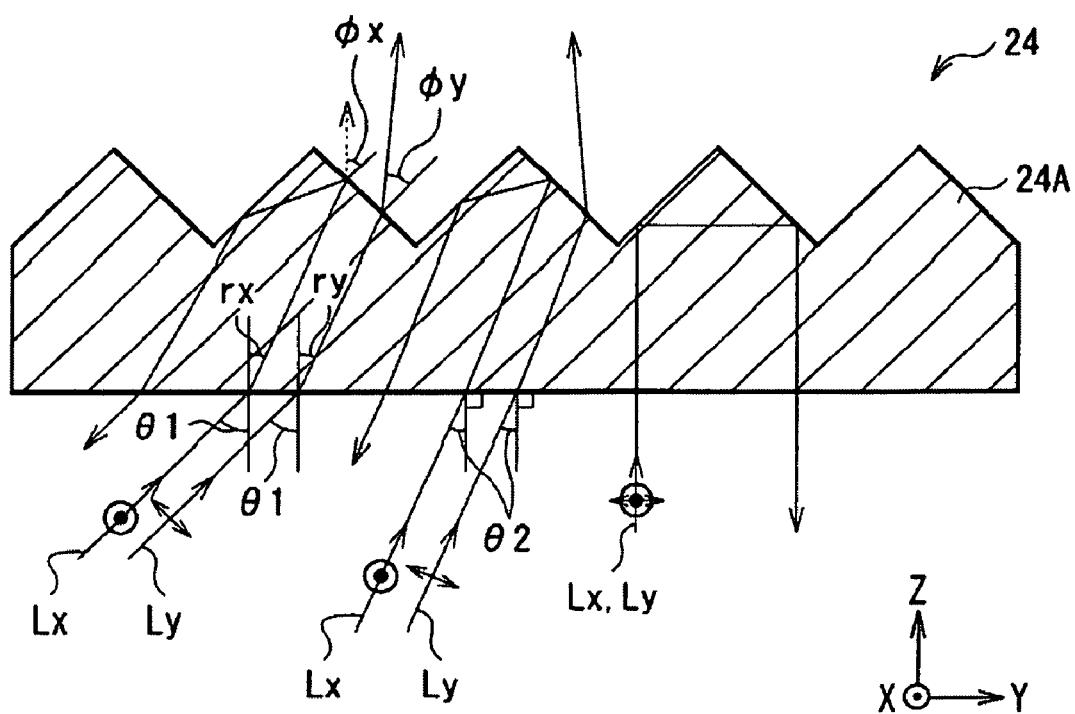
FIG. 6 is a conceptual diagram for explaining an action of the polarization split section of FIG. 4A and FIG. 4B.

FIG. 6 shows an example of a light path when light of the light source enters the rear face of the polarization split section 24 in the case that the entire polarization split section 24 is made of a material in which refractive index nx in the extending direction of each convex section 24A is larger than refractive index ny in the arrangement direction of each convex section 24A (nx>ny). In FIG. 6, Lx represents a polarization component oscillating in the extending direction (X direction) of each convex section 24A of the light from the light source, and Ly represents a polarization component oscillating in the arrangement direction (Y direction) of each convex section 24A of the light from the light source.

For light from the light source entering the face including the polarization split section 24 from a diagonal direction, the refractive index in the extending direction of each convex section 24A is different from the refractive index in the arrangement direction of each convex section 24A (nx>ny in FIG. 6). Thus, the X-direction polarization component Lx and the Y-direction polarization component Ly of the light from the light source are respectively refracted at different refractive angles rx and ry (rx<ry in FIG. 6) on the rear face of the polarization split section 24, and are respectively emitted from the surface of the polarization split section 24 (light transmission surface of each convex section 24A) at different emission angles φx and φy (φx>φy in FIG. 6).

At this time, in the polarization split section 24, the refractive index in the extending direction of each convex section 24A is different from the refractive index in the arrangement direction of each convex section 24A (nx>ny in FIG. 6). Thus, the respective polarization components oscillating in the respective directions are reflected at a reflectance different from each other on the interface such as the rear face of the polarization split section 24 and the light transmission surface of the convex section 24A. Therefore, as shown in FIG. 6, when the refractive index nx in the extending direction of each convex section 24A is larger than the refractive index ny in the arrangement direction of each convex section 24A in the entire polarization split section 24, the reflection amount of Lx is larger than the reflection amount of Ly. In the result, in the light transmitted through the polarization split section 24, the light amount of Ly is larger than the light amount of Lx.

Further, in the polarization split section 24, the refractive index in the extending direction of each convex section 24A is different from the refractive index in the arrangement direction of each convex section 24A (nx>ny in FIG. 6). Thus, the respective polarization components oscillating in the respective directions have an critical angle different from each other on the interface such as the rear face of the polarization split section 24 and the light incident surface of the convex section 24A. Therefore, as shown in the central part of FIG. 6, for light entering at a certain incident angle, when the angle at which the light enters the transmission surface is larger than the critical angle of Lx and smaller than the critical angle of Ly, Lx is totally reflected and Ly is transmitted on the light transmission surface. Thus, the polarization component Lx is totally reflected repeatedly on the light transmission surface of each convex section 24A to become returned light, and only the polarization component Ly can realize total polarization split state to be transmitted through the light transmission surface of each convex section 24A.

Further, if the incident angle of light from the light source in relation to the light transmission surface of each convex section 24A is excessively large, as shown in the right side of FIG. 6, the light from the light source is totally reflected repeatedly on the light transmission surface of each convex section 24A to become returned light back to the light source side regardless of the polarization state.

As described above, the polarization split section 24 has a certain polarization split action in addition to the light collection action. Thereby, light usage efficiency is more improved than in a case that the polarization split section 24 does not have the polarization split action and the on-axis luminance is improved.

Figure 7A:
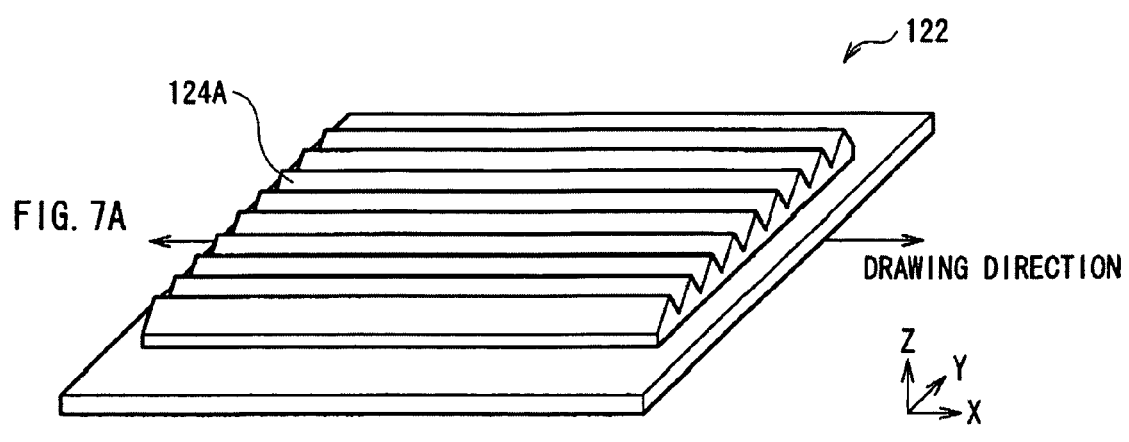
FIG. 7A and FIG. 7B are process drawings for explaining an example of a method of manufacturing the light emitting side film of FIG. 4A and FIG. 4B.
Figure 7B:
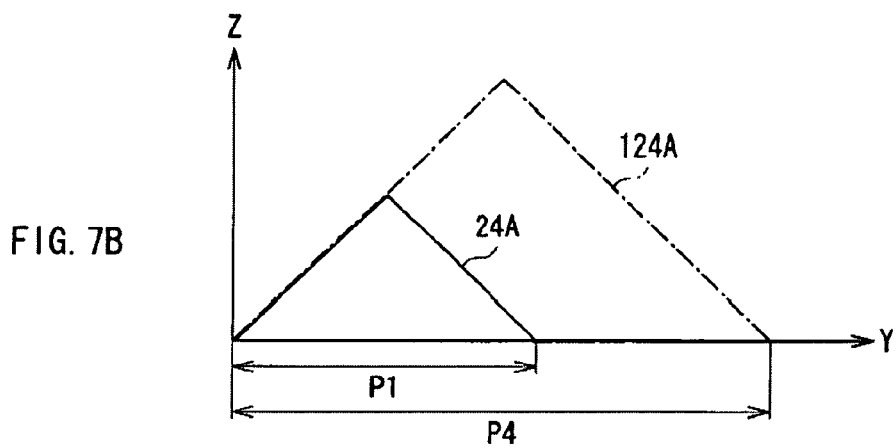

Next, a description will be given of an example of a method of forming the light emitting side film 22 including the polarization split section 24 of this embodiment with reference to FIG. 7A and FIG. 7B. FIG. 7A is a perspective view of a light emitting side film 122, and FIG. 7B is a cross section of a convex section 124A and the convex section 24A.

First, a plurality of convex sections 124A are formed on one face (front face) of a resin film made of, for example, a material showing positive birefringence at pitch P1. Thereby, the light emitting side film 122 having the plurality of convex sections 124A is formed on the front face.

The light emitting side film 122 may be formed by, for example, heat press method, melt extrusion processing or the like. Further, the light emitting side film 122 may be formed by using a flat resin sheet as a base and bonding the plurality of convex sections 124A to the front face of the flat resin sheet.

Figure 8:
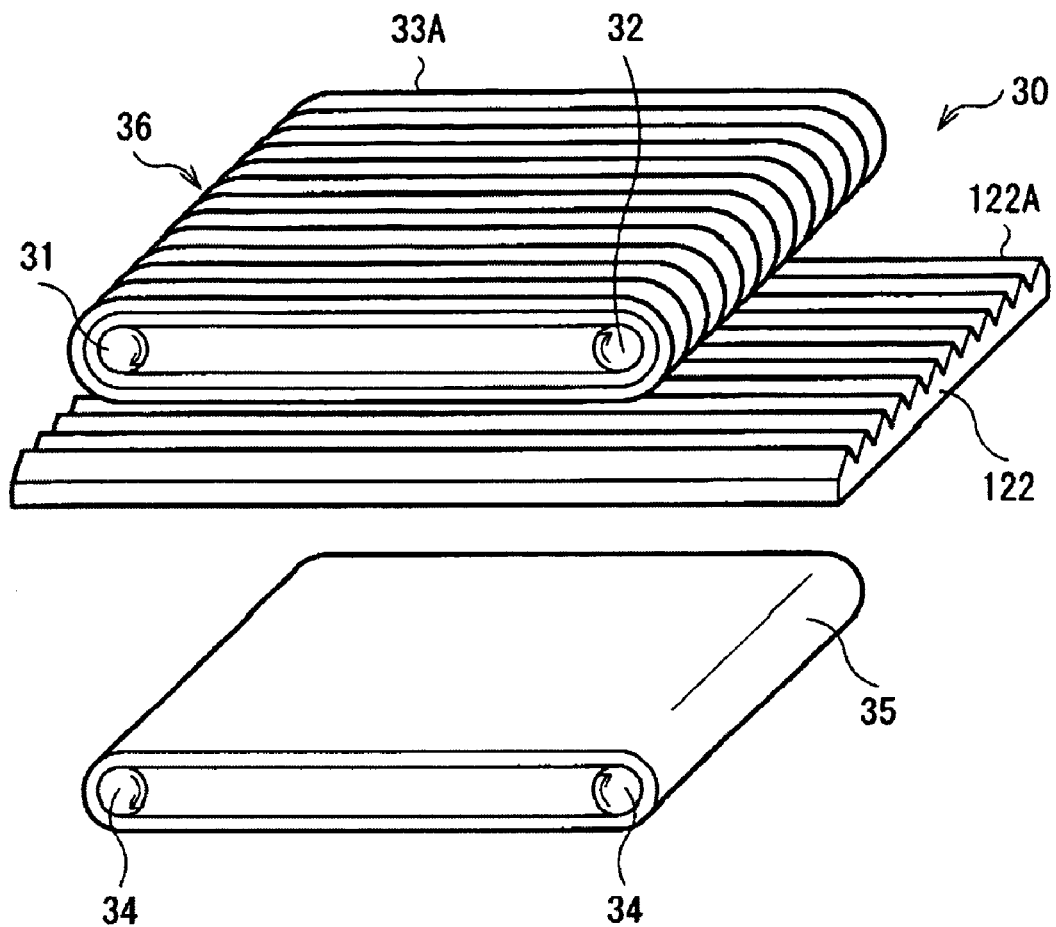
FIG. 8 is a schematic view for showing a structure example of a manufacturing equipment of the light emitting side film of FIG. 4A and FIG. 4B.
Figure 9:
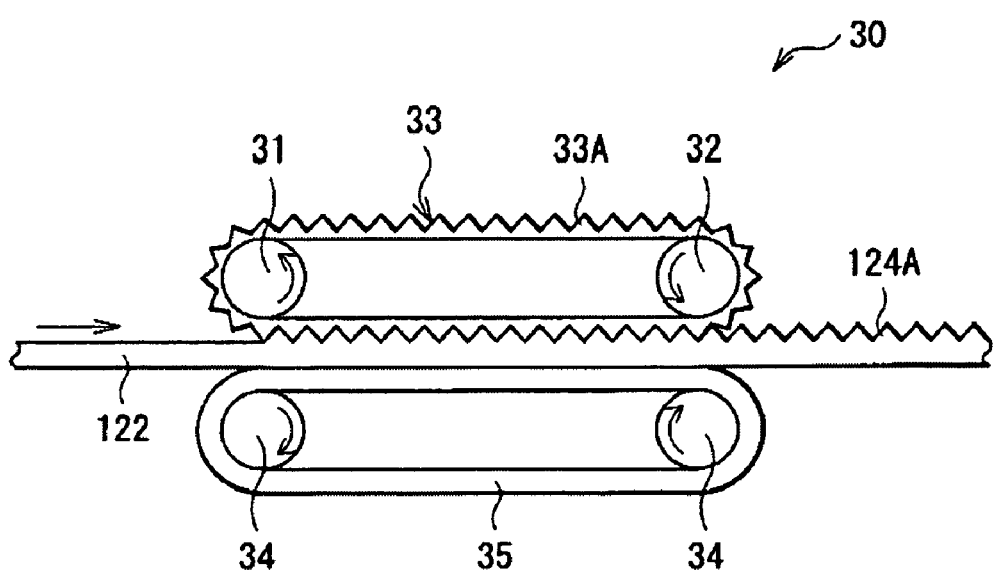
FIG. 9 is a schematic view showing another structure example of a manufacturing equipment of the light emitting side film of FIG. 4A and FIG. 4B.

Further, the light emitting side film 22 is preferably formed by using a sheet train 30 shown in FIG. 8. The sheet train 30 includes an emboss belt 33 rotated by a heating roll 31 and a cooling roll 32 and a flat belt 35 rotated by two pressing rolls 34 arranged opposite to the heating roll 31 and the cooling roll 32. The light emitting side film 122 in a state of amorphous before being provided with a shape can be inserted in a clearance between the emboss belt 33 having the plurality of convex sections 33A on the surface and the flat belt 35 without a steric shape. First, the emboss belt 33 and the flat belt 35 are rotated, and the light emitting side film 122 before being provided with a shape is inserted from the heating roll 31 side. The front face of the light emitting side film 122 is momentarily melted by heat of the heating roll 31 and a shape of the convex section 33A is transcribed on the front face of the light emitting side film 122. After that, the front face of the light emitting side film 122 transcribed with the shape of the convex section 33A is cooled by the cooling roll 32, and thereby the front face shape is fixed. The plurality of convex sections 124A may be thereby formed on the front face of the light emitting side film 122 as described above as well. By using this manufacturing method, the front face shape of the emboss belt 33 can be transcribed accurately (totally). Further, the base material section of the light emitting side film 22 and the convex section 22A can be formed integrally. The extending direction of the convex section 33A may be the rotational direction of the emboss belt 33 as shown in FIG. 8, or may be the direction crossing (orthogonal to) the rotational direction of the emboss belt 33 as shown in FIG. 9.

Next, the light emitting side film 122 is stretched in the extending direction of the convex section 124A (FIG. 7A). Thereby, the convex section 124A is stretched in the stretching direction to become the convex section 24A. In the case where the convex section 124A is made of, for example, a resin showing positive birefringence, the convex section 24A has refractive index anisotropy in which the refractive index in the extending direction is larger than the refractive index in the arrangement direction by being stretched.

At this time, as shown in FIG. 7B, pitch P2 of the convex section 24A is smaller than the pitch P1 of the convex section 124A. However, the cross sectional shape in the direction orthogonal to the stretching direction of the convex section 24A is homothetic to the cross sectional shape of the convex section 124A before being stretched. That is, it is found that in the case where the light emitting side film 122 is stretched in the extending direction of the convex section 124A, the optical characteristics originated from the cross sectional shape in the direction orthogonal to the stretching direction of the light emitting side film 22 after being stretched show little change from those of the light emitting side film 122 before being stretched. Thereby, the shape of the light emitting side film 22 after being stretched is controlled with good precision.

The light emitting side film 22 may be also formed by, for example, the following method.

Figure 10A:
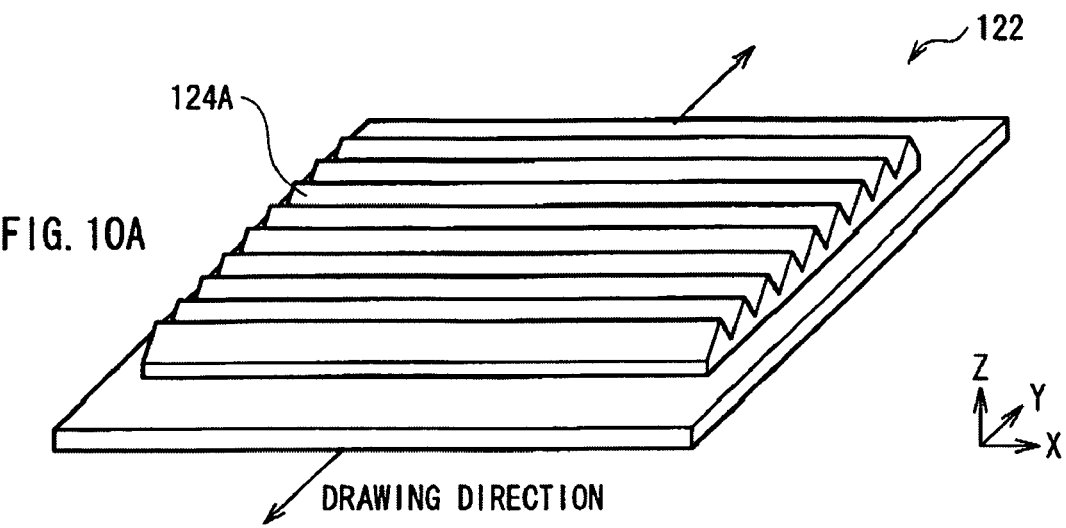
FIG. 10A and FIG. 10B are process drawings for explaining another example of a method of manufacturing the polarization split section of FIG. 4A and FIG. 4B.
Figure 10B:
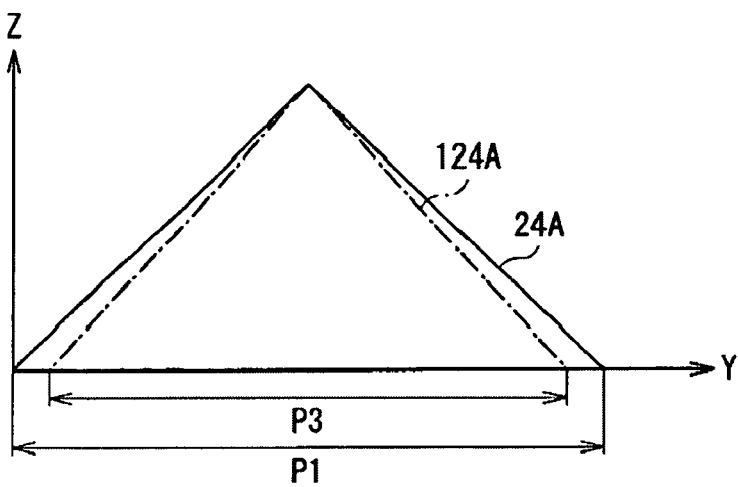

FIG. 10A is a perspective view of the light emitting side film 122, and FIG. 10B is cross section of the convex section 124A and the convex section 24A.

First, a plurality of convex sections 124A are formed on one face (front face) of a resin film made of, for example, a material showing negative birefringence at pitch P3. Thereby, the light emitting side film 122 having the plurality of convex sections 124A is formed on the front face. In this case, the light emitting side film 122 may be formed by using a method similar to the foregoing method.

Next, the light emitting side film 122 is stretched in the direction crossing (orthogonal to) the extending direction of the convex section 124A (FIG. 10A). Thereby, the convex section 124A is stretched in the stretching direction to become the convex section 24A. In the case where the convex section 124A is made of, for example, a resin showing negative birefringence, the convex section 24A has refractive index anisotropy in which the refractive index in the extending direction is larger than the refractive index in the arrangement direction by being stretched.

At this time, as shown in FIG. 10B, the pitch P2 of the convex section 24A is larger than the pitch P3 of the convex section 124A. That is, it is found that the cross sectional shape of the convex section 24A is a shape obtained by stretching the cross sectional shape of the convex section 124A in the stretching direction (arrangement direction), and thus when being stretched in the arrangement direction of the convex section 124A, the optical characteristics of the light emitting side film 22 after being stretched show slight change from those of the light emitting side film 122 before being stretched. Thereby, in this case, it is necessary to form the shape of the light emitting side film 122 before being stretched based on prediction of the shape of the light emitting side film 22 after being stretched.

Further, the light emitting side film 22 may be also formed by, for example, the following method.

Figure 11:
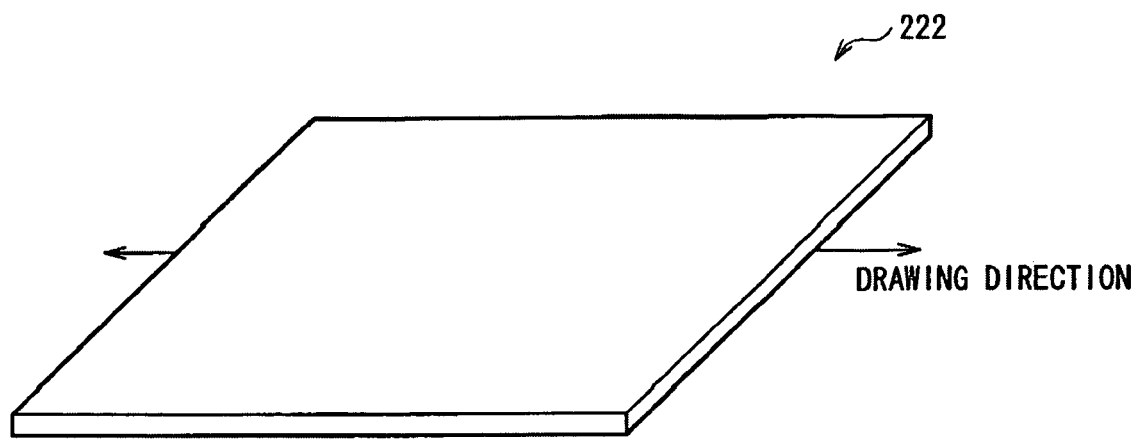
FIG. 11 is a process drawing for explaining still another example of a method of manufacturing the polarization split section of FIG. 4A and FIG. 4B.

FIG. 11 is a perspective view of a light emitting side film 222. First, the flat light emitting side film 222 made of, for example a material showing positive birefringence is stretched in one direction. Since the light emitting side film 222 is made of the resin showing positive birefringence, the entire light emitting side film 222 after being stretched has refractive index anisotropy in which the refractive index in the extending direction is larger than the refractive index in the arrangement direction by being stretched.

Next, the convex section 24A is formed on the front face of the light emitting side film 222 after being stretched by using the sheet train 30 shown in FIG. 8 or FIG. 9, and thereby the light emitting side film 22 is formed. First, the emboss belt 33 and the flat belt 35 are rotated, and the light emitting side film 222 is inserted from the heating roll 31 side. The front face of the light emitting side film 222 is momentarily melted by heat of the heating roll 31 and a shape of the convex section 33A is transcribed on the front face of the light emitting side film 222. After that, the front face of the light emitting side film 222 transcribed with the shape of the convex section 33A is cooled by the cooling roll 32, and thereby the front face shape is fixed. As described above, the light emitting side film 22 may be also formed after being stretched. By using this manufacturing method, the front face shape of the emboss belt 33 can be transcribed accurately (totally). Further, the base material section of the light emitting side film 22 and the convex section 22A can be formed integrally.

In the foregoing respective manufacturing methods, the light emitting side film may be stretched in the direction (sub-stretching direction) crossing (orthogonal to) the foregoing stretching direction (main stretching direction). However, in this case, each convex section 124A or the light emitting side film 22 is stretched in the main stretching direction at the first stretching ratio (for example, 300%) and is stretched in the sub-stretching direction at the second stretching ratio (several ten %) smaller than the first stretching ratio, and thereby the refractive index anisotropy is provided.

Each convex section 24A (optical function section) of the light emitting side film 22 formed by the foregoing respective manufacturing methods or the like is arranged opposite to the stack 10. The light emitting side film 22 and the light incidence side film 21 are layered with the stack 10 in between. After that, the light incidence side film 21 and the light emitting side film 22 are bonded by pressure bonding or the like. Subsequently, for example, the light incidence side film 21 and the light emitting side film 22 are applied with heat, are irradiated with energy rays such as an ultraviolet ray and an infrared ray, and thereby the light incidence side film 21 and the light emitting side film 22 are shrunk and contacted with the stack 10. Accordingly, the optical packaged body 3 is manufactured.

The optical packaged body 3 may be manufactured by the following method as well. Part of the light incidence side film 21 and the light emitting side film 22 is previously bonded by pressure bonding or the like. After that, the stack 10 is inserted between the light incidence side film 21 and the light emitting side film 22 in a state of, for example, being stretched in the stretching direction. The light incidence side film 21 and the light emitting side film 22 are returned to the original state (stretching is stopped), and the light incidence side film 21 and the light emitting side film 22 are contacted with the stack 10.

Next, a description will be given of an action in the optical packaged body 3 of this embodiment. When the light source is arranged on the light source image segmentation section 23 side of the optical packaged body 3 and unpolarized light is emitted from the light source toward the optical packaged body 3, the light from the light source is segmented into minute light beams by the light source image segmentation section 23, and a light source image obtained by the segmentation is diffused by the diffusion plate 11 and the diffusion sheet 12. Thereby, the in-plane luminance distribution becomes uniform. After that, the on-axis luminance of the diffused light is further increased by light collection action and polarization split action of the polarization split section 24, and then the light is emitted outside. Accordingly, the light from the light source is adjusted to light having a desired on-axis luminance, a desired in-plane luminance distribution, a desired view angle and the like.

In this embodiment, the stack 10 is covered with the packaging film 20 in a state of being applied with the shrinkage force as in the foregoing second embodiment. Thereby, a tensile stress (so-called tensile force) acts on a given region of the packaging film 20 in the in-plane direction of the packaging film 20. Thus, even if the thickness of the packaging film 20 is reduced down to, for example, about several 10 μm, generation of a wrinkle, deflection, and warpage is prevented in at least the light incidence region 21A and the light radiation region 22A in the packaging film 20. In the result, when the polarization split section 24 is provided in the light radiation region 22A in the packaging film 20, even if the thickness of the polarization split section 24 is thin such as about several 10 μm, there is no possibility that a wrinkle, deflection, and warpage are generated in the polarization split section 24. Thus, the polarization split section 24 provided in the light radiation region 22A in the packaging film 20 can be used instead of an optical sheet having a function similar to that of the polarization split section 24. In addition, compared to a case that the optical sheet having a function similar to that of the polarization split section 24 is provided in the packaging film 20, the thickness of the entire optical packaged body 3 is reduced. Further, the stack 10 is covered with the packaging film 20 in a state of being applied with the shrinkage force. Thus, adhesive contact to limit movement in the in-plane direction of each optical sheet covered with the packaging film 20 is not generated. Thereby, for each optical sheet covered with the packaging film 20, generation of a wrinkle, deflection, and warpage is prevented. Accordingly, in this embodiment, while generation of a wrinkle, deflection, and warpage is prevented, the thickness of the optical packaged body 3 can be reduced.

Modification of Third Embodiment

Figure 12:
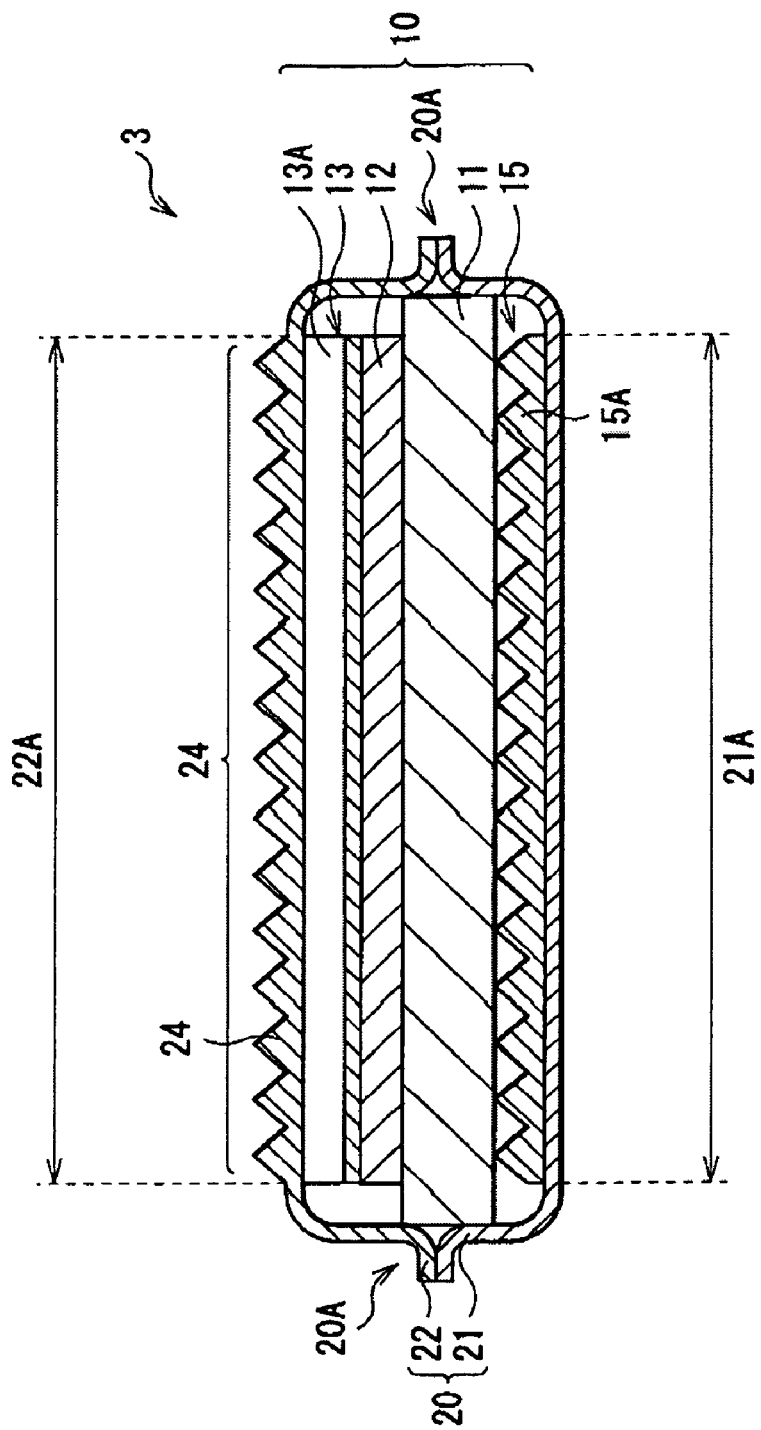
FIG. 12 is a cross section of a modification of the optical packaged body of FIG. 4A and FIG. 4B.
Figure 13:
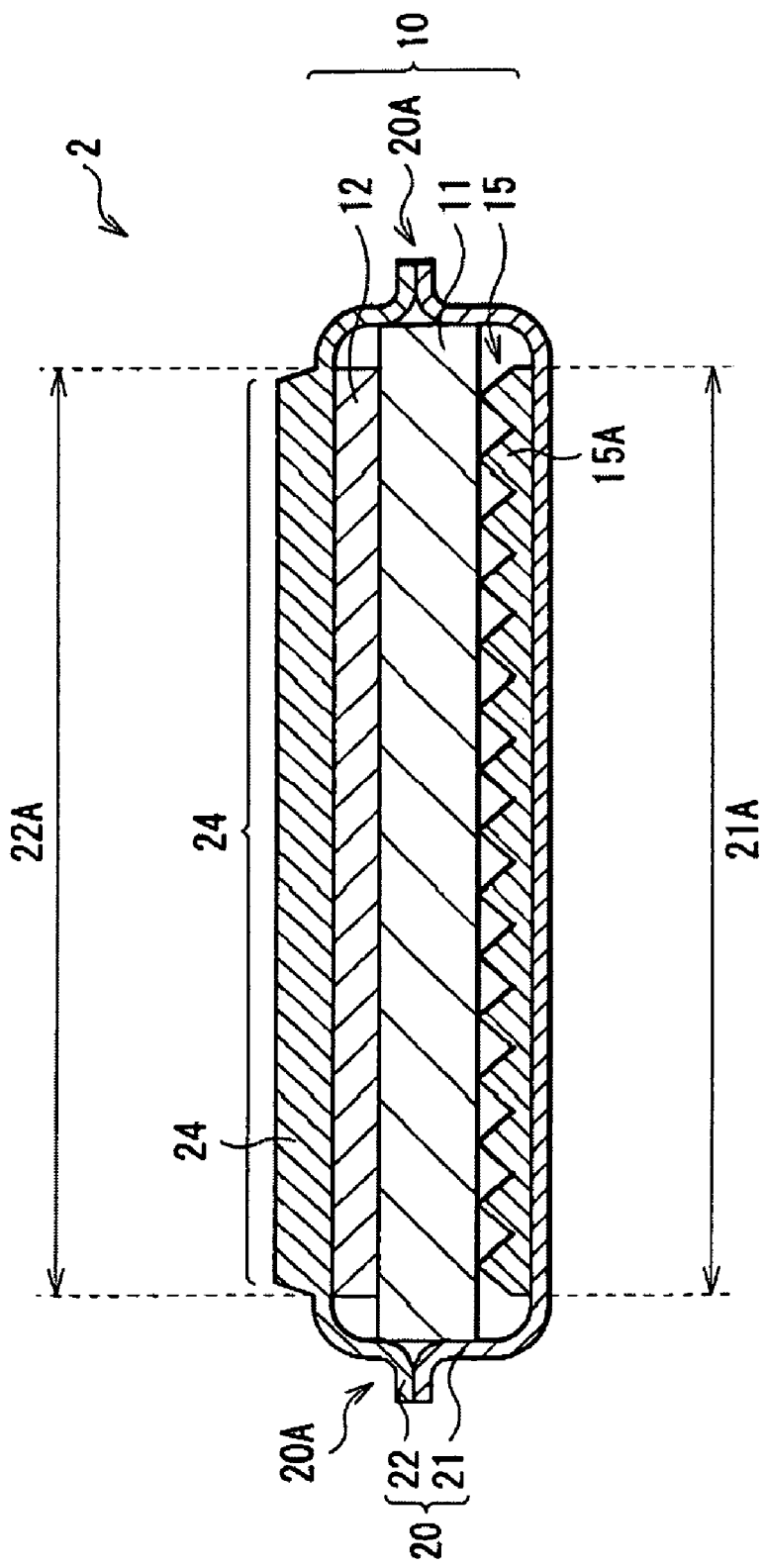
FIG. 13 is a cross section of another modification of the optical packaged body of FIG. 4A and FIG. 4B.

In the foregoing embodiment, the description has been given of the case that the stack 10 in which the light source image segmentation sheet 15, the diffusion plate 11, and the diffusion sheet 12 are sequentially layered toward the polarization split section 24 is covered with the packaging film 20 as an example. However, for example, as shown in FIG. 12, the lens film 13 may be arranged between the diffusion sheet 12 and the polarization split section 24. At this time, each convex section 13A of the lens film 13 preferably extends in the short direction of the diffusion plate 11 (direction orthogonal to the extending direction of the convex section 15A of the light source image segmentation sheet 15 and the convex section 24A of the polarization split section 24). Further, in the foregoing embodiment, the description has been given of the case that each convex section 24A extends in the extending direction of the convex section 15A as an example. However, for example, as shown in FIG. 13, each convex section 24A may extend in the direction orthogonal to the extending direction of the convex section 15A (for example, in the short direction of the diffusion plate 11).

Figure 14:
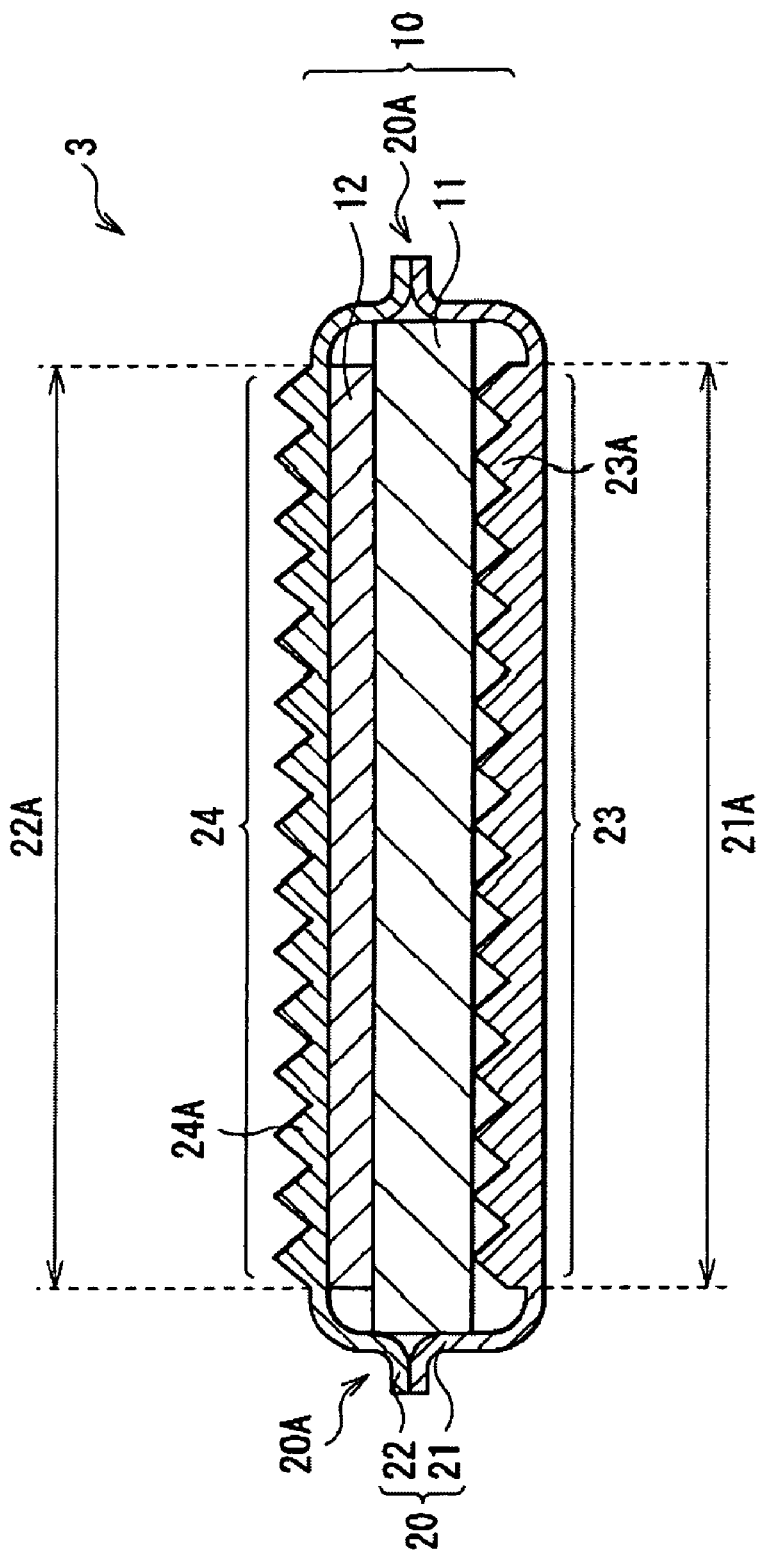
FIG. 14 is a cross section of still another modification of the optical packaged body of FIG. 4A and FIG. 4B.

Further, in the foregoing embodiment, the optical function section (polarization split section 24) is provided only in the light emitting side film 22 of the packaging film 20. However, the optical function section may be provided in the light incidence side film 21 of the packaging film 20. For example, as shown in FIG. 14, instead of the light source image segmentation sheet 15, the light source image segmentation section 23 may be provided in the light incidence side film 21. In this case, each convex section 24A may extend in the direction orthogonal to the extending direction of the convex section 23A (for example, in the short direction of the diffusion plate 11).

Fourth Embodiment

Next, a description will be given of a fourth embodiment of the invention.

Figure 15A:
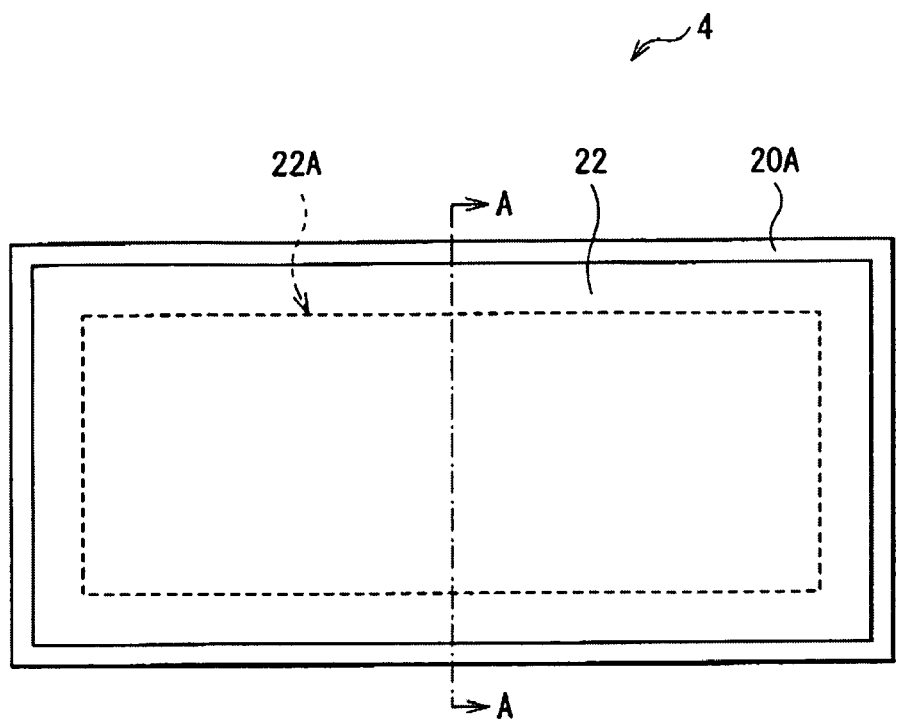
FIG. 15A and FIG. 15B are plan views showing an example of a top face structure and an example of a bottom face structure of an optical packaged body according to a fourth embodiment of the invention.
Figure 15B:
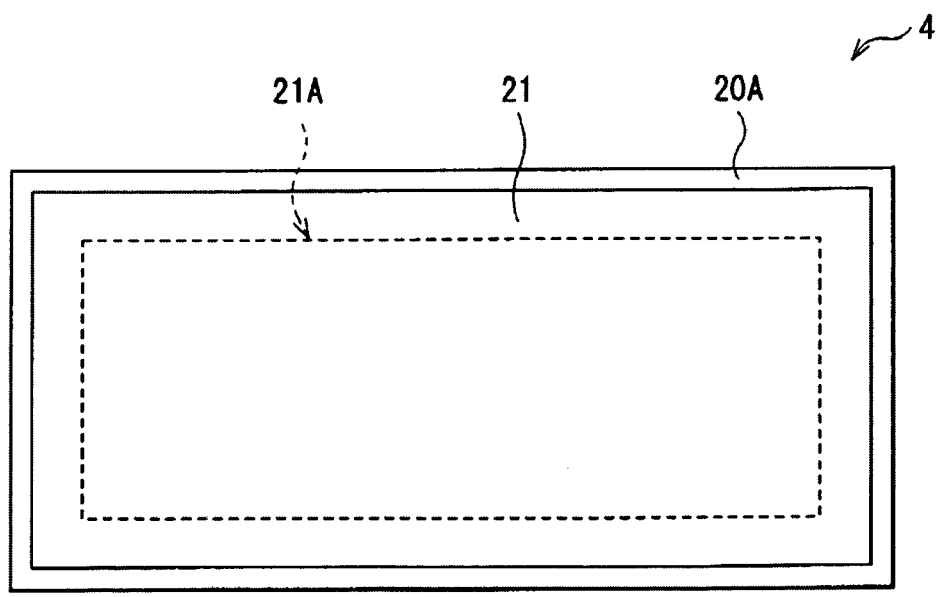
Figure 16:
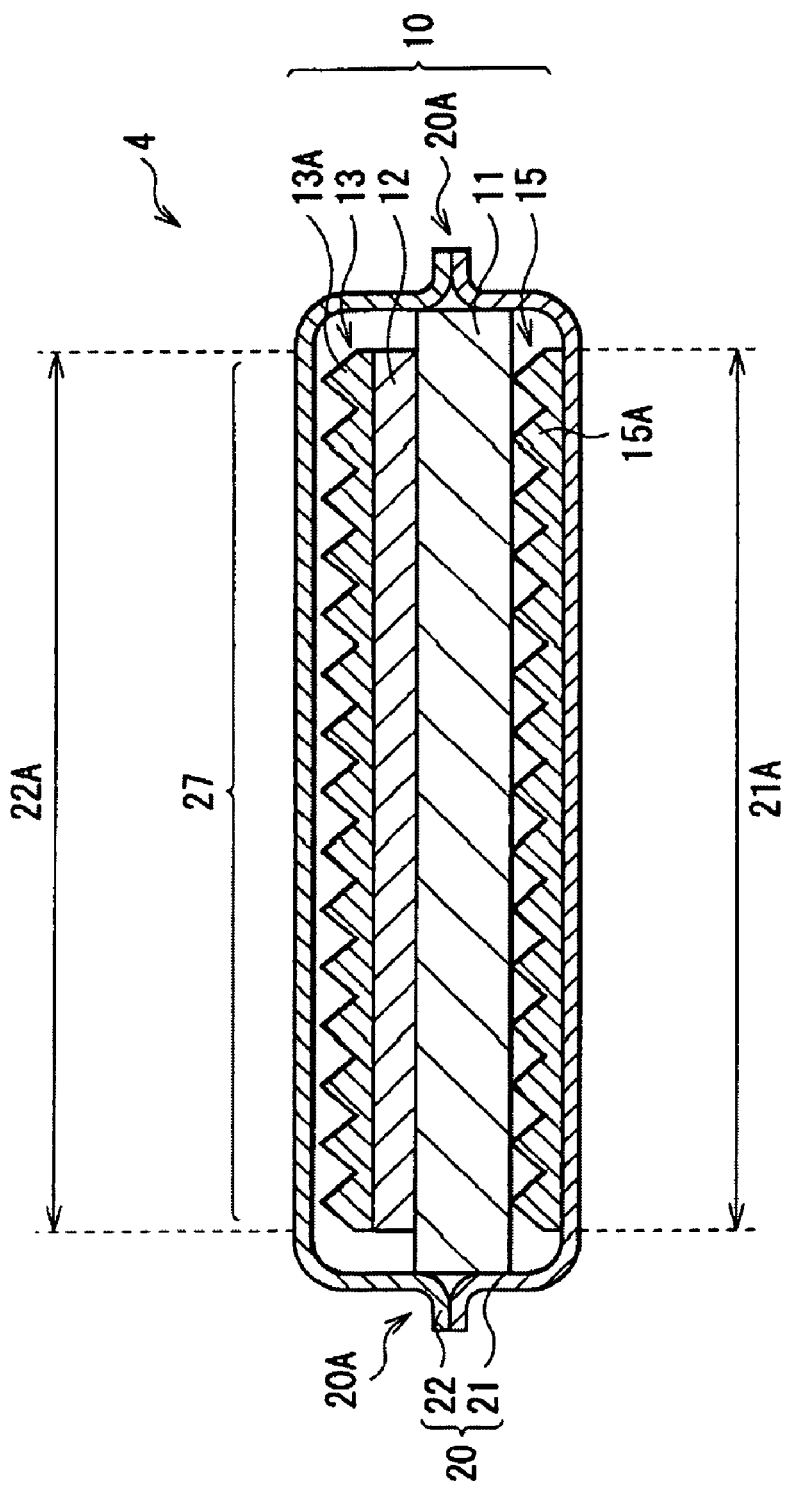
FIG. 16 is a cross section taken along arrow A-A of the optical packaged body of FIG. 15A and FIG. 15B.

FIG. 15A shows an example of a top face structure of an optical packaged body 4 according to the fourth embodiment of the invention. FIG. 15B shows an example of a bottom face structure of the optical packaged body 4 of FIG. 16A. FIG. 16 shows an example of a cross sectional structure taken along arrow A-A of the optical packaged body 4 of FIG. 16A. The optical packaged body 4 is different from the foregoing second embodiment in the following points. In the optical packaged body 4, a diffusion section 27 is provided in the light radiation region 22A of the light emitting side film 22, the light source image segmentation sheet 15 is provided between the diffusion plate 11 and the light incidence side film 21 instead of the light source image segmentation section 23, and the reflective polarizing sheet 14 is eliminated. Thus, a description will be hereinafter mainly given of the differences from the foregoing second embodiment, and a description for the points common to the foregoing embodiments will be omitted as appropriate.

Figure 17:
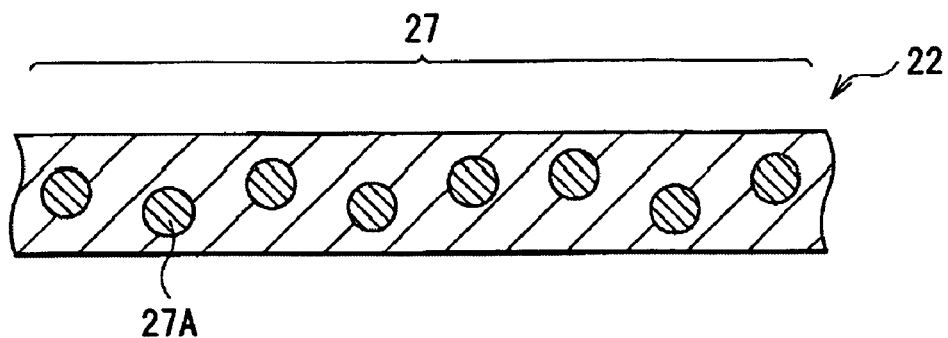
FIG. 17 is a cross section showing an example of the diffusion section of FIG. 16.

The diffusion section 27 is provided as an optical function section in the light radiation region 22A of the packaging film 20. For example, as shown in the enlarged view of FIG. 17, the diffusion section 27 has a structure in which a plurality of light diffusion materials 27A are contained in the light emitting side film 22 of the packaging film 20. The light diffusion material 27A is buried in the light emitting side film 22, and is dispersed over the entire layer in at least the light radiation region 22A. Therefore, in the diffusion section 27, the surface on the stack 10 side and the surface on the side opposite of the stack 10 side of the light emitting side film 22 are flat. The diffusion section 27 may be formed only in the light radiation region 22A, but may be formed in the entire light emitting side film 22.

The light diffusion material 27A is one or more fine particles made of a material having a refractive index different from the refractive index of the light emitting side film 22. As the fine particle, for example, at least one of an organic filler and an inorganic filler may be used. As a material of the organic filler, a material of the inorganic filler, a shape of the fine particle, and a diameter of the fine particle may be similar to those of the above-mentioned fine particle capable of being contained in the packaging film 20 of the foregoing first embodiment. In terms of transmission characteristics, a transparent organic filler as a fine particle is preferably used.

The light emitting side film 22 may be composed of a single layer or a plurality of layers. In the case where the light emitting side film 22 is composed of the plurality of layers, the light diffusion material 27A may be dispersed in any layer.

The optical packaged body 4 of this embodiment may be formed, for example, as follows. First, the diffusion section 27 of the light emitting side film 22 is arranged opposite to the stack 10. The light emitting side film 22 and the light incidence side film 21 are layered with the stack 10 in between. After that, the light incidence side film 21 and the light emitting side film 22 are bonded by pressure bonding or the like. Subsequently, for example, the light incidence side film 21 and the light emitting side film 22 are applied with heat, are irradiated with energy rays such as an ultraviolet ray and an infrared ray, and thereby the light incidence side film 21 and the light emitting side film 22 are shrunk and contacted with the stack 10. Accordingly, the optical packaged body 4 is manufactured. Otherwise, the optical packaged body 4 may be also manufactured as follows. Part of the light incidence side film 21 and the light emitting side film 22 is previously bonded by pressure bonding or the like. After that, the stack 10 is inserted between the light incidence side film 21 and the light emitting side film 22 in a state of, for example, being stretched, for example, in the stretching direction. The light incidence side film 21 and the light emitting side film 22 are returned to the original state (stretching is stopped), and the light incidence side film 21 and the light emitting side film 22 are contacted with the stack 10.

Next, a description will be given of an action in the optical packaged body 4 in this embodiment. When a light source is arranged on the light source image segmentation section 23 side of the optical packaged body 4 and unpolarized light is emitted from the light source toward the optical packaged body 4, the light from the light source is segmented into minute light beams by the light source image segmentation section 23, and a light source image obtained by the segmentation is diffused by the diffusion plate 11 and the diffusion sheet 12. Thereby, the in-plane luminance distribution becomes uniform. After that, the on-axis luminance is increased by light collection action of the lens film 13. The light collected by the lens film 13 is diffused by the diffusion section 27 and emitted outside.

In this embodiment, the stack 10 is covered with the packaging film 20 in a state of being applied with the shrinkage force as in the foregoing second embodiment. Thereby, a tensile stress (so-called tensile force) acts on a given region of the packaging film 20 in the in-plane direction of the packaging film 20. Thus, even if the thickness of the packaging film 20 is reduced down to, for example, about several 10 μm, generation of a wrinkle, deflection, and warpage can be prevented in at least the light incidence region 21A and the light radiation region 22A in the packaging film 20. In the result, when the diffusion section 27 is provided in the light radiation region 22A in the packaging film 20, even if the thickness of the diffusion section 27 is thin such as about several 10 μm, there is no possibility that a wrinkle, deflection, and warpage are generated in the diffusion section 27. Thus, the diffusion section 27 provided in the light radiation region 22A in the packaging film 20 can be used instead of an optical sheet having a function similar to that of the diffusion section 27. In addition, compared to a case that the optical sheet having a function similar to that of the diffusion section 27 is provided in the packaging film 20, the thickness of the entire optical packaged body 4 is reduced. Further, the stack 10 is covered with the packaging film 20 in a state of being applied with the shrinkage force. Thus, adhesive contact to limit movement in the in-plane direction of each optical sheet covered with the packaging film 20 is not generated. Thereby, for each optical sheet covered with the packaging film 20, generation of a wrinkle, deflection, and warpage is prevented. Accordingly, in this embodiment, while generation of a wrinkle, deflection, and warpage is prevented, the thickness of the optical packaged body 4 is reduced.

Modification of Fourth Embodiment

Figure 18A:
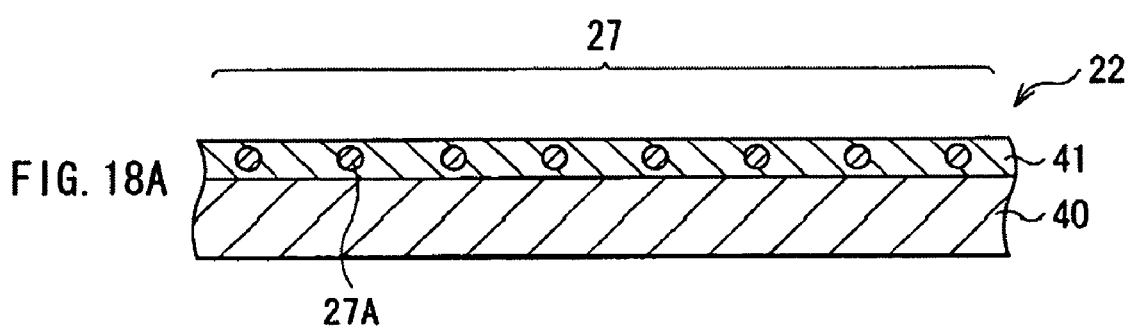
FIGS. 18A and 18B are cross sections showing another example of the diffusion section of FIG. 16.
Figure 18B:
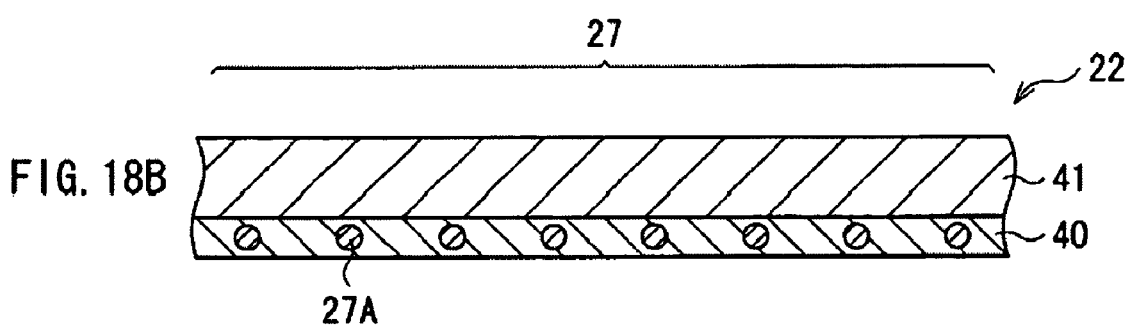

In the foregoing fourth embodiment, the light diffusion material 27A is scattered over the entire layer in at least the light radiation region 22A o in the single-layer light emitting side film 22. However, the light diffusion material 27A may be scattered locally in the surface layer of the light emitting side film 22. For example, as shown in FIG. 18A and FIG. 18B, the light diffusion material 27A may be scattered locally in the surface layer of the light emitting side film 22 as follows. The diffusion section 27 composed of a base material film 40 covering the top face side of the stack 10 and a transparent resin 41 that is contacted with the surface on the stack 10 side of the base material film 40 or the surface on the side opposite of the stack 10 side of the base material film 40, and contains the light diffusion material 27A is provided. The thickness of the transparent resin 41 is sufficiently increased than the diameter of the light diffusion material 27A. Thereby, the light diffusion material 27A may be scattered locally in the surface layer of the light emitting side film 22. The light emitting side film 22 having the foregoing structure may be formed by, for example, coating the base material film 40 with the thick transparent resin 41 containing the light diffusion material 27A, or by co-extruding a raw material of the base material film 40 and the transparent resin 41 containing the light diffusion material 27A.

As the foregoing transparent resin 41, a light transmissive thermoplastic resin, an energy ray cured resin (for example, an ultraviolet cured resin) or the like may be used. As the light transmissive thermoplastic resin, for example, a polyolefin resin such as polyethylene (PE) and polypropylene (PP), a polyester resin such as polyethylene terephthalate (PET) and polyethylene naphthalate (PEN), a vinyl binding system such as polystyrene (PS) and polyvinyl alcohol (PVA), a polycarbonate (PC) resin, a cycloolefin resin, a urethane resin, a vinyl chloride resin, a natural rubber resin, an artificial rubber resin, an acryl resin and the like may be used. As the ultraviolet cured resin, for example, a single body or a mixed resin of an acryl resin composed of a cured prepolymer, a monomer, and a photo initiator, polycarbonate, a urethane resin, an epoxy resin, a phenoxy resin, a vinyl chloride-vinyl acetate resin and the like are cited.

In the foregoing fourth embodiment and the foregoing modification, in the diffusion section 27, the surface on the stack 10 side of the light emitting side film 22 and the surface on the side opposite of the stack 10 side of the light emitting side film 22 are flat, but these surfaces may have a concave and convex shape. Specifically, the light diffusion material 27A is provided to be exposed on at least one of the surface on the stack 10 side of the light emitting side film 22 and the surface on the side opposite of the stack 10 side of the light emitting side film 22, or is provided in the extremely vicinity of at least one of the surface on the stack 10 side of the light emitting side film 22 and the surface on the side opposite of the stack 10 side of the light emitting side film 22. Thereby, the surface provided with the light diffusion material 27A is formed into a concave and convex shape (for example, semi-spherical concave shape). The concave and convex shape on the surface may be formed regularly or irregularly.

Figure 19A:
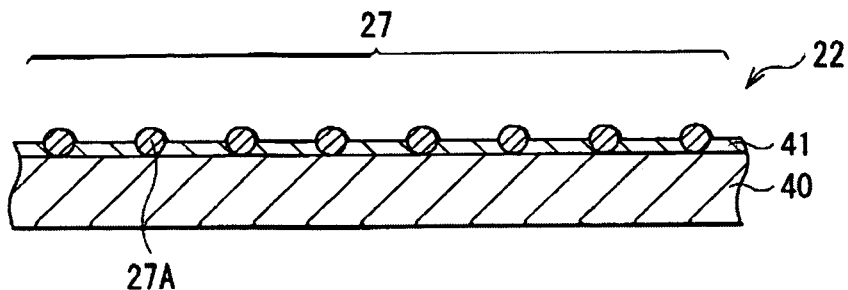
FIGS. 19A and 19B are cross sections showing still another example of the diffusion section of FIG. 16.
Figure 19B:
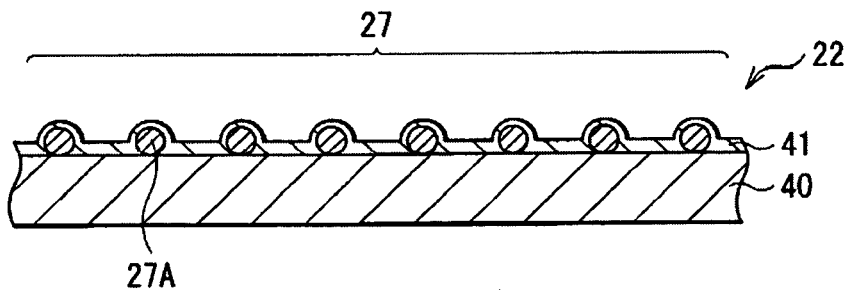
Figure 20:
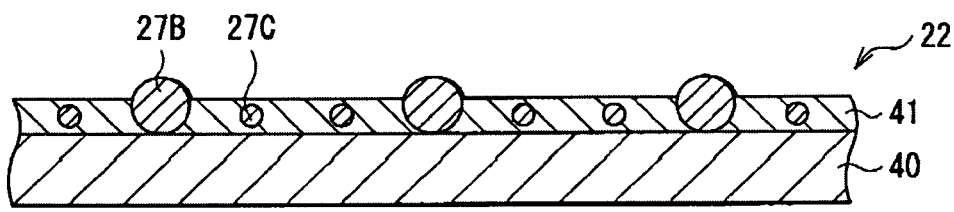
FIG. 20 is a cross section showing still another example of the diffusion section of FIG. 16.
Figure 21:
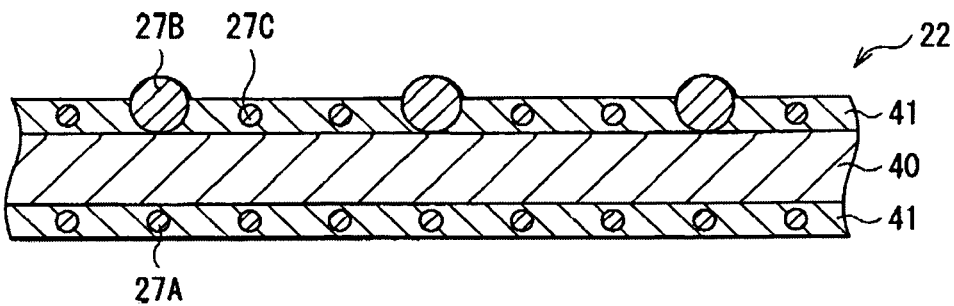
FIG. 21 is a cross section showing still another example of the diffusion section of FIG. 16.

For example, as shown in FIG. 19A and FIG. 19B, the diffusion section 27 composed of the base material film 40 covering the top face side of the stack 10 and the transparent resin 41 that is contacted with the base material film 40 and contains the light diffusion material 27A is provided. The thickness of the transparent resin 41 is equal to or smaller than the diameter of the light diffusion material 27A. Thereby, concave and convex is generated on the surface of the diffusion section 27. FIG. 19A and FIG. 19B show the spherical shape having shape isotropy. Further, FIG. 19B shows a case that a coat of the transparent resin 41 is generated on the surface of the diffusion section 27 and concave and convex are formed from the coat. Further, as shown in FIG. 20, it is possible that a light diffusion material 27B having a large particle diameter and a light diffusion material 27C having a small particle diameter are mixed with the transparent resin 41, and concave and convex are generated on the surface of the diffusion section 27 by the light diffusion material 27B having a large particle diameter. Further, as shown in FIG. 21, the transparent resin 41 containing the light diffusion material 27A or containing the light diffusion materials 27B and 27C are provided on the both faces of the base material film 40.

A material (refractive index) of the light diffusion material 27A may be equal to or different from a material (refractive index) of the transparent resin 41. The light emitting side film 22 having such a structure may be formed by, for example, coating the base material film 40 with the thin transparent resin 41 containing the light diffusion material 27A, or by coating the base material film 40 with the transparent resin 41 containing the light diffusion material 27A and then stretching the base material film 40 to thin the coated transparent resin 41.

Figure 22A:
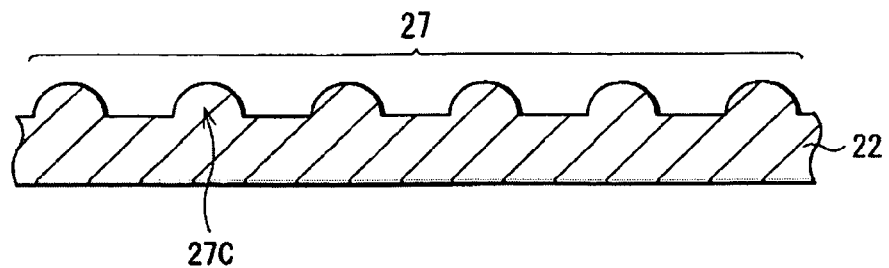
FIG. 22A and FIG. 22B are cross sections showing still another example of the diffusion section of FIG. 16.
Figure 22B:
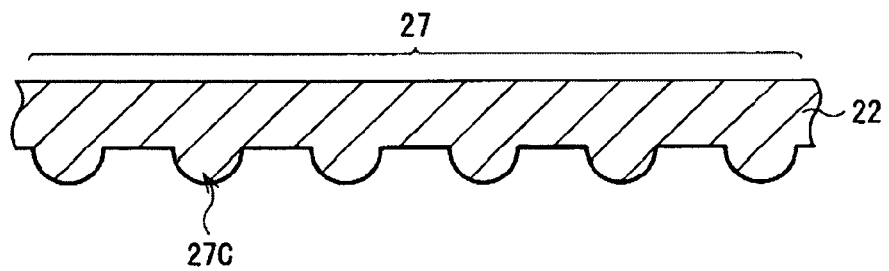
Figure 23A:
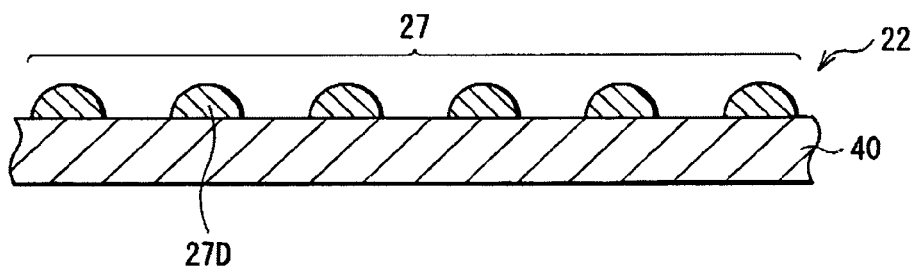
FIG. 23A and FIG. 23B are cross sections showing still another example of the diffusion section of FIG. 16.
Figure 23B:
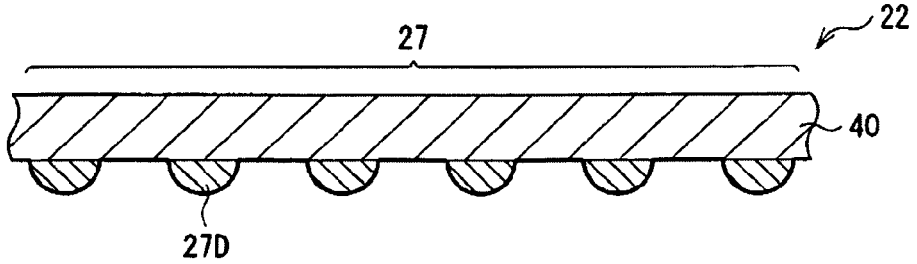

Further, concave and convex may be also generated on the surface without using the light diffusion material 27A. For example, it is possible that a shape of a master provided with a concave and convex shape is transcribed to a resin film by melt extrusion method, coextrusion method, injection molding method, lamination transcription method (manufacturing method using the sheet train 30 in FIG. 8 and FIG. 9) or the like. Thereby, as shown in FIG. 22A and FIG. 22B, the convex section 27C may be formed on at least one of the surface on the stack 10 side of the light emitting side film 22 and the surface on the side opposite of the stack 10 side of the light emitting side film 22. Further, for example, it is possible that after the base material film 40 is coated with the transparent resin 41, a master provided with a concave and convex shape (not shown) is pressed onto the transparent resin 41, and then the resultant is cooled or is irradiated with energy rays in such a state. Thereby, as shown in FIG. 23A and FIG. 23B, a plurality of convex sections 27D is formed on the base material film 40. As above, the concave and convex shape may be formed on the surface by using the master provided with the concave and convex shape. In these cases, it is possible to provide the convex sections 27C and 27D on the both faces of the light emitting side film 22. In the case where the packaging film 20 is provided with heat shrinkable, for example, a method capable of continuously forming a film that is integrally composed of a main component section and a concave and convex section such as melt extrusion method and lamination transcription method is preferably used. The lamination transcription method is more preferably used.

Figure 24:
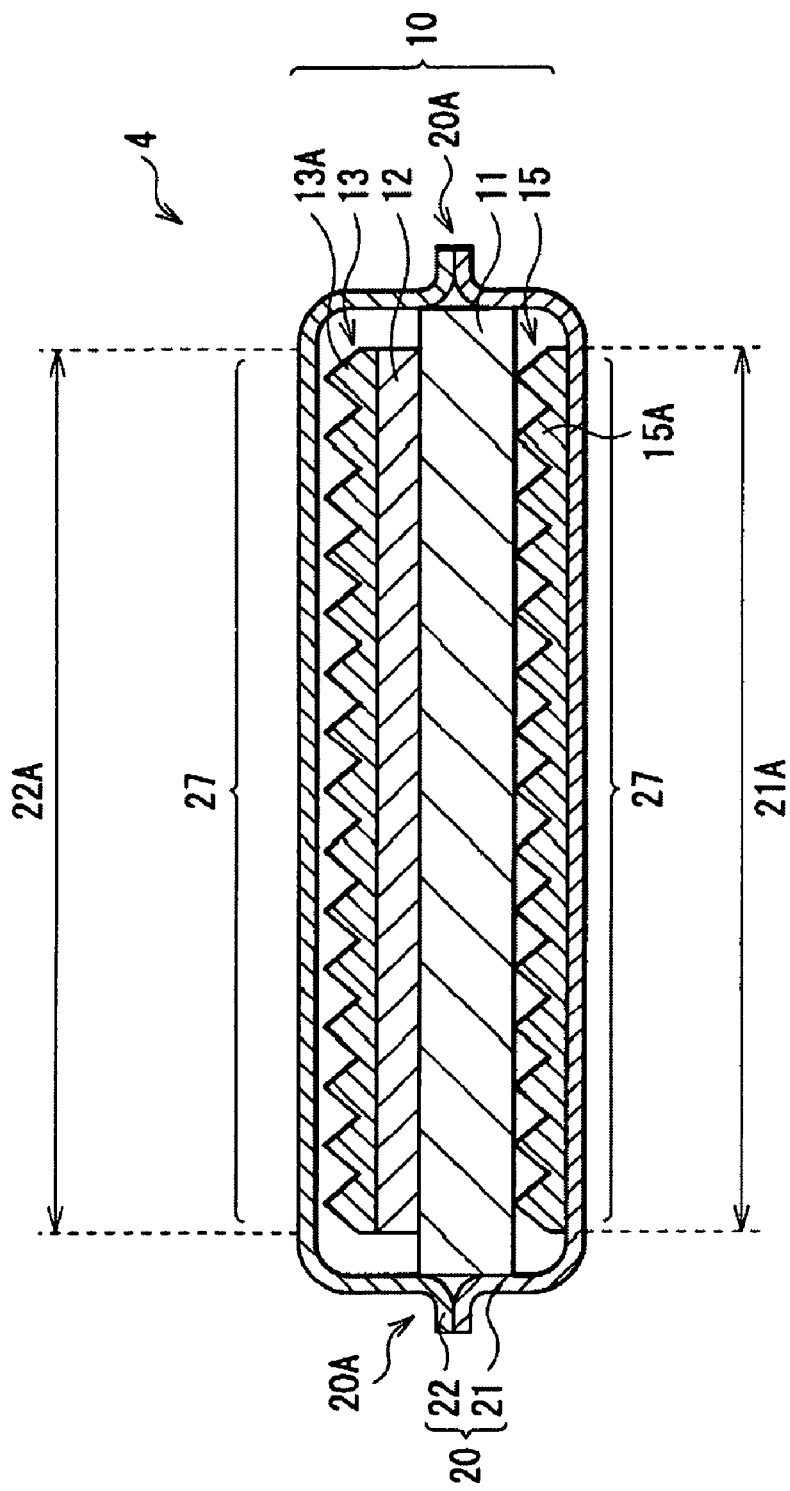
FIG. 24 is a cross section of a modification of the optical packaged body of FIG. 16.

Further, in the foregoing fourth embodiment, the optical function section (light diffusion section 27) is provided only in the light emitting side film 22. However, the optical function section may be also provided in the light incidence side film 21. For example, as shown in FIG. 24, the light diffusion section 27 may be also provided in the light incidence side film 21. At this time, for the light diffusion section 27 provided in the light incidence side film 21, the structure shown in FIG. 18A to FIG. 23B may be used. Further, the optical characteristics of the light diffusion section 27 on the light emitting side may be different from or identical with the optical characteristics of the light diffusion section 27 on the light incidence side. In the case where the respective optical characteristics are different from each other, respective light diffusion sections having characteristics according to respective purposes (demanded characteristics) on the light incidence side and on the light emitting side is applied, and thus the characteristics is optimized. On the contrary, in the case where the respective optical characteristics are identical with each other, the manufacturing process is simplified and the manufacturing cost is reduced. The light diffusion section 27 may be provided only in the light incidence side film 21.

Further, a function to generate a given phase difference may be provided for at least the light radiation region 22A in the light emitting side film 22 of the foregoing fourth embodiment. In this case, when the direction of the polarizing axis of light passing through the stack 10 does not correspond with the direction of the polarizing axis of the polarizing plate on the light incidence side of the liquid crystal panel provided on the light emitting side film 22 side of the optical packaged body 4, it is possible that the directions of the both polarizing axes are aligned to increase the light amount passing through the polarizing plate on the light incidence side of the liquid crystal panel.

Light that passes through the stack 10 and is emitted outside from the light emitting side film 22 side is not necessarily total polarized light, but it is enough that such light has polarization in relation to the polarizing axis of the polarizing plate on the light incidence side of the liquid crystal panel provided on the light emitting side film 22 side of the optical packaged body 4. That is, when the light amount in parallel with the transmissive axis of the foregoing polarizing plate is smaller than the light amount in parallel with the absorption axis of the foregoing polarizing plate, by generating a given phase difference, the light amount passing through the polarizing plate on the light incidence side of the liquid crystal panel can be increased.

To generate polarization in relation to the polarizing axis of the polarizing plate on the light incidence side of the liquid crystal panel provided on the light emitting side film 22 side of the optical packaged body 4, it is enough that at least one of the lens film 13, the reflective polarizing sheet 14, and the lens film 13 provided with stretching is included in the stack 10.

The phase difference value to be generated is not particularly limited. However, for example, in the case where the polarizing axis of light emitted from the stack 10 is shifted from the polarizing axis of the polarizing plate on the light incidence side of the liquid crystal panel by $\theta$ degree, it is preferable that the phase difference in the vicinity of $(\lambda/2) \times \sin(\theta/90)$ is generated in relation to the polarizing axis of the polarizing plate on the light incidence side of the liquid crystal panel for at least the light radiation region 22A in the light emitting side film 22. Further, it is desirable that the phase difference value is uniform in the entire light radiation region 22A of the packaging film 20 and the polarizing axis thereof is uniform in the entire light radiation region 22A of the packaging film 20.

In the case where the polarizing axis of light emitted from the stack 10 is shifted from the polarizing axis of the polarizing plate on the light incidence side of the liquid crystal panel by about 90 degree, it is preferable that the phase difference of about $(1/2)\lambda$ is generated in relation to the polarizing axis of the polarizing plate.

For example, the phase difference may be generated by a method using a phase difference generated in the course of stretching for generating shrinkage characteristics and the stretching properties in the optical packaged body 4, or by providing a birefringent material such as a nematic liquid crystal and an inorganic needle-like particle on the surface of the optical packaged body 4.

Fifth Embodiment

Next, a description will be given of a fifth embodiment of the invention.

Figure 25A:
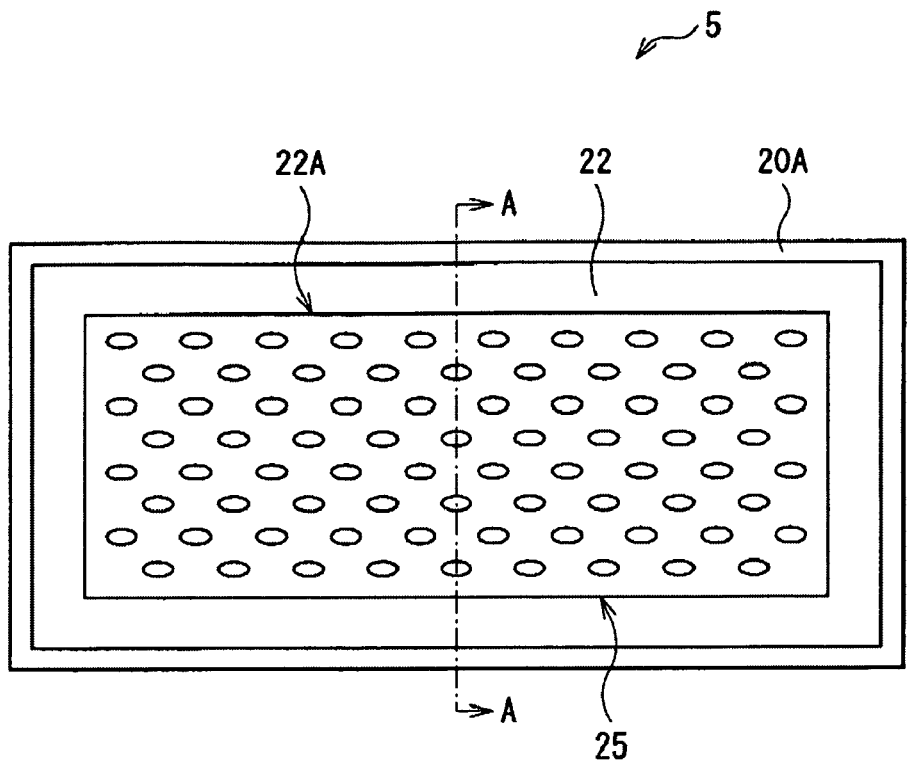
FIG. 25A and FIG. 25B are plan views showing an example of a top face structure and an example of a bottom face structure of an optical packaged body according to a fifth embodiment of the invention.
Figure 25B:
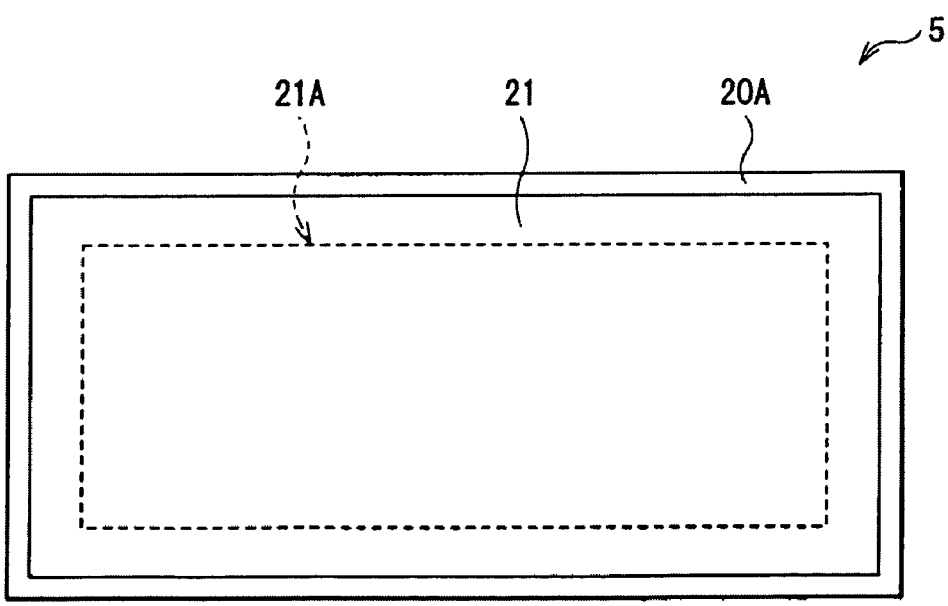
Figure 26:
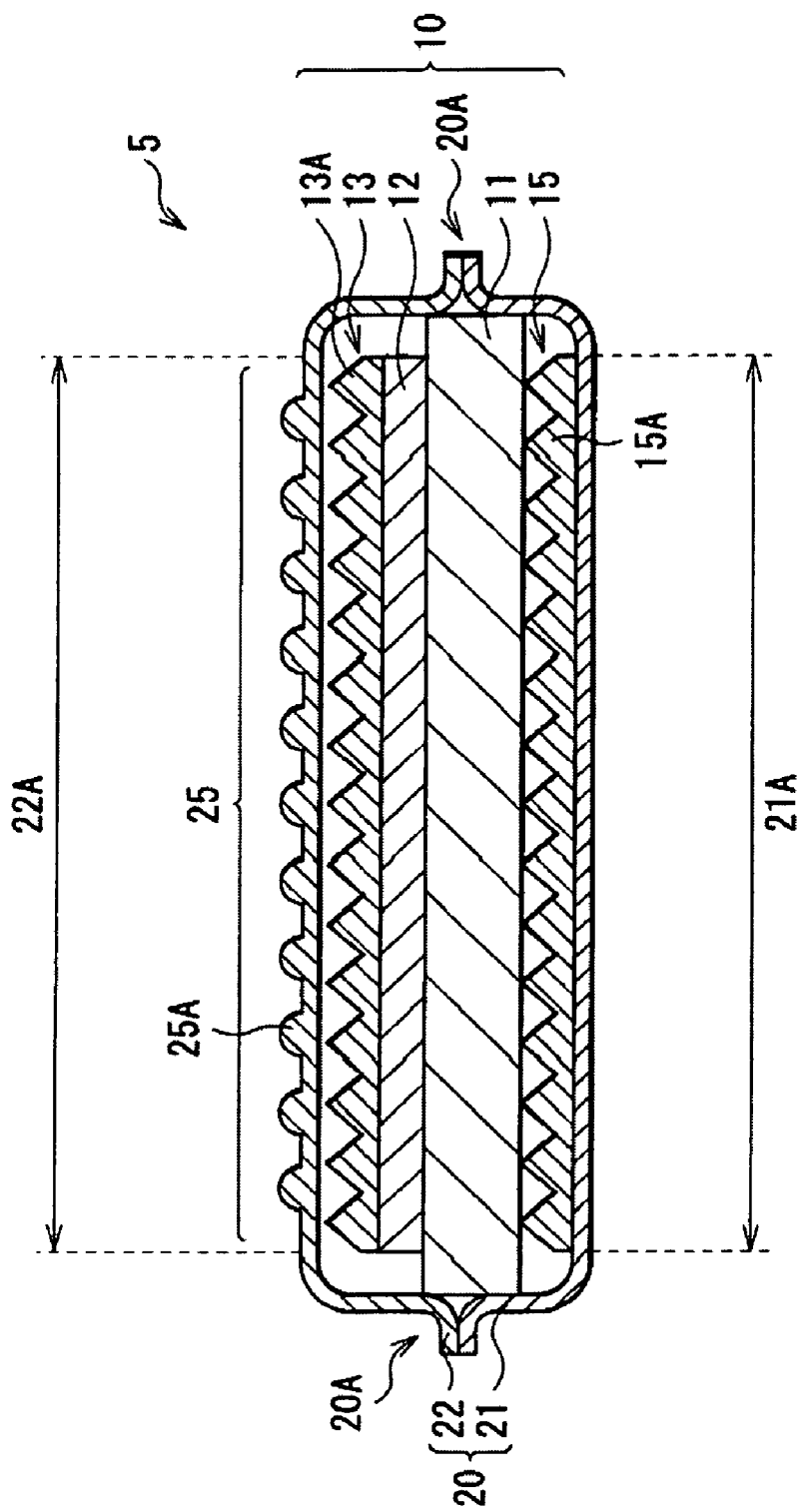
FIG. 26 is a cross section taken along arrow A-A of the optical packaged body of FIG. 25A and FIG. 25B.

FIG. 25A shows an example of a top face structure of an optical packaged body 5 according to the fifth embodiment of the invention. FIG. 25B shows an example of a bottom face structure of the optical packaged body 5 of FIG. 25A. FIG. 26 shows an example of a cross sectional structure taken along arrow A-A of the optical packaged body 5 of FIG. 25A. The optical packaged body 5 is different from the foregoing optical packaged body 2 of the second embodiment in the following points. In the optical packaged body 5, an anisotropic diffusion section 25 is provided in the light radiation region 22A of the packaging film 20, an optical sheet (the light source image segmentation sheet 16) having a function similar to that of the light source image segmentation section 23 is provided on the light source side than the diffusion plate 11 (between the diffusion plate 11 and the light incidence side film 21) instead of the light source image segmentation section 23, and the reflective polarizing sheet 14 is eliminated. Thus, a description will be hereinafter mainly given of the differences from the foregoing second embodiment, and a description for the points common to the foregoing embodiments will be omitted as appropriate.

The anisotropic diffusion section 25 is provided as an optical function section in the light radiation region 22A of the packaging film 20. The anisotropic diffusion section 25 has a plurality of convex sections 25A that extend and are arranged in series in one direction and that are arranged in series in the direction crossing the extending direction as well on at least one of the surface on the stack 10 side and the surface on the other side of the stack 10 in the light radiation region 22A.

For example, as shown in FIG. 25A and FIG. 26, it is preferable that each convex section 25A extends in the direction almost in parallel with the extending direction of each convex section 13A, and each convex section 25A has a columnar shape in which the length in the extending direction of each convex section 25A is shorter than the length in the extending direction of the convex section 13A. It is possible that each convex section 25A extends in the direction almost orthogonal to the extending direction of each convex section 13A, and each convex section 25A has a columnar shape in which the length in the extending direction of each convex section 25A is shorter than the length in the extending direction of the convex section 13A. Further, the width in the direction orthogonal to the extending direction of each convex section 25A, the width in the extending direction of each convex section 25A, the shape of each convex section 25A, the number of the convex section 25A, the haze value of each convex section 25A and the like are set according to the purpose thereof as appropriate. However, each convex section 25A is not necessarily arranged regularly, but may be arranged randomly.

Each convex section 25A may have a curved face shape (for example, cylindrical shape) such as oval shape and aspheric shape in the direction orthogonal to the extending direction of each convex section 25A as shown in FIG. 25A and FIG. 26. Otherwise, each convex section 25A may have a polygonal columnar shape having at least one or more plain faces in the direction orthogonal to the extending direction of each convex section 25A.

Further, the shape and the size of each convex section 25A are not necessarily identical with each other. For example, A: each space structure composed of two adjacent convex sections 25A having the same shape in which one thereof is higher (larger) and the other thereof is lower (smaller) may be arranged in line at equal distance in the arrangement direction. For example, B: each space structure composed of two adjacent convex sections 25A having the same height and different shape may be arranged in line at equal distance in the arrangement direction. For example, C: each space structure composed of two adjacent convex sections 25A having different shape and different size (height) may be arranged in line at equal distance in the arrangement direction. A plurality of convex sections and concave sections may be provided in the extending direction of each convex section 25A.

Thereby, each convex section 25A refracts and transmits a component in the direction orthogonal to the extending direction of each convex section 25A out of light entering the rear face side of the anisotropic diffusion section 25 toward the direction crossing the lamination direction of the stack 10 to modify the directivity. In each convex section 25A, for a component in the extending direction of each convex section 25A out of the light entering the rear face side of the anisotropic diffusion section 25, diffusion effect by refraction action of each convex section 25 is not significant. That is, in each convex section 25A, the haze degree has anisotropy due to the shape anisotropy of each convex section 25A.

In this embodiment, each convex section 25A has refractive index anisotropy in which the refractive index in one direction is larger than the refractive index in the direction orthogonal to the one direction. For example, the refractive index in the extending direction of each convex section 25A is larger than the refractive index in the direction orthogonal to the extending direction of each convex section 25A. Otherwise, the refractive index in the extending direction of each convex section 25A is smaller than the refractive index in the direction orthogonal to the extending direction of each convex section 25A. Thereby, light in the direction with the high refractive index is more reflected, the returned light thereof is recycled, and thereby light in the direction with the small refractive index is increased. Accordingly, transmissive characteristics of the light entering the anisotropic diffusion section 25 may be changed according to the polarization state. The recycle efficiency when each convex section 25A is provided on the light emitting side (front face) is better than that when each convex section 25A is provided on the light incidence side (rear face) in terms of the relation of the critical angle.

The in-plane anisotropy of refractive index may be generated by stretching a sheet containing semicrystalline or crystalline resin in one direction as in the polarization split section 24 in the foregoing third embodiment. The in-plane anisotropy of refractive index may be also generated by, for example, using a crystalline material having refractive index anisotropy. Further, to simplify the manufacturing process, the entire anisotropic diffusion section 25 is preferably made of the same material. However, for example, a material of each convex section 25A may be different from a material of the other regions.

Next, a description will be given of a function of the anisotropic diffusion section 25 in the case that in the entire anisotropic diffusion section 25, the refractive index in the extending direction of each convex section 25A is different from that in the arrangement direction of each convex section 25A.

Figure 27:
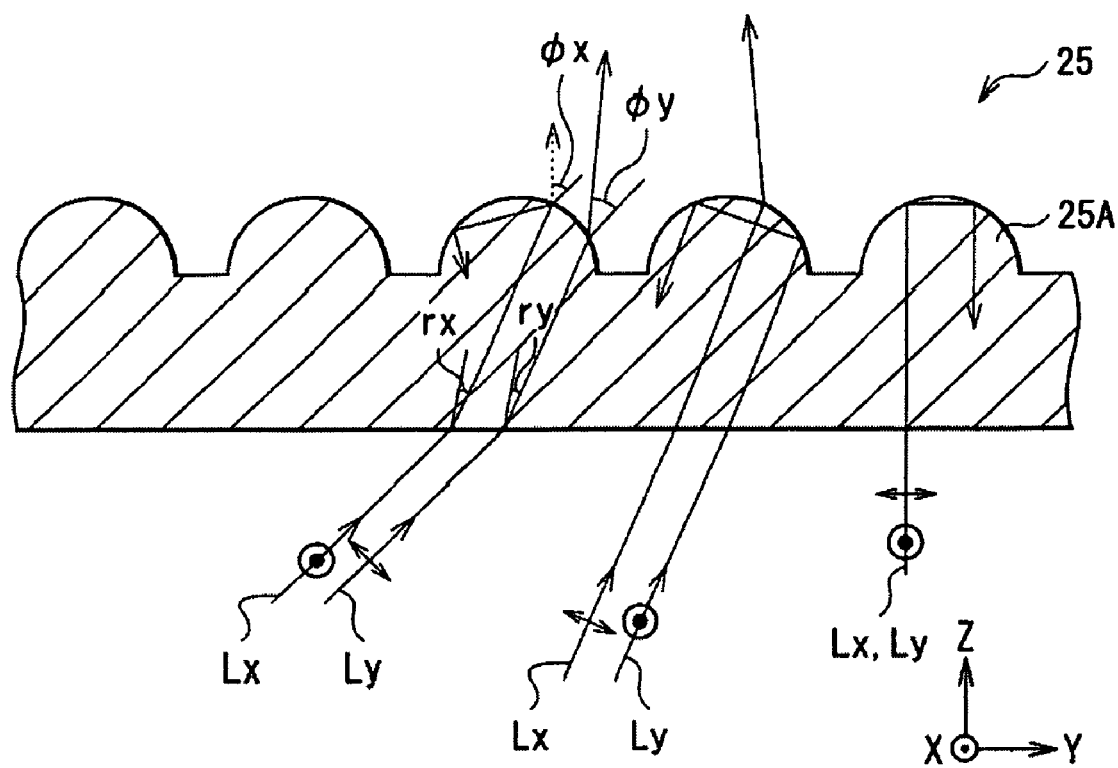
FIG. 27 is a conceptual diagram for explaining an action of the polarization split section of FIG. 25A and FIG. 25B.

FIG. 27 shows an example of a light path when light from the light source enters the rear face of the anisotropic diffusion section 25 in the case that the entire anisotropic diffusion section 25 is made of a material in which refractive index nx in the extending direction of each convex section 25A is larger than refractive index ny in the arrangement direction of each convex section 25A (nx>ny). In FIG. 27, Lx represents a polarization component oscillating in the extending direction (X direction) of each convex section 25A of the light from the light source, and Ly represents a polarization component oscillating in the arrangement direction (Y direction) of each convex section 25A of the light from the light source.

For light from the light source entering the face including the anisotropic diffusion section 25 from the diagonal direction, the refractive index in the extending direction of each convex section 25A is different from the refractive index in the direction orthogonal to the extending direction of each convex section 25A (nx>ny in FIG. 27). Thus, the X-direction polarization component Lx and Y-direction polarization component Ly of the light from the light source are respectively refracted at different refractive angles rx and ry (rx<ry in FIG. 27) on the rear face of the anisotropic diffusion section 25 (light incident surface of each convex section 25A), and are respectively emitted from the front face of the anisotropic diffusion section 25 at different radiation angles φx and φy (φx>φy in FIG. 27).

At this time, in the anisotropic diffusion section 25, the refractive index in the extending direction of each convex section 25A is different from the refractive index in the direction orthogonal to the extending direction of each convex section 25A (nx>ny in FIG. 27). Thus, the respective polarization components oscillating in the respective directions are reflected at a reflectance different from each other on the interface such as the front face and the rear face of the anisotropic diffusion section 25. Therefore, as shown in FIG. 27, in the case where the refractive index nx in the extending direction of each convex section 25A is larger than the refractive index ny in the arrangement direction of each convex section 25A in the entire anisotropic diffusion section 25 (case C), the reflection amount of Lx is larger than the reflection amount of Ly. In the result, in the light passing through the anisotropic diffusion section 25, the light amount of Ly is larger than the light amount of Lx. On the contrary, in the case where the refractive index ny in the direction orthogonal to the extending direction of each convex section 25A is larger than the refractive index nx in the extending direction of each convex section 25A in the entire anisotropic diffusion section 25 (case D), the reflection amount of Ly is larger than the reflection amount of Lx. In the result, in the light passing through the anisotropic diffusion section 25, the light amount of Lx is larger than the light amount of Ly.

Further, in case C, radiation angles of the respective polarization components Lx and Ly emitted from the front face of the anisotropic diffusion section 25 have the relation of φx>φy. Thus, when an incident angle of light entering the anisotropic diffusion section 25 satisfies a certain condition, as shown in the central part of FIG. 27, the polarization component Lx is totally reflected on the front face of the anisotropic diffusion section 25 to become returned light and only the polarization component Ly is transmitted through the front face of the anisotropic diffusion section 25 to realize a total polarization split state. On the contrary, in Case D, radiation angles of the respective polarization components Lx and Ly emitted from the front face of the anisotropic diffusion section 25 have the relation of φx<φy. Thus, when an incident angle of light entering the anisotropic diffusion section 25 satisfies a certain condition, the polarization component Ly is totally reflected on the front face of the anisotropic diffusion section 25 to become returned light and only the polarization component Lx is transmitted through the front face of the anisotropic diffusion section 25 to realize a total polarization split state.

Further, if the incident angle of light from the light source in relation to the front face of the anisotropic diffusion section 25 is excessively large, in the both case C and case D, as shown in the right side of FIG. 27, the light from the light source is totally reflected on the front face of the anisotropic diffusion section 25 to become returned light back to the light source side regardless of the polarization state.

As described above, the anisotropic diffusion section 25 has a certain polarization split action in addition to light diffusion action. The anisotropic diffusion section 25 may be formed in the same manner as that of the polarization split section 24 in the foregoing third embodiment.

Next, a description will be given of an action in the optical packaged body 5 in this embodiment. When a light source is arranged on the light source image segmentation sheet 15 side of the optical packaged body 5 and unpolarized light is emitted from the light source toward the optical packaged body 5, the light from the light source is segmented into minute light beams by the light source image segmentation sheet 15, and a light source image obtained by the segmentation is diffused by the diffusion plate 11 and the diffusion sheet 12. Thereby, the in-plane luminance distribution becomes uniform. After that, the on-axis luminance is increased by light collection action of the lens film 13, the in-plane luminance distribution of the light collected by the lens film 13 is further uniformed by light diffusion action and polarization split action of the anisotropic diffusion section 25 and then is emitted outside. Accordingly, the light from the light source is adjusted to light having a desired on-axis luminance, a desired in-plane luminance distribution, a desired view angle and the like.

In this embodiment, the stack 10 is covered with the packaging film 20 in a state of being applied with the shrinkage force as in the foregoing second embodiment. Thereby, a tensile stress (so-called tensile force) acts on a given region of the packaging film 20 in the in-plane direction of the packaging film 20. Thus, even if the thickness of the packaging film 20 is reduced down to, for example, about several 10 μm, generation of a wrinkle, deflection, and warpage is prevented in at least the light incidence region 21A and the light radiation region 22A in the packaging film 20. In the result, in the case where the anisotropic diffusion section 25 is provided in the light radiation region 22A in the packaging film 20, even if the thickness of the anisotropic diffusion section 25 is thin such as about several 10 μm, there is no possibility that a wrinkle, deflection, and warpage are generated in the anisotropic diffusion section 25. Thus, the anisotropic diffusion section 25 provided in the light radiation region 22A in the packaging film 20 can be used instead of an optical sheet having a function similar to that of the anisotropic diffusion section 25. In addition, compared to a case that an optical sheet having a function similar to that of the anisotropic diffusion section 25 is provided in the packaging film 20, the entire thickness of the optical packaged body 5 is reduced. Further, the stack 10 is covered with the packaging film 20 in a state of being applied with the shrinkage force. Thus, adhesive contact to limit movement in the in-plane direction of each optical sheet covered with the packaging film 20 is not generated. Thereby, for each optical sheet covered with the packaging film 20, generation of a wrinkle, deflection, and warpage is prevented. Accordingly, in this embodiment, while generation of a wrinkle, deflection, and warpage is prevented, the thickness of the optical packaged body 5 is reduced.

Modification of Fifth Embodiment

In the foregoing fifth embodiment, the optical function section (anisotropic diffusion section 25) is provided only in the light emitting side film 22. However, the optical function section may be also provided in the light incidence side film 21. For example, the diffusion section 27 may be provided in the light incidence side film 21, or instead of the light source image segmentation sheet 15, the light source image segmentation section 23 may be provided in the light incidence side film 21.

Sixth Embodiment

Next, a description will be given of a fifth embodiment of the invention.

Figure 28A:
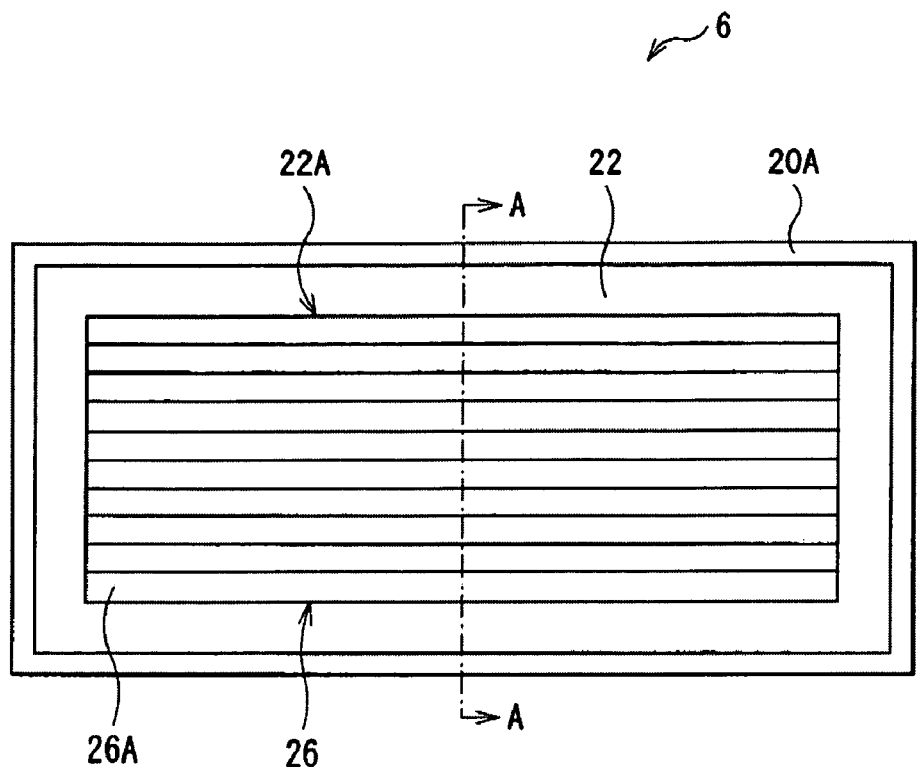
FIG. 28A and FIG. 28B are plan views showing an example of a top face structure and an example of a bottom face structure of an optical packaged body according to a sixth embodiment of the invention.
Figure 28B:
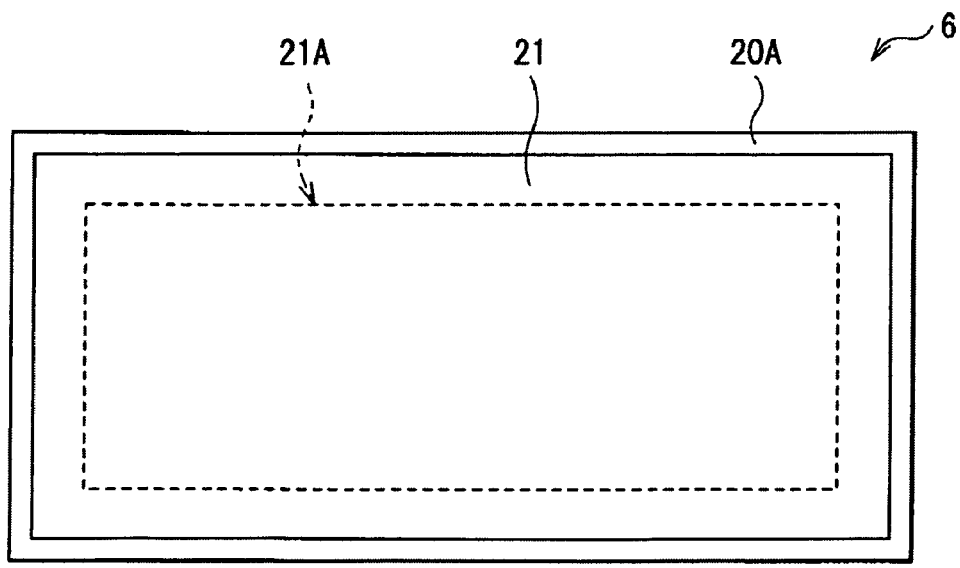
Figure 29:
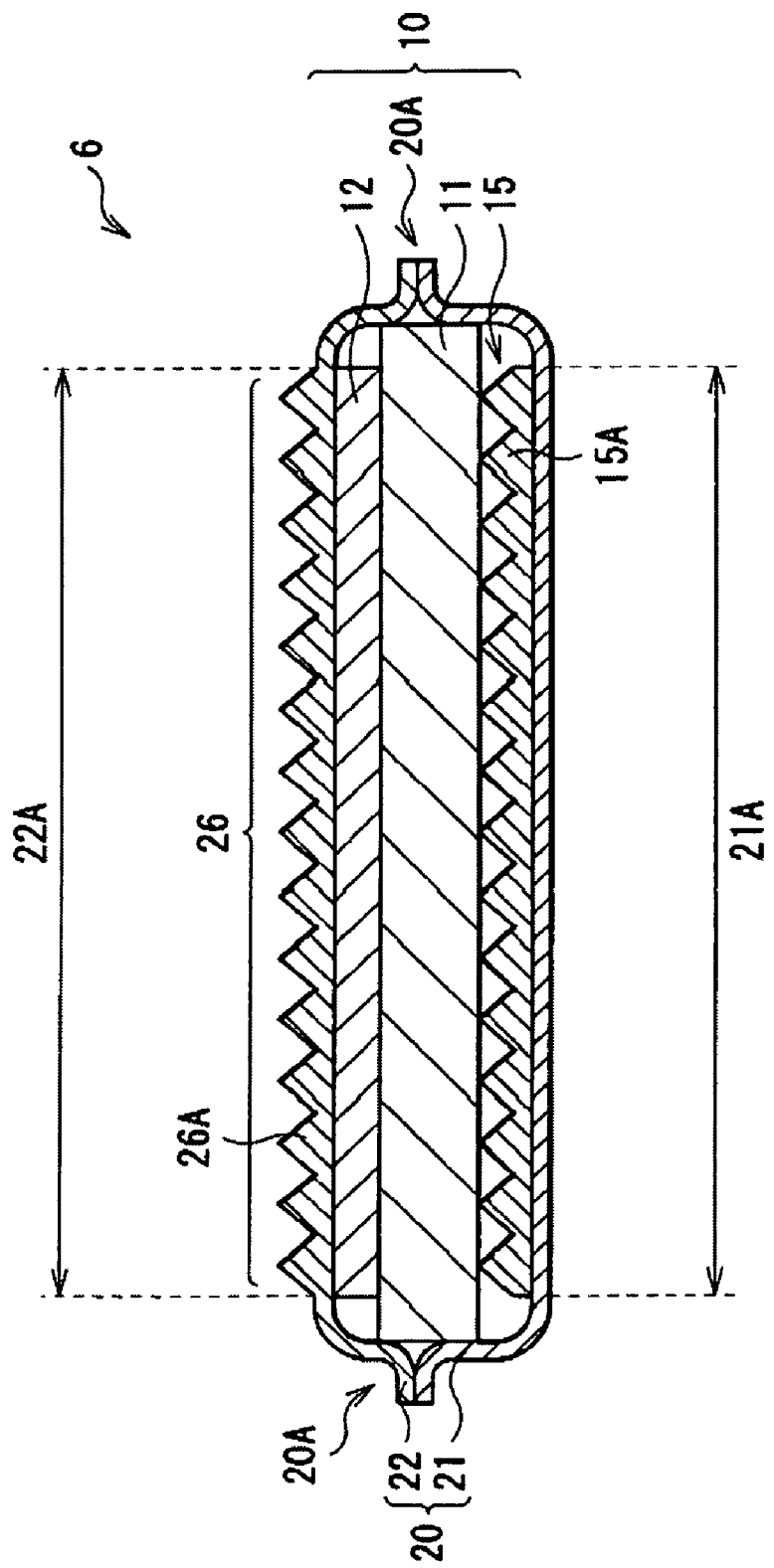
FIG. 29 is a cross section taken along arrow A-A of the optical packaged body of FIG. 28A and FIG. 28B.

FIG. 28A shows an example of a top face structure of an optical packaged body 6 according to the sixth embodiment of the invention. FIG. 28B shows an example of a bottom face structure of the optical packaged body 6 of FIG. 28A. FIG. 29 shows an example of a cross sectional structure taken along arrow A-A of the optical packaged body 6 of FIG. 28A. The optical packaged body 6 is different from the foregoing optical packaged body 2 of the second embodiment in the following points. In the optical packaged body 6, a light collection section 26 is provided in the light radiation region 22A of the packaging film 20, an optical sheet (light source image segmentation sheet 16) having a function similar to that of the light source image segmentation section 23 is provided on the light source side than the diffusion plate 11 (between the diffusion plate 11 and the light incidence side film 21) instead of the light source image segmentation section 23, and the reflective polarizing sheet 14 is eliminated. Thus, a description will be hereinafter mainly given of the differences from the foregoing embodiments, and a description for the points common to the foregoing embodiments will be omitted as appropriate. Since the light source image segmentation sheet 15 has been already explained in the foregoing second embodiment, the description thereof will be omitted.

Figure 30:
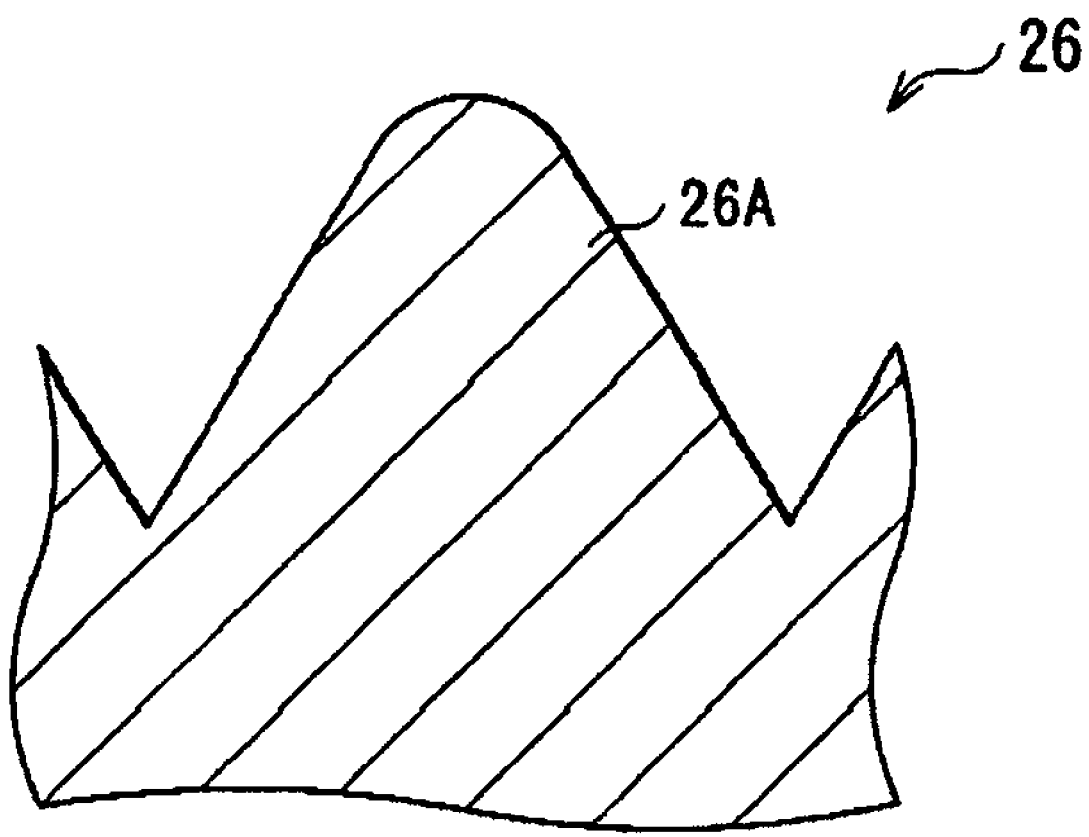
FIG. 30 is cross section of another example of the light collection section of FIG. 29.

The light collection section 26 is provided as an optical function section in the light radiation region 22A of the packaging film 20. The light collection section 26 has a plurality of convex sections 26A that extend in one direction (for example, in the longitudinal direction of the diffusion plate 11) and are continuously arranged in parallel sequentially in the direction crossing the extending direction on at least one of the surface on the stack 10 side and the surface on the other side of the stack 10 in the light radiation region 22A. In the case where a plurality of linear light sources are arranged in parallel directly under the stack 10, it is preferable that each convex section 26A is arranged so that the extending direction of each convex section 26A is in parallel with the extending direction of the linear light sources. However, each convex section 26A may be arranged to cross the extending direction of each linear light source in a range allowable based on optical characteristics. Each convex section 26A has, for example, as shown in FIG. 29, a triangle columnar shape having 2 inclined faces contacted with the apex angle. These inclined faces are arranged diagonally opposed to the face including the light collection section 26. The width of each convex section 26A in the arrangement direction is, for example, in the range from 10 μm to 350 μm. The shape of each convex section 26A is not limited to the triangle columnar shape as shown in FIG. 29, but may be, for example, a polygonal columnar shape such as a pentagonal columnar shape. Otherwise, as shown in FIG. 30, the shape of each convex section 26A may be a polygonal columnar shape having a curved face projecting in the projection direction of the convex section 26A at the apex of each convex section 26A.

Thereby, the light collection section 26 refracts and transmits a component in the arrangement direction of each convex section 26A out of light entering from the bottom face side toward the lamination direction of the stack 10 to increase the directivity.

In the case where a liquid crystal panel (polarizer) exists in a position that is outside of the optical packaged body 6 and is in proximity to the light radiation region 22A, the phase difference of the light emitting side film 22 is preferably small to decrease luminance irregularities as described in the foregoing second embodiment. Further, it is desirable that the phase difference value is uniform in the entire light radiation region 22A of the packaging film 20, and the polarizing axis thereof is uniform in the entire light radiation region 22A of the packaging film 20.

Next, a description will be given of an action in the optical packaged body 6 in this embodiment. When a light source is arranged on the light source image segmentation sheet 15 side of the optical packaged body 6 and unpolarized light is emitted from the light source toward the optical packaged body 6, the light from the light source is segmented into minute light beams by the light source image segmentation sheet 15, and a light source image obtained by the segmentation is diffused by the diffusion plate 11 and the diffusion sheet 12. Thereby, the in-plane luminance distribution becomes uniform. After that, the on-axis luminance of the light transmitted through the diffusion sheet 12 is improved by light collection action of the light collection section 26 and then is emitted outside.

Accordingly, the light from the light source is adjusted to light having a desired on-axis luminance, a desired in-plane luminance distribution, a desired view angle and the like.

In this embodiment, the stack 10 is covered with the packaging film 20 in a state of being applied with the shrinkage force as in the foregoing second embodiment. Thereby, a tensile stress (so-called tensile force) acts on a given region of the packaging film 20 in the in-plane direction of the packaging film 20. Thus, even if the thickness of the packaging film 20 is reduced down to, for example, about several 10 μm, generation of a wrinkle, deflection, and warpage is prevented in at least the light incidence region 21A and the light radiation region 22A in the packaging film 20. In the result, when the light collection section 26 is provided in the light radiation region 22A in the packaging film 20, even if the thickness of the light collection section 26 is thin such as about several 10 μm, there is no possibility that a wrinkle, deflection, and warpage are generated in the light collection section 26. Thus, the light collection section 26 provided in the light radiation region 22A in the packaging film 20 can be used instead of an optical sheet having a function similar to that of the light collection section 26. In addition, compared to a case that the optical sheet having a function similar to that of the light collection section 26 is provided in the packaging film 20, the thickness of the entire optical packaged body 6 is reduced. Further, the stack 10 is covered with the packaging film 20 in a state of being applied with the shrinkage force. Thus, adhesive contact to limit movement in the in-plane direction of each optical sheet covered with the packaging film 20 is not generated. Thereby, for each optical sheet covered with the packaging film 20, generation of a wrinkle, deflection, and warpage is prevented. Accordingly, in this embodiment, while generation of a wrinkle, deflection, and warpage is prevented, the thickness of the optical packaged body 6 is reduced.

Modification of Sixth Embodiment

In the foregoing sixth embodiment, the optical function section (light collection section 26) is provided only in the light emitting side film 22. However, the optical function section may be also provided in the light incidence side film 21. For example, the diffusion section 27 may be provided in the light incidence side film 21, or instead of the light source image segmentation sheet 15, the light source image segmentation section 23 may be provided in the light incidence side film 21. Further, in the foregoing embodiment, the case in which each convex section 26A extends in the extending direction of the convex section 15A has been shown. However, for example, each convex section 26A may extend in the direction orthogonal to the extending direction of the convex section 15A (for example, in the short direction of the diffusion plate 11).

Further, in the foregoing sixth embodiment, the light collection section 26 is provided in the light radiation region 22A of the packaging film 20 instead of the lens film 13. However, the light collection section 26 may be provided together with the lens film 13. However, in this case, the extending direction of the convex section 13A of the lens film 13 preferably crosses the extending direction of the convex section 26A of the light collection section 26, and the extending direction of the convex section 13A of the lens film 13 is more preferably orthogonal to the extending direction of the convex section 26A of the light collection section 26

Modification of the Foregoing Respective Embodiments

In the foregoing respective embodiments, the packaging film 20 is formed by layering the light incidence side film 21 and the light emitting side film 22 with the lamination body 10 (or the diffusion plate 11) in between, bonding the outer circumferential region of the region in which the light incidence side film 21 and the light emitting side film 22 are opposed to the stack 10 (or the diffusion plate 11) viewed from the lamination direction (or the normal line direction) of the stack 10 (or the diffusion plate 11) by pressure bonding or the like. However, the packaging film 20 may be formed by other method.

Figure 31:
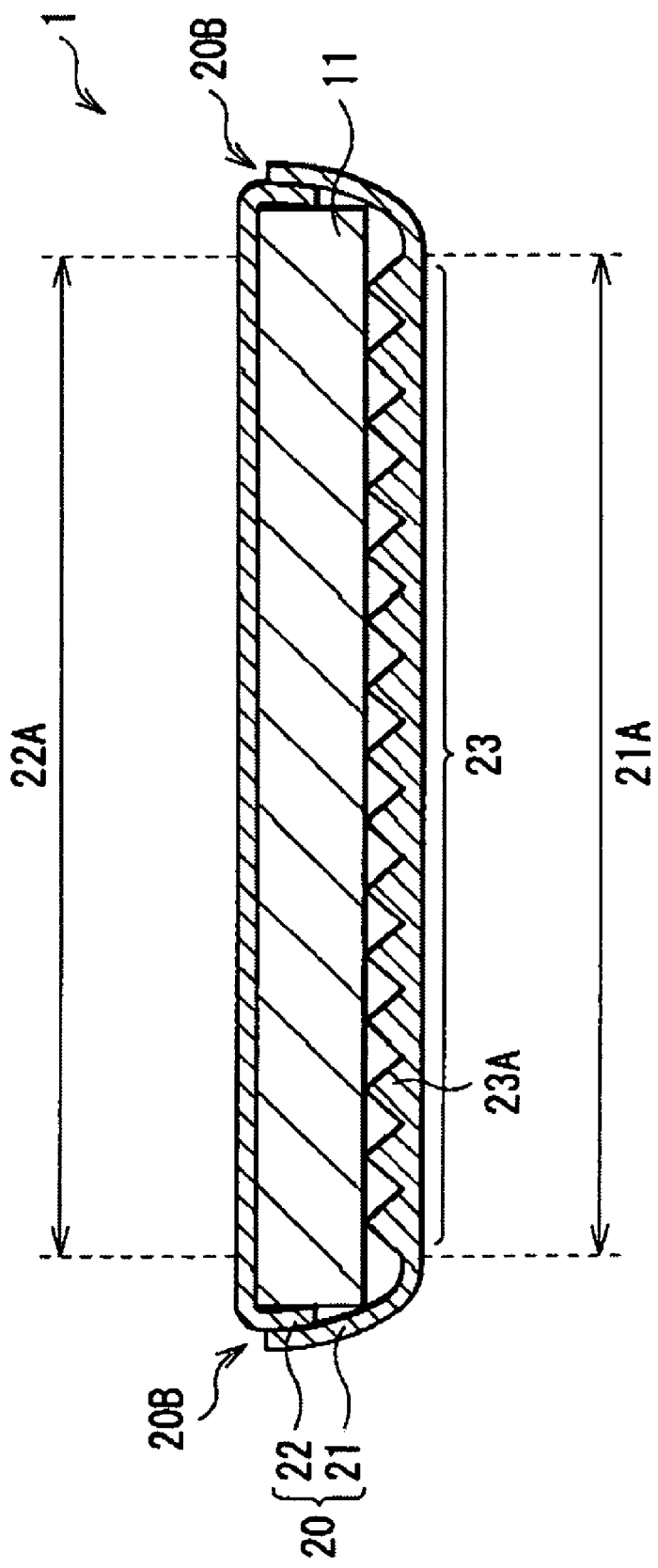
FIG. 31 is a cross section of a modification of the optical packaged body of FIG. 1A and FIG. 1B.
Figure 32:
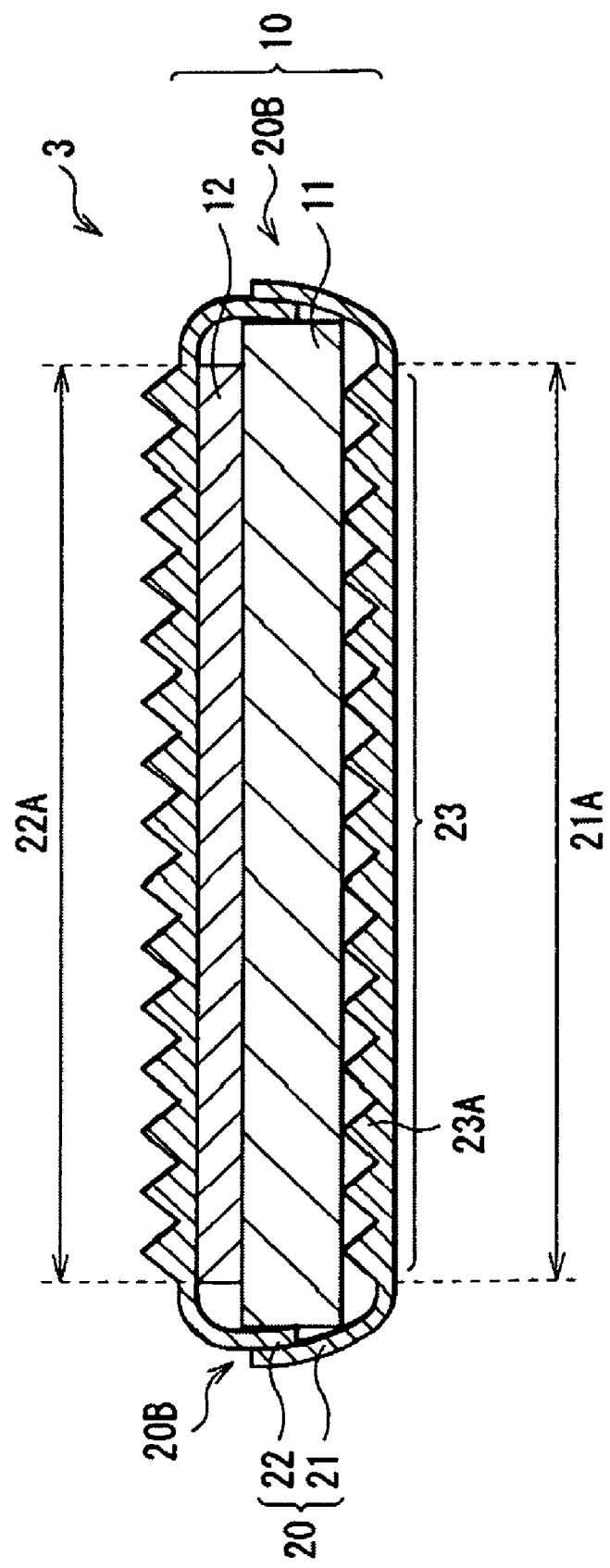
FIG. 32 is a cross section of another modification of the optical packaged body of FIG. 11.

The packaging film 20 may be formed as follows, for example, as shown in FIG. 31 and FIG. 32. First, the light emitting side film 22 is laid on the top face and the side face of the stack 10 (or the diffusion plate 11). After that, the edge of the light emitting side film 22 is coated with an adhesive. Then, the light incidence side film 21 is laid on the bottom face of the stack 10 (or the diffusion plate 11) and the edge of the light emitting side film 22. The edge of the light incidence side film 21 is bonded to the edge of the light emitting side film 22. In FIG. 31 and FIG. 32, a bond section between the light incidence side film 21 and the light emitting side film 22 is indicated as 20B.

Figure 33:
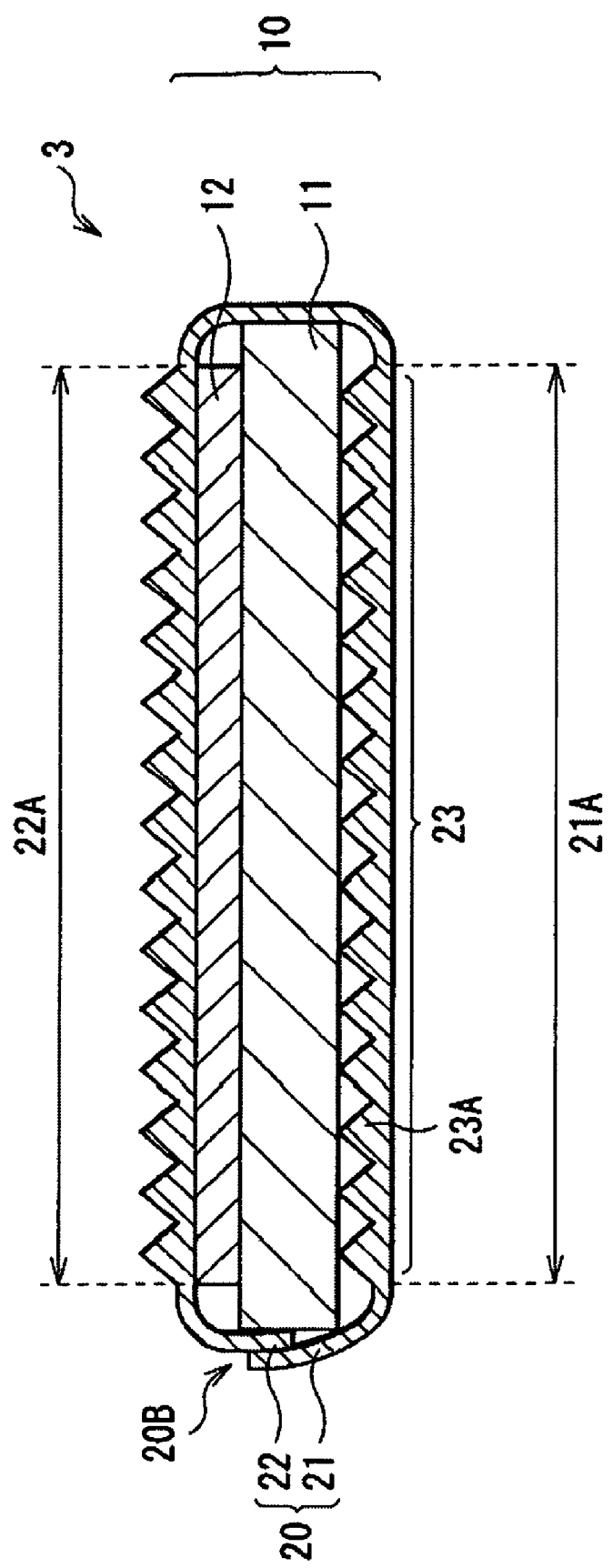
FIG. 33 is a cross section of a modification of the optical packaged body of FIG. 32.

Otherwise, as shown in FIG. 33, the packaging film 20 may be formed as follows. The light incidence side film 21 and the light emitting side film 22 are composed of one piece of continuous film. The stack 10 is covered with the film, and then the edge of the film is sealed with an adhesive or the like.

In the case where the optical function section is provided in both the light incidence region 21A and the light radiation region 22A, it is necessary to use a sheet train 30 capable of providing concave and convex shape on the both faces as shown in FIG. 34A, instead of the sheet train 30 for providing the concave and convex shape on only a single face as shown in FIG. 8 and FIG. 9.

The sheet train 30 shown in FIG. 34A includes an emboss belt 36 rotated by the heating roll 31 and the cooling roll 32 and an emboss belt 37 rotated by two pressing rolls 34 arranged opposite to the heating roll 31 and the cooling roll 32. The emboss belt 36 has a plurality of convex sections 36A only on partial region of the surface. Meanwhile, the emboss belt 37 has a plurality of convex sections 37A only on partial region of the surface. The convex sections 36A and 37A are arranged so that the convex sections 36A and 37A are not opposed with the film inserted between the emboss belt 36 and the emboss belt 37 in between when the emboss belts 36 and 37 are concurrently rotated. Both the convex sections 36A and 37A extend in the rotational direction of the emboss belts 36 and 37, or extend in the direction orthogonal to the rotational direction of the emboss belts 36 and 37. FIG. 34A shows a case that both the convex sections 36A and 37A extend in the rotational direction of the emboss belts 36 and 37.

An optical film 200 is inserted between the emboss belt 36 and the emboss belt 37. The inserted optical film 200 is pressed by the rotated emboss belts 36 and 37. Thereby, as shown in FIG. 34B, the packaging film 20 in which the polarization split section 24 including the plurality of convex sections 24A is provided on one face thereof and the light source image segmentation section 23 including the plurality of convex sections 23A is formed on the other face thereof may be formed.

It is possible that after the packaging film 20 in which the light source image segmentation section 23 and the polarization split section 24 are formed is formed by using the sheet train 30 shown in FIG. 34A, at least one of the light source image segmentation section 23 and the polarization split section 24 of the resin film may be stretched in one in-plane direction. To contact the light source image segmentation section 23 and the polarization split section 24 with the stack, the resin film in which the light source image segmentation section 23 and the polarization split section 24 are formed is folded back, the stack 10 is arranged opposite to the light source image segmentation section 23 and the polarization split section 24, the stack 10 is sandwiched between the resin film, heat is applied to the resin film to thermally shrink the resin film. Thereby, the light source image segmentation section 23 and the polarization split section 24 is bonded to the stack.

Figure 35:
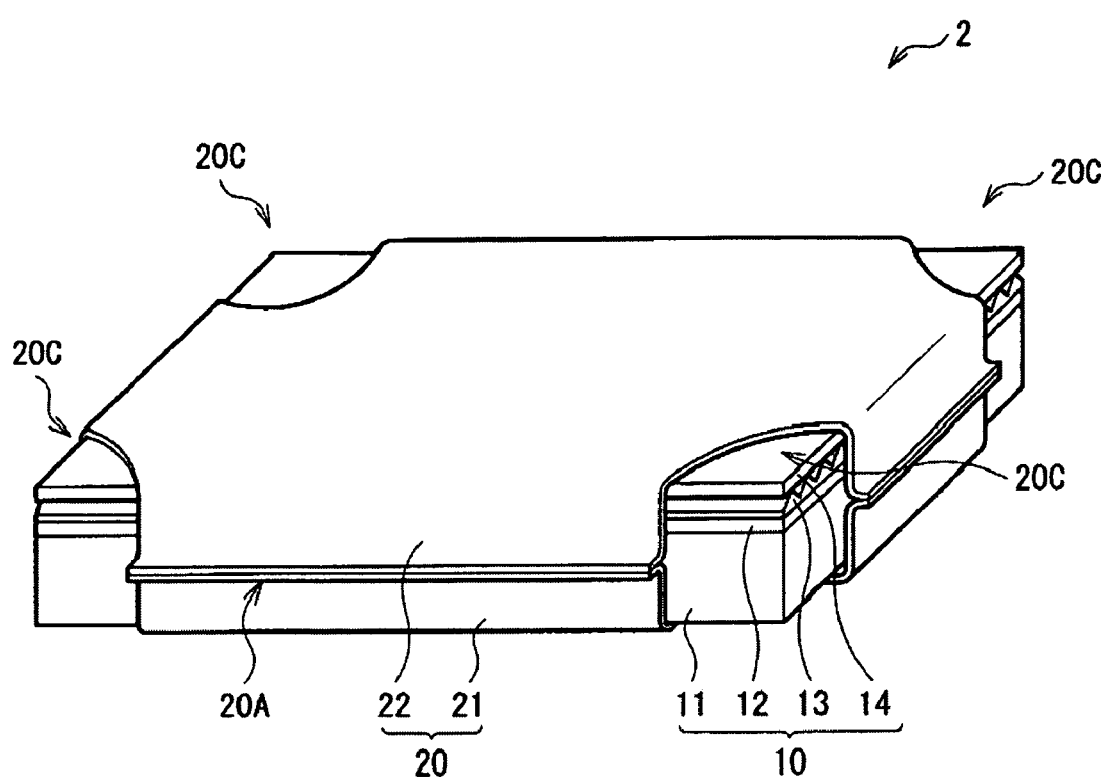
FIG. 35 is a cross section of a modification of the optical packaged body of FIG. 1A and FIG. 1B.

Further, in the foregoing respective embodiments, the stack 10 (or the diffusion plate 11) is totally covered by the packaging film 20, and the inside of the packaging film 20 is blocked from the outside thereof. However, it is possible to provide an opening in the packaging film 20 to communicate the inside of the packaging film 20 to the outside thereof. For example, as shown in FIG. 35, an opening 20C may be provided in at least part of the packaging film 20. FIG. 35 shows a case in which the opening 20C is provided at four corners of the packaging film 20. However, it is needless to say that the location, the size, and the number of the opening 20C may be adjusted as appropriate if necessary.

Application Example

Next, a description will be given of an application example of the optical packaged bodies 1 to 6 of the foregoing respective embodiments. A description will be hereinafter given of a case that the optical packaged body 2 is applied to a display unit. However, it is needless to say that the other optical packaged bodies 1 and 3 to 6 are usable instead of the optical packaged body 2.

Figure 36:
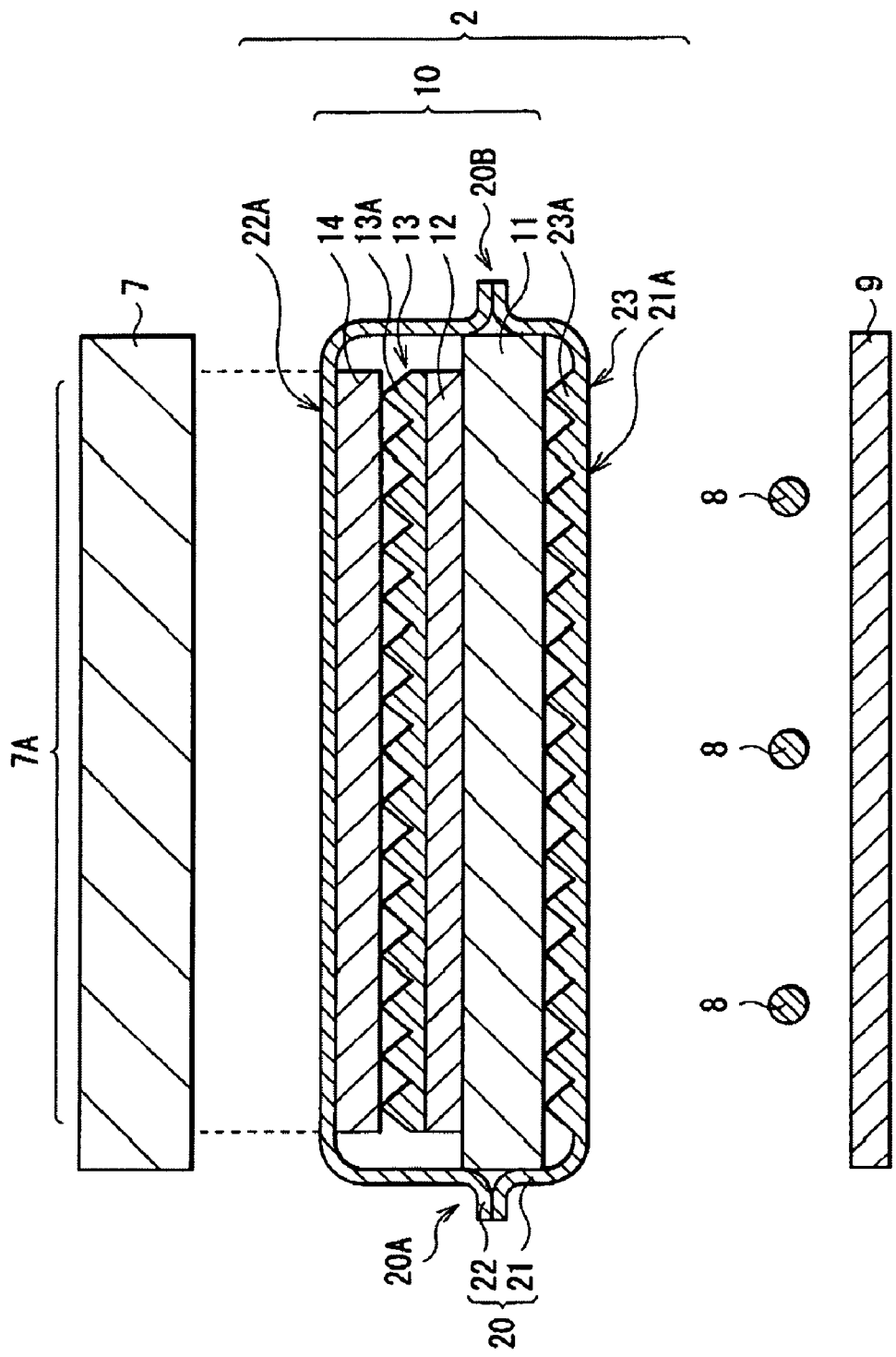
FIG. 36 is a cross section of a display unit according to an application example.

FIG. 36 shows a cross sectional structure of the display unit according to this application example. The display unit includes a display panel 7, a light source 8 arranged behind the display unit 7, a reflective sheet 9 arranged behind the light source 8, and the optical packaged body 2 arranged between the display panel 7 and the light source 8. The front face of the display panel 7 is oriented to an observer (not shown) side.

Though not shown, the display panel 7 has a lamination structure having a liquid crystal layer between a transparent substrate on the observer side and a transparent substrate on the light source 8 side. Specifically, the display panel 7 has a polarizing plate, the transparent substrate, a color filter, a transparent electrode, an alignment film, the liquid crystal layer, an alignment film, a transparent pixel electrode, the transparent substrate, and a polarizing plate from the observer side.

The polarizing plate is a kind of an optical shutter, and transmits only light (polarized light) in a certain oscillation direction. These polarizing plates are respectively arranged so that each polarizing axis is shifted from each other by 90 degree. Thereby, light emitted from the light source 8 is transmitted through the liquid crystal layer or blocked. The transparent substrate is composed of a substrate transparent to visible light such as a plate glass. In the transparent substrate on the light source 8 side, an active driving circuit including a TFT (Thin Film Transistor) as a driving device electrically connected to the transparent pixel electrode, wiring and the like is formed. In the color filter, for example, color filters for providing color separation into three primary colors of red (R), green (G), and blue (B) for the emitted light from the light source 8 are arranged. The transparent electrode is made of, for example, ITO (Indium Tin Oxide), and functions as a common counter electrode. The alignment film is made of, for example, a polymer material such as polyimide, and provides alignment processing for the liquid crystal. The liquid crystal layer is made of, for example, a liquid crystal in VA (Vertical Alignment) mode, TN (Twisted Nematic) mode, or STN (Super Twisted Nematic) mode. When a voltage is applied from the driving circuit, the liquid crystal layer transmits or block the emitted light from the light source 8 for every pixel. The transparent pixel electrode is made of, for example, ITO, and functions as an electrode for every pixel.

In the light source 8, for example, a plurality of linear light sources are arranged in series at equal distance (for example, at the intervals of 20 μm). The linear light source is typically a cold cathode fluorescent lamp called CCFL. However, as a light source, dotted light sources such as Light Emitting Diode (LED) may be linearly arranged. Each linear light source extends, for example, in the direction in parallel with the extending direction of the convex section 23A of the light source image segmentation section 23 (direction orthogonal to the normal line direction of the stack 10) in, for example, in-plane in parallel with the bottom face of the optical packaged body 1.

A description will be given of an action in the display unit according to this application example. When unpolarized light is emitted from the light source 8 toward the optical packaged body 2, the light from the light source 8 is segmented into minute light beams by the light source image segmentation section 23, and a light source image obtained by the segmentation is diffused by the diffusion plate 11 and the diffusion sheet 12. Thereby, the in-plane luminance distribution becomes uniform. After that, the on-axis luminance is increased by light collection action of the lens film 13, the light collected by the lens film 13 is polarized and split by the reflective polarizing sheet 14, the view angle is widened, and then emitted to the rear face of the display panel 7. Accordingly, the light from the light source is adjusted to light having a desired on-axis luminance, a desired in-plane luminance distribution, a desired view angle and the like. After that, the light is modulated in the display panel 7 and emitted from the front face of the display panel 7 as image light to the observer side.

In this application example, the thin optical packaged body 2 without a wrinkle, deflection, and warpage is used. Thus, the entire display unit may be thinned without deteriorating the display quality.

Figure 37:
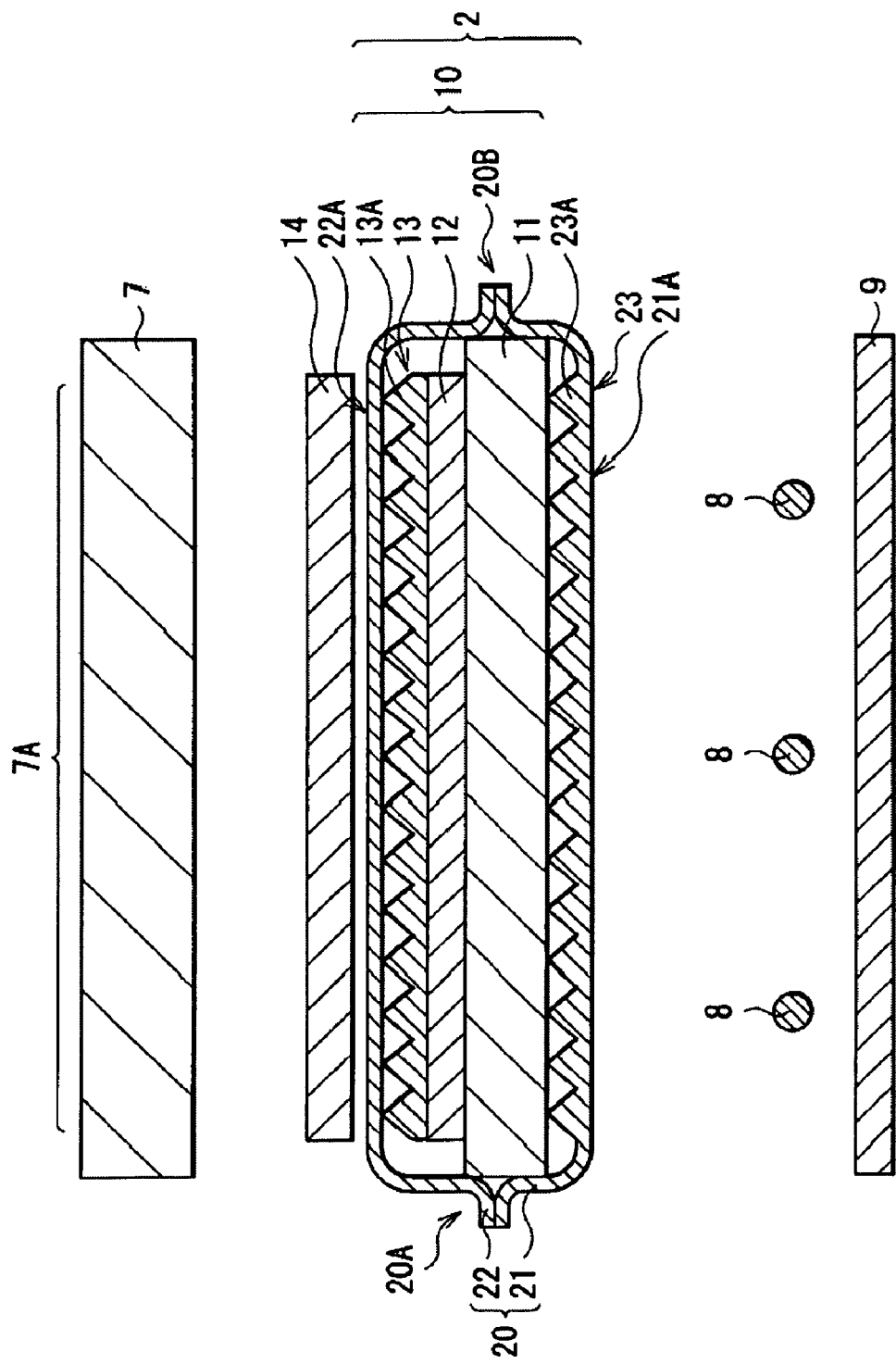
FIG. 37 is a cross section of a modification of the display unit of FIG. 35.
Figure 38:
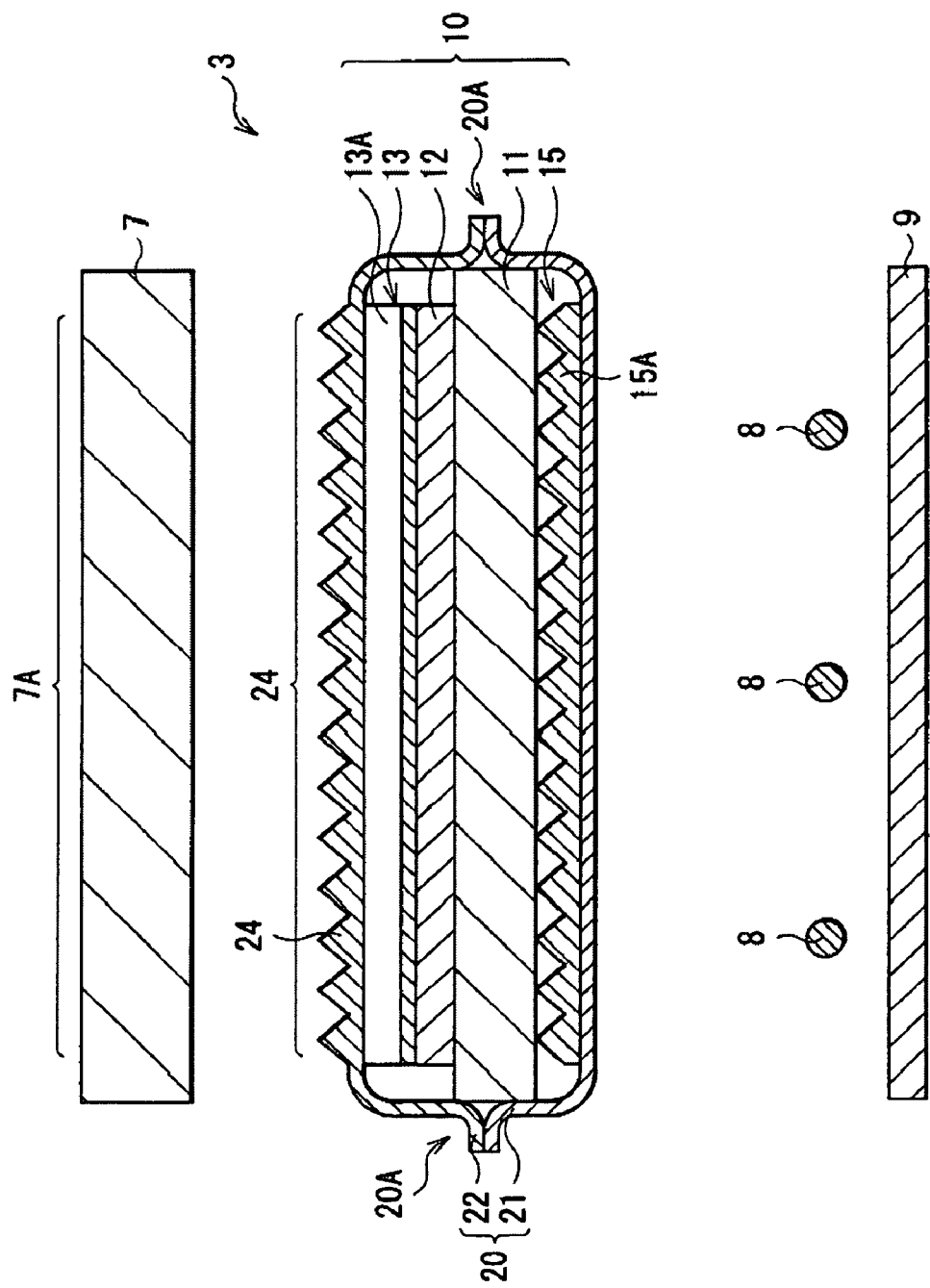
FIG. 38 is a cross section of another modification of the display unit of FIG. 35.

In the foregoing application example, one or a plurality of optical sheets may be provided between the display panel 7 and the optical packaged body 2. For example, as shown in FIG. 37, it is possible that the reflective polarization sheet 14 is taken out from the optical packaged body 2 and the reflective polarization sheet 14 is provided between the display panel 7 and the optical packaged body 2. Further, for example, as shown in FIG. 38, the optical packaged body 3 may be arranged instead of the optical packaged body 2.

Further, instead of the optical packaged body 2, for example, the optical packaged body 4 shown in FIG. 16 or FIG. 24 may be arranged.

EXAMPLES

Next, a description will be given of examples of the invention in contrast with a reference example and comparative examples. The invention is not limited to the examples hereinafter described.

Figure 39:
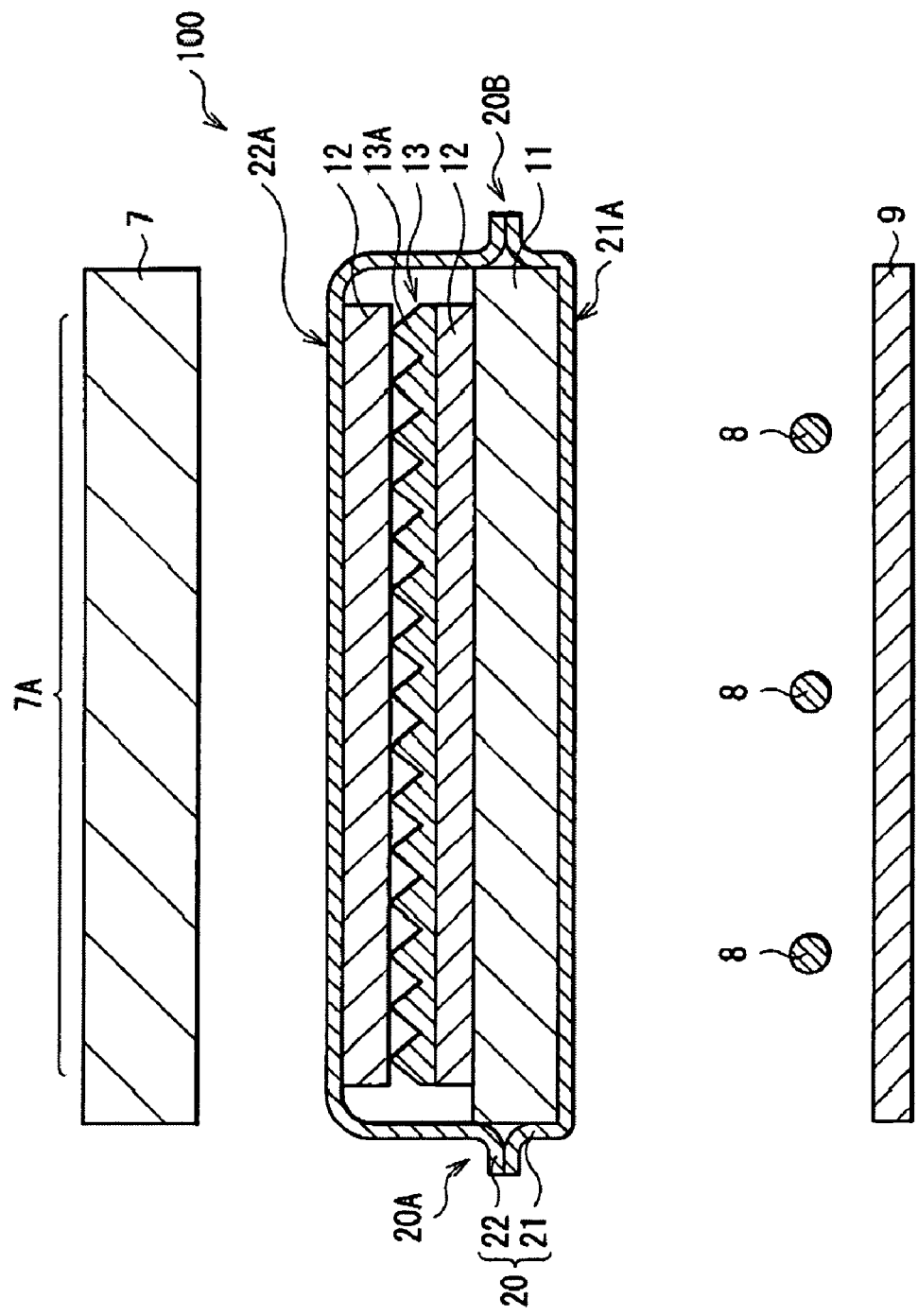
FIG. 39 is a cross section of a display unit according to a reference example.
Figure 40:
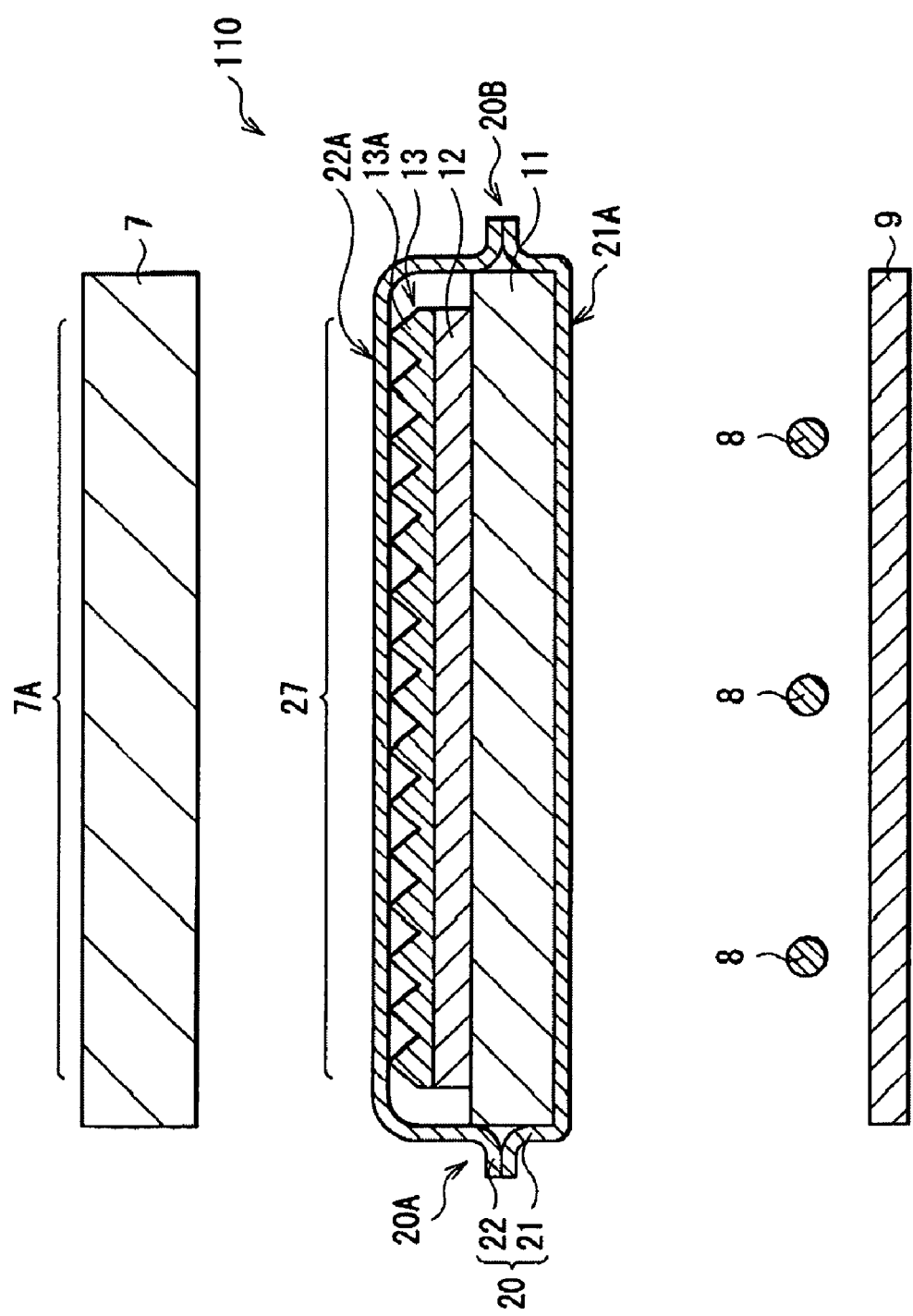
FIG. 40 is a cross section of a display unit according to Example 1.
Figure 41:
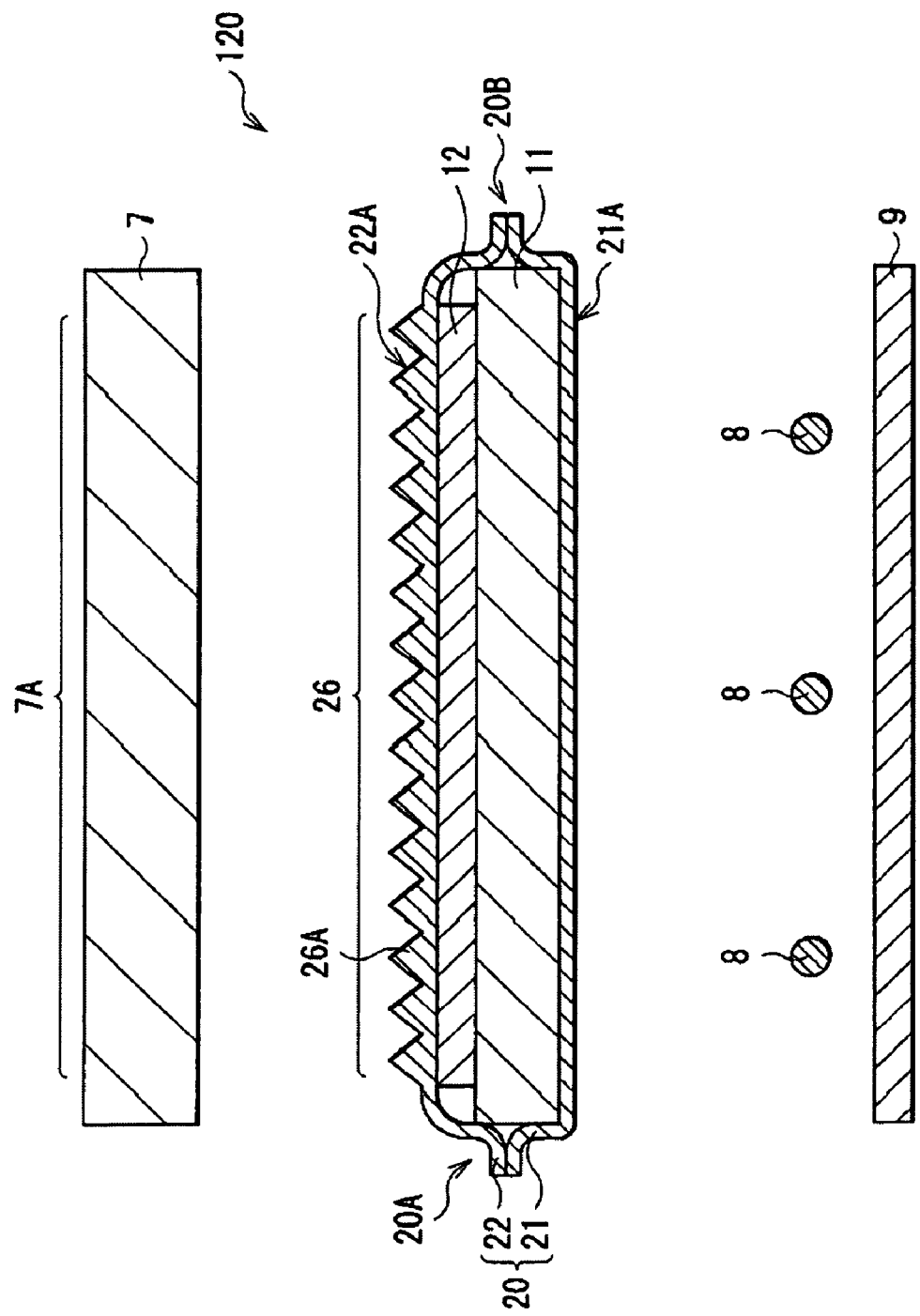
FIG. 41 is a cross section of a display unit according to Examples 2 and 3.
Figure 42:
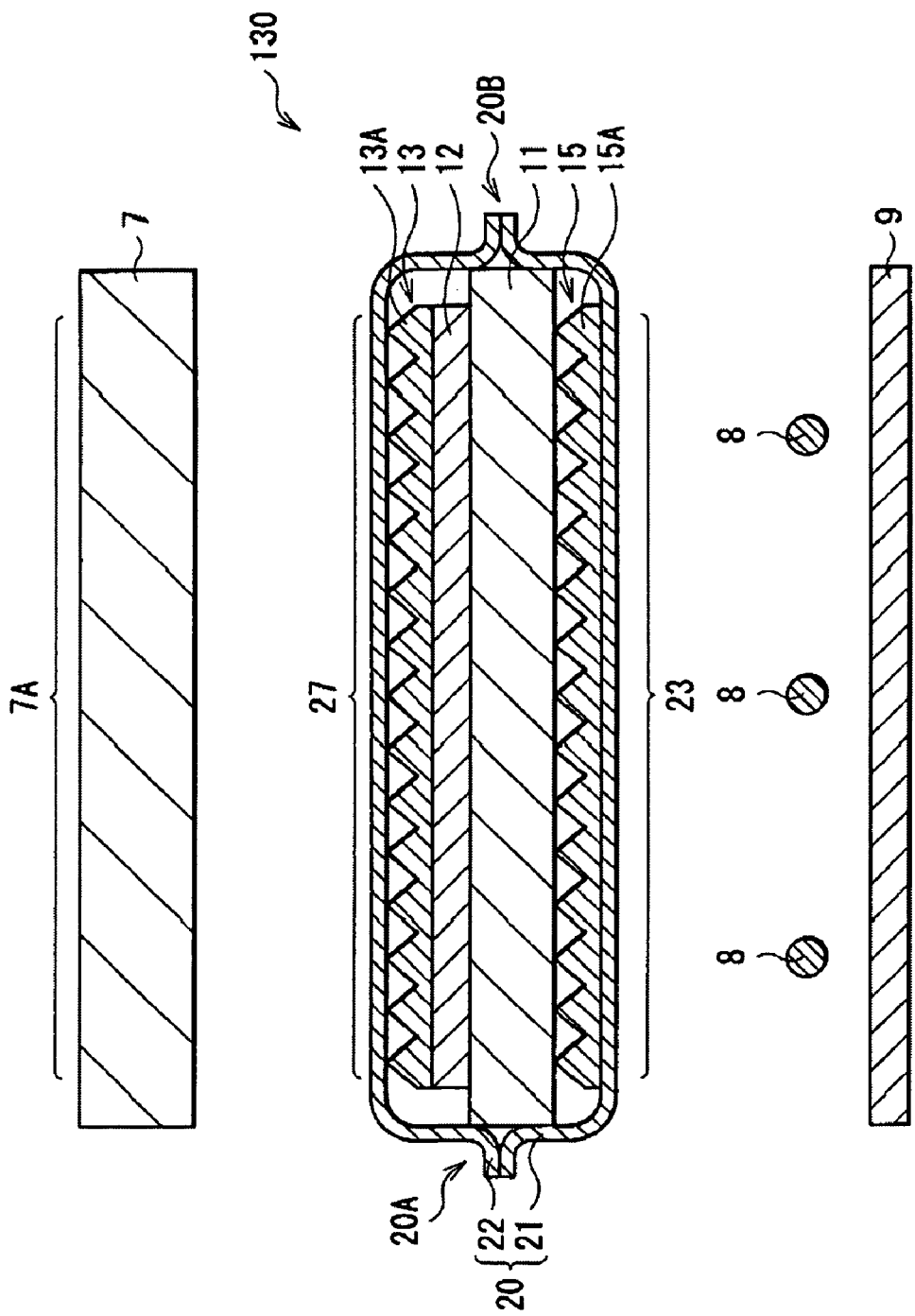
FIG. 42 is a cross section of a display unit according to Example 4.

FIG. 39 shows a cross sectional structure of a display unit according to the reference example. FIG. 40 shows a cross sectional structure of a display unit according to Example 1. FIG. 41 shows a cross sectional structure of a display unit according to Example 2 or Example 3. FIG. 42 shows a cross sectional structure of a display unit according to Example 4. The display unit according to the reference example was provided with an optical packaged body 100 between the light source 8 and the display panel 7. The display unit according to Example 1 was provided with an optical packaged body 110 between the light source 8 and the display panel 7. The display unit according to Example 2 or Example 3 was provided with an optical packaged body 120 between the light source 8 and the display panel 7. The display unit according to Example 4 was provided with an optical packaged body 130 between the light source 8 and the display panel 7.

In the optical packaged body 100, a stack in which the diffusion plate 11, the diffusion sheet 12, the lens film 13, and the diffusion sheet 12 were sequentially layered from the light source 8 side was covered with the packaging film 20 not provided with an optical function section in a state of being applied with the shrinkage force. In the optical packaged body 110, a stack in which the diffusion plate 11, the diffusion sheet 12, and the lens film 13 were sequentially layered from the light source 8 side was covered with the packaging film 20 in which the diffusion section 27 was provided in the light radiation region 22A in a state of being applied with the shrinkage force. In the optical packaged body 120, a stack in which the diffusion plate 11 and the diffusion sheet 12 were sequentially layered from the light source 8 side was covered with the packaging film 20 in which the light collection section 26 was provided in the light radiation region 22A of the light emitting side film 22 having a light diffusion function in a state of being applied with the shrinkage force. In the optical packaged body 130, a stack in which the light source image segmentation sheet 15, the diffusion plate 11, the diffusion sheet 12, and the lens film 13 were sequentially layered from the light source 8 side was covered with the packaging film 20 in which the diffusion section 27 was provided in the light radiation region 22A in a state of being applied with the shrinkage force. In Example 2 and Example 3, the material of the light collection section 26 provided in the light radiation region 22A of the optical packaged body 120 was different from each other.

Meanwhile, a display unit according to Comparative example 1 was the same display unit as the display unit according to Example 1, except that the packaging film 20 was eliminated. A display unit according to Comparative example 2 was the same display unit as the display unit according to Example 1, except that the packaging film 20 was eliminated and the diffusion plate 11, the diffusion sheet 12, the lens film 13, and the diffusion sheet 12 were layered by being bonded to each other with an adhesive. A display unit according to Comparative example 3 was the same display unit as the display unit according to Example 1, except that the packaging film 20 was eliminated as the display unit according to Comparative example 1. In addition, as will be described later, the number of light sources of the display unit according to Comparative example 3 was different from the number of light sources of the display unit according to Comparative example 1. A display unit according to Comparative example 4 was the same display unit as the display unit according to Example 1, except that the packaging film 20 was eliminated and the light source image segmentation sheet 15 was added between the diffusion plate 11 and the light source 8. A display unit according to Comparative example 5 was the same display unit as the display unit according to Example 1, except that the packaging film 20 was eliminated and another piece of diffusion sheet 12 was added between the diffusion plate 11 and the diffusion sheet 12. A display unit according to Comparative example 6 was the same display unit as the display unit according to Example 1, except that the packaging film 20 was eliminated and two pieces of diffusion sheets 12 were added between the diffusion plate 11 and the diffusion sheet 12.

The number of light sources 8 was 20 in the display units according to the reference example and Examples 1 to 3. The number of light sources 8 was 16 in the display unit according to Example 4. The number of light sources 8 was 20 in the display units according to Comparative examples 1 and 2. The number of light sources 8 was 16 in the display units according to Comparative examples 3 to 6.

Next, a description will be given of a procedure of fabricating the optical packaged body 100 of the reference example.

(Fabrication of Light Incidence Side Film 21 and Light Emitting Side Film 22)

First, a composition of matter having a main component of polypropylene/polyethylene-polypropylene/polypropylene was stretched by coextrusion, and then further stretched in the direction orthogonal to the foregoing stretching direction. The obtained stretched olefin shrink film was provided with heat fixation treatment. Thereby, the light incidence side film 21 and the light emitting side film 22 being 29 μm thick were obtained.

(Evaluation of Heat Shrinkable)

Next, a piece of film being 300 mm by 300 mm (300 mm×300 mm) in size was cut out from the light incidence side film 21 and the light emitting side film 22 obtained as above with the use of a metal measure. After that, the cut-out film was retained at 100 deg C. for 10 minutes with the use of a fun drier, and then the heat shrinkage change amount thereof was measured. In the result, the film was shrunk by 12% in one stretching direction and was shrunk by 15% in the stretching direction orthogonal to the one stretching direction. Accordingly, it was found that both the light incidence side film 21 and the light emitting side film 22 had the heat shrinkable.

(Optical Characteristics of Diffusion Function)

Next, the optical characteristics of the light incidence side film 21 and the light emitting side film 22 obtained as above were checked. For the measurement, a hazemeter of Murakami Shikisai (HM-150) was used. In the result, the haze value (based on JIS-K-7136) was 6% and the all light transmittance (based on JIS-K-7316) was 91%.

(Fabrication of Packaging Film 20)

As a support medium, the diffusion plate 11 (500 mm×890 mm×2 mm) having a main component of polycarbonate was prepared. The diffusion sheet 12, (Keiwa make, BS-912, 205 μm×498 mm×888 mm), and the lens film 13 (Sony Corporation make, made of a polycarbonate resin, lens pitch: 185 μm, hyperboloidal shape, size: 450 μm×498 mm×888 mm) that were commercially available were prepared. Next, the diffusion plate 11, the diffusion sheet 12, the lens film 13, and the diffusion sheet 12 were layered in this order to fabricate a stack. The stack was laid on the light incidence side film 21 with the diffusion plate 11 side down. The light emitting side film 22 was thereon set, and four corners of the resultant were bonded by thermal fusion deposition to obtain the entire size of 540 mm×950 mm and then melted down. After the packaging film 20 was fabricated as above, a plurality of air holes with $\phi$ 0.5 mm were formed at the end of the packaging film 20.

Next, the packaging film 20 including the stack was heated in the fun drier heated at 100 deg C., the packaging film 20 was thermally shrunk, and then the stack was covered with the packaging film 20 being applied with the shrinkage force. The resultant was cooled while air was released through the holes at the end of the packaging film 20, and then the stack was contacted with the diffusion sheet. Thereby, the optical packaged body 100 of the reference example was obtained.

Next, a procedure of fabricating the optical packaged body 110 of Example 1 will be described.

(Fabrication of Light Incidence Side Film 21 and Light Emitting Side Film 22)

First, in the same manner as that of the reference example, the light incidence side film 21 and the light emitting side film 22 being 29 μm thick were obtained. Next, respective raw materials described below were blended at the composition ratio described below, mixed for 3 hours with the use of Disper to obtain a diffusion coating. Next, the light emitting side film 22 was provided with adhesive treatment by corona discharge, the light emitting side film 22 was coated with the adjusted diffusion coating by gravure coating method and the resultant was smoothed and dried at 70 deg C. at the maximum by a dryer. Thereby, the diffusion section 27 being 6 μm thick was formed on the light emitting side film 22.

<Material> <Composition Ratio>

Acryl resin having a main component of polymethylmethacrylate: 100 parts by mass Acryl bead: ($\phi$ 0.5 mm, spherical): 30 parts by mass Methylethyl ketone solvent: 300 parts by mass (Evaluation of Heat Shrinkable)

Next, the heat shrinkage amount of the light emitting side film 22 having the diffusion section 27 obtained as above was measured in the same manner as that of the reference example. In the result, the film was shrunk in one stretching direction by 11% and was shrunk in the stretching direction orthogonal to the one stretching direction by 13%. Accordingly, it was found that the light emitting side film 22 provided with the diffusion section 27 had the heat shrinkable similarly to the light emitting side film 22 before being provided with the diffusion section 27.

(Optical Characteristics of Diffusion Function)

Next, the optical characteristics of the light emitting side film 22 obtained as above were checked. For the measurement, a hazemeter of Murakami Shikisai (HM-150) was used. In the result, the haze value (based on JIS-K-7136) was 92% and the all light transmittance (based on JIS-K-7316) was 76%.

(Fabrication of Packaging Film 20)

Next, the diffusion plate 11, the diffusion sheet 12, and the lens film 13 similar to those of the reference example were prepared. The diffusion plate 11, the diffusion sheet 12, and the lens film 13 were layered in this order to fabricate a stack. The stack was laid on the light incidence side film 21 with the diffusion plate 11 side down. The light emitting side film 22 was thereon set, and four corners of the resultant were bonded by thermal fusion deposition to obtain the entire size of 540 mm×950 mm and then melted down. After the packaging film 20 was fabricated as above, a plurality of air holes were formed at four corners of the packaging film 20. Next, the stack was contacted with the diffusion sheet in the same manner as that of the reference example. Thereby, the optical packaged body 110 of Example 1 was obtained.

Next, a procedure of fabricating the packaging film 20 of Example 2 will be described.

(Fabrication of Light Incidence Side Film 21 and Light Emitting Side Film 22)

First, two pieces of amorphous films were fabricated by using polyethylene naphthalate as a film material instead of the olefin material of Example 1. Next, one film thereof was biaxially-stretched to form into the light incidence side film 21. Meanwhile, the other film thereof was provided with a pattern in which prism shapes having an apex angle of 90 degree were in-plane arranged by thermal transcription. After that, the film transcribed with the pattern was biaxially-stretched. Accordingly, the light emitting side film 22 having the light collection section 26 provided with a polarization split function in addition to the light collection function was obtained.

(Evaluation of Heat Shrinkable)

Further, the heat shrinkage amount of the film obtained by providing heat fixation treatment was measured in the same manner as that of the reference example. In the result, the film was shrunk in one stretching direction by 12% and was shrunk in the stretching direction orthogonal to the one stretching direction by 12%. Accordingly, it was found that heat shrinkable could be also obtained in the case that polyethylene naphthalate was used as a film material.

(Fabrication of Packaging Film 20)

Next, the diffusion plate 11 and the diffusion sheet 12 similar to those of the reference example were prepared. The diffusion plate 11 and the diffusion sheet 12 were layered in this order to fabricate a stack. The stack was laid on the light incidence side film 21 with the diffusion plate 11 side down. The light emitting side film 22 was thereon set, and four corners of the resultant were bonded by thermal fusion deposition to obtain the entire size of 540 mm×950 mm and then melted down. After the packaging film 20 was fabricated as above, air holes were formed at four corners of the packaging film 20. Next, the stack was contacted with the diffusion sheet in the same manner as that of the reference example. Thereby, the optical packaged body 120 of Example 2 was obtained.

Next, a procedure of fabricating the optical packaged body 120 of Example 3 will be described.

(Fabrication of Light Incidence Side Film 21 and Light Emitting Side Film 22)

First, in the same manner as that of the reference example, the light incidence side film 21 and the light emitting side film 22 being 29 μm thick were fabricated. Next, the front face of the light emitting side film 22 was coated with a UV resin (refractive index after being cured: 1.57), and then provided with adhesive treatment by corona discharge. Next, a transparent polyolefin resin in which prism shapes having an apex angle of 90 degree were in-plane arranged was transcribed on the front face thereof, which was cured by UV radiation, and then the die was separated. Accordingly, the light emitting side film 22 having the light collection section 26 was obtained.

(Fabrication of Packaging Film 20)

After that, the optical packaged body 120 of Example 3 was obtained in the same manner as that of Example 2.

Next, a description will be given of a procedure of fabricating the optical packaged body 130 of Example 4.

First, in the same manner as that of Example 1, the light incidence side film 21 and the light emitting side film 22 having the diffusion section 27 were fabricated. Next, the light source image segmentation sheet 15 in which a shape with the cross section in which width 320 μm portion of a semicircle with a radius of 200 μm is protruded and a lenticular (prism) shape being a flat region of 5 μm were in-plane cyclically repeated was fabricated by heat forming. The light source image segmentation sheet 15 was intended to uniformize the light source amount entering the diffusion plate 11, and was 300 μm thick. Next, the light source image segmentation sheet 15, the diffusion plate 11, the diffusion sheet 12, the lens film 13, and the diffusion sheet 12 were layered in this order to fabricate a stack. The stack was laid on the light incidence side film 21 with the diffusion plate 11 side down. The light emitting side film 22 was thereon set, and four corners of the resultant were bonded by thermal fusion deposition to obtain the entire size of 540 mm×950 mm and then melted down. After the packaging film 20 was fabricated as above, air holes were formed at four corners of the packaging film 20. Next, the stack was contacted with the diffusion sheet in the same manner as that of the reference example. Thereby, the optical packaged body 130 of Example 4 was obtained.

The diffusion plate 11 and the various optical sheets included in the display units of Comparative examples 1 to 6, holes were provided therein. These holes were engaged with pins provided in a backlight chassis (not shown), and thereby the diffusion plate 11 and the various optical sheets were fixed in the display unit.

(Reliability Evaluation)

Next, as a pre-experiment, the surface temperature on the light source side of the diffusion plate mounted on the backlight of a 40 inch liquid crystal TV of Sony Corporation was measured by a thermocouple. In the result, the temperature in the central part of the surface of the diffusion plate was 63 deg C. Further, the temperature in the central part of the diffusion plate surface was measured by the thermocouple in a constant temperature bath at 40 deg C. that is the upper limit temperature of the practical usage environment. In the result, the temperature in the central part of the diffusion plate surface was 68 deg C. Thus, considering the foregoing measurement results, each optical packaged body or each stack was retained in the following pseudo environment, and evaluation was performed. That is, each optical packaged body or each stack was kept in the high temperature and low wet environment at 70 deg C. After that, the warpage amount of the diffusion plate 11 was measured by a metal measure. The results are shown in Table 1 and Table 2. Table 1 shows results for the cases that the number of light sources 8 was 20 (reference example, Examples 1 to 3, and Comparative examples 1 and 2). Table 2 shows the results for the cases that the number of light sources 8 was 16 (Example 4 and Comparative examples 3 to 6).

TABLE 1

|  | Warpage (mm) | Relative luminance (%) | Image quality |
| --- | --- | --- | --- |
| Comparative example 1 | 3 | 100 | 2 |

TABLE 1-continued

|  | Warpage (mm) | Relative luminance (%) | Image quality |
| --- | --- | --- | --- |
| Comparative example 2 | 87 | 82 | 1 |
| Reference example | 3 | 95 | 4 |
| Example 1 | 4 | 99 | 5 |
| Example 2 | 2 | 120 | 5 |
| Example 3 | 4 | 102 | 5 |

TABLE 2

|  | Warpage (mm) | Relative luminance (%) | Image quality |
| --- | --- | --- | --- |
| Comparative example 3 | 3 | 100 | 1 |
| Comparative example 4 | 3 | 97 | 1 |
| Comparative example 5 | 3 | 97 | 2 |
| Comparative example 6 | 3 | 96 | 2 |
| Example 4 | 3 | 96 | 5 |

(Evaluation in Mounting on TV)

Next, an optical element such as a diffusion plate was taken out from the 40 inch liquid crystal TV of Sony Corporation. Instead of the taken out optical element, the optical packaged bodies 100, 110, 120, and 130 of the reference example and the examples or the laminated bodies of the respective comparative examples were mounted on the liquid crystal TV. Then, the liquid crystal TV was turned on, and the luminance and the image quality were evaluated. The results are shown in the foregoing Tables 1 and 2. The luminance was measured by CS-1000 of Konica Minolta Inc. The luminance of the reference example, Examples 1 to 3, and Comparative example 2 was evaluated based on the relative value with the use of the luminance of Comparative example 1 as the normalized value. The luminance of Example 4 and Comparative examples 3 to 6 was evaluated based on the relative value with the use of the luminance of Comparative example 3 as the normalized value.

The image quality was evaluated based on the following standards:

| Points: | On-axis luminance irregularities | Oblique luminance irregularities |
| --- | --- | --- |
| 5 points: | not present | not present |
| 4 points: | not present | very little |
| 3 points: | very little | very little |
| 2 points: | little | little |
| 1 point: | large | large |

(Evaluation Result)

In the display unit of Comparative example 1, warpage was hardly generated. However, the dimensions of the diffusion plate 11 and each optical sheet were changed due to heat expansion caused by heat of the light source 8, and deflection was locally generated. Further, for the on-axis luminance and the oblique luminance, little irregularities were generated due to the local deflection.

In the display unit of Comparative example 2, large warpage was generated, and separation was generated partly.

The reason thereof may be as follows. The rigidity of the diffusion plate 11 and each optical sheet was improved by integrating the diffusion plate 11 and each optical sheet with the use of the adhesive. However, the laminate body was warped due to the difference of the Coefficients of thermal expansion thereof, and the separation was generated due to the warpage. Further, for the on-axis luminance and the oblique luminance, large irregularities were generated due to the warpage and the separation. Further, in the display unit of Comparative example 2, the on-axis luminance was more lowered compared to that of the Comparative example 1 by 18%. It might be caused by the fact that the concave and convex shape formed on the top face of the lens film 13 was buried with the adhesive and thereby the light collection effect was lowered.

In the display unit of Comparative example 3, warpage was hardly generated as in Comparative example 1, but deflection was locally generated. Further, for the front luminance and the oblique luminance, larger irregularities were generated than in Comparative example 1 since the number of light sources 8 was smaller than that of Comparative example 1.

In the display unit of Comparative example 4, warpage was hardly generated as in Comparative example 3, but deflection was locally generated. Further, for the front luminance and the oblique luminance, large irregularities were generated as in Comparative example 3. Further, the on-axis luminance was more lowered than in the Comparative example 1 by about 3%. It might be caused by the fact that the light source image segmentation sheet 15 provided on the light source 8 side of the diffusion plate 11 was deformed by heat of the light source 8.

In the display units of Comparative examples 5 and 6, warpage was hardly generated as in Comparative example 3, but deflection was locally generated. Further, for the front luminance and the oblique luminance, little irregularities were still generated, though the irregularities were slightly decreased by adding the diffusion sheet 12, compared to in Comparative example 3. Further, the on-axis luminance was lowered than in Comparative example 1 by about 3 to 4%. It might be caused by the fact that the directivity was lowered by adding the diffusion sheet 12.

Meanwhile, in the display units of the reference example and Examples 1 to 4, no wrinkle and deflection were generated, and warpage was hardly generated. The reason thereof may be as follows. Generation of a wrinkle, deflection, and warpage was inhibited by the tensile stress of the packaging film 20.

Further, in the reference example, the on-axis luminance was lowered than in Comparative example 1 by only about 5%. Thereby, it was found that in the optical packaged body 100, the on-axis luminance in the case that the diffusion plate 11 and each optical sheet were not covered with the packaging film 20 was almost identical with the on-axis luminance in the case that the diffusion plate 11 and each optical sheet were simply layered. The luminance loss of 5% might be generated due to reflection on the interface of the packaging film 20.

In Example 1, the on-axis luminance was lowered than in Comparative example 1 by only about 1%. Thus, it was found that the luminance loss on the interface was reduced more than in the reference example. The reason thereof may be as follows. In Example 1, the diffusion section 27 was provided in the light emitting side film of the packaging film 20, and thereby the luminance loss due to reflection on the interface of the light emitting side film was reduced. In Examples 2 and 3, the on-axis luminance was larger than that of Comparative example 1 and the reference example. The reason thereof may be as follows. In Examples 2 and 3, the light collection section 26 was provided on the light emitting side film of the packaging film 20. Thereby, not only the luminance loss due to reflection on the interface of the light emitting side film was reduced, but also the luminance was improved by the light collection function of the light collection section 26. Further, in Example 2, the light collection section 26 with the polarization split function was provided, and thus light loss due to the polarization plate on the incidence side of the display panel 7 was inhibited. Accordingly, the on-axis luminance was further increased.

Further, in Example 4, no luminance irregularities were shown. Thereby, it was found that the luminance irregularities generated in Comparative example 4 in which the stack was not covered with the packaging film 20 could be eliminated by packaging the stack in which the light source image segmentation sheet 15, the diffusion plate 11, the diffusion sheet 12, and the lens film 13 were sequentially layered from the light source 8 side by the packaging film 20 in a state of being applied with the shrinkage force. Further, it was found that when the packaging film 20 was used, the optical sheet that has been generally arranged on the light emitting side of the diffusion plate 11 could be arranged between the diffusion plate 11 and the light source 8, and therefore the light functional layer that has not been used in the past could be newly provided between the diffusion plate 11 and the light source 8.

What is claimed is:

1. An optical packaged body comprising:
    a support medium; and
    a packaging film that covers the support medium and is in close contact with the support medium in a state of being applied with tension in an in-plane direction,
    wherein the packaging film has an optical function section that acts on light from a light source in at least one of a first region into which the light from the light source enters and a second region from which the light from the light source is emitted after passing through the optical packaged body when the light source is arranged on one face side of the optical packaged body,
    the optical function section has a plurality of convex sections, and
    the plurality of convex sections are arranged in parallel in one direction, are arranged in parallel in a direction crossing the one direction,
    and have in-plane refractive index anisotropy.

2. The optical packaged body according to claim 1, wherein the plurality of convex sections have in-plane shape anisotropy.

3. The optical packaged body according to claim 2, wherein each of the convex sections has a columnar shape extending in the one direction, and
    a refractive index in the one direction in each of the convex sections is larger than a refractive index in the direction crossing the one direction in each of the convex sections.

4. The optical packaged body according to claim 2, wherein each of the convex sections has a columnar shape extending in the one direction, and
    a refractive index in the one direction in each of the convex sections is smaller than a refractive index in the direction crossing the one direction in each of the convex sections.

5. The optical packaged body according to claim 1, wherein in the packaging film, the plurality of convex sections are provided in at least one of a surface on the support medium side and a surface on the other side of the support medium.

6. The optical packaged body according to claim 1, wherein the packaging film is made of a material having at least one characteristics of heat shrinkable, stretching properties, and shrink characteristics by energy rays.

7. The optical packaged body according to claim 1 comprising:
one or a plurality of optical sheets, wherein
the packaging film covers the support medium and the one or the plurality of optical sheets.

8. The optical packaged body according to claim 7, wherein the support medium and the optical sheet are layered on each other to form a stack.

9. The optical packaged body according to claim 1, wherein the support medium is a diffusion plate.

10. The optical packaged body according to claim 1, wherein the optical function section is formed in an entire region corresponding to a display region of a display panel when the display panel driven based on an image signal is arranged on the other face side of the optical packaged body.

11. The optical packaged body according to claim 1, wherein the optical function section is formed integrally with a region other than the optical function section in the packaging film.

12. The optical packaged body according to claim 1, wherein a thickness of the packaging film ranges from 5 μm to 100 μm.

13. The optical packaged body according to claim 1, wherein the packaging film contains a material having an infrared absorption band.

14. The optical packaged body according to claim 1, wherein each of the convex sections has a columnar shape extending in one direction, and
a surface of each of the convex sections is composed of at least one of a curved face and a plurality of plain faces having different inclined angles.

15. The optical packaged body according to claim 1, wherein the plurality of convex sections extend in one direction, and are arranged in parallel in a direction crossing the one direction.

16. The optical packaged body according to claim 1, wherein each of the convex sections has an elliptical shape or an aspherical shape.

17. The optical packaged body according to claim 1, wherein each of the convex sections is integrally formed from the same material as a material of a portion contacted with the convex section in the packaging film.

18. The optical packaged body according to claim 1, wherein each of the convex sections is formed from a different material as a material of a portion contacted with the convex section in the packaging film.

19. The optical packaged body according to claim 1, wherein the optical function section contains a plurality of fine particles.

20. An illuminating device comprising:
an optical packaged body;
a light source emitting light toward the optical packaged body; and
a housing supporting the light source and the optical packaged body, wherein the optical packaged body includes
a support medium and
a packaging film that covers the support medium and is in close contact with the support medium in a state of being applied with tension in an in-plane direction, and
the packaging film has an optical function section that acts on the light from the light source in at least one of a first region into which the light from the light source enters and a second region from which the light from the light source is emitted after passing through the optical packaged body,
the optical function section has a plurality of convex sections, and
the plurality of convex sections are arranged in parallel in one direction, are arranged in parallel in a direction crossing the one direction, and have in-plane refractive index anisotropy.

21. The illuminating device according to claim 20, wherein the optical function section is formed in an entire region corresponding to a display region of a display panel.

22. A display unit comprising:
a display panel driven based on an image signal;
a light source emitting light for illuminating the display panel; and
an optical packaged body provided between the display panel and the light source, wherein
the optical packaged body includes
a support medium and
a packaging film that covers the support medium and is in close contact with the support medium in a state of being applied with tension in an in-plane direction, and
the packaging film has an optical function section that acts on the light from the light source in at least one of a first region into which the light from the light source enters and a second region from which the light from the light source is emitted after passing through the optical packaged body,
the optical function section has a plurality of convex sections, and
the plurality of convex sections are arranged in parallel in one direction, are arranged in parallel in a direction crossing the one direction, and have in-plane refractive index anisotropy.

23. A method of manufacturing an optical packaged body comprising:
stretching a flat first resin film that is a resin having at least one characteristics of heat shrinkable, stretching properties, and shrink characteristics by energy rays and shows birefringence in one in-plane direction or both in the one direction and in a direction crossing the one direction, thereby generating in-plane refractive index anisotropy to the first resin, and then, on at least one face of the first resin film after being stretched, forming an optical function section having a plurality of convex sections arranged in parallel in one direction, and arranged in parallel in a direction crossing the one direction;
arranging a support medium opposed to the optical function section, layering the first resin film formed with the optical function section and a second resin film having at least one characteristics of heat shrinkable, stretching properties, and shrink characteristics by energy rays with the support medium in between, and then bonding the first resin film and the second resin film to each other; and
shrinking the first resin film formed with the optical function section and the second resin film, and bringing into close contact with the support medium in a state of being applied with tension in an in-plane direction.

24. A method of manufacturing an optical packaged body comprising:
forming an optical function section having a plurality of convex sections arranged in parallel in one direction, and arranged in parallel in a direction crossing the one direction on at least one face of a flat first resin film, the first resin film being a resin having at least one of heat shrinkable, stretching properties, and shrink characteristics by energy rays, and showing birefringence, and then stretching the first resin film formed with the optical function section in one in-plane direction or both in the one direction and in a direction crossing the one direction, thereby generating in-plane refractive index anisotropy to the optical function section;

arranging a support medium opposed to the optical function section, layering the first resin film after being stretched and a second resin film having at least one characteristics of heat shrinkable, stretching properties, and shrink characteristics by energy rays with the support medium in between, and then bonding the first resin film and the second resin film to each other; and shrinking the first resin film after being stretched and the second resin film, and bringing into close contact with the support medium in a state of being applied with tension in an in-plane direction.

* * * * *